US010390041B2

(12) United States Patent
Sugio et al.

(10) Patent No.: US 10,390,041 B2
(45) Date of Patent: Aug. 20, 2019

(54) PREDICTIVE IMAGE CODING AND DECODING USING TWO REFERENCE PICTURES

(71) Applicant: Panasonic Intellectual Property Corporation of America, Torrance, CA (US)

(72) Inventors: Toshiyasu Sugio, Osaka (JP); Takahiro Nishi, Nara (JP); Youji Shibahara, Osaka (JP); Kyoko Tanikawa, Osaka (JP); Hisao Sasai, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 1278 days.

(21) Appl. No.: 13/853,204

(22) Filed: Mar. 29, 2013

(65) Prior Publication Data

US 2013/0259122 A1    Oct. 3, 2013

Related U.S. Application Data

(60) Provisional application No. 61/617,795, filed on Mar. 30, 2012.

(51) Int. Cl.
*H04N 13/00* (2018.01)
*H04N 13/10* (2018.01)
(Continued)

(52) U.S. Cl.
CPC ........... *H04N 19/573* (2014.11); *H04N 13/00* (2013.01); *H04N 13/10* (2018.05); *H04N 13/106* (2018.05);
(Continued)

(58) Field of Classification Search
CPC .. H04N 19/109; H04N 19/139; H04N 19/159; H04N 19/573; H04N 19/577;
(Continued)

(56) References Cited

U.S. PATENT DOCUMENTS 5,612,735 A * 3/1997 Haskell ............... H04N 13/0048
348/43
5,619,256 A * 4/1997 Haskell ............... H04N 13/0048
348/43
(Continued)

FOREIGN PATENT DOCUMENTS

EP   2230852 A2 * 9/2010 ........... H04N 19/105
JP   2009-543462    12/2009
(Continued)

OTHER PUBLICATIONS

Recommendation ITU-T H.264, "Series H: Audiovisual and Multimedia Systems: Infrastructure of audiovisual services—Coding of moving video, Advanced video coding for generic audiovisual services", Telecommunication Standardization Sector of the International Telecommunication Union, Mar. 2010.

*Primary Examiner* — David N Werner
(74) *Attorney, Agent, or Firm* — Wenderoth, Lind & Ponack, L.L.P.

(57) ABSTRACT

An image coding method includes: determining a first temporal distance between a current picture to be coded and a first reference picture; determining a second temporal distance between the first reference picture and a second reference picture; judging whether or not the first temporal distance and the second temporal distance satisfy a predetermined condition, and calculating a first weight for the first reference picture and a second weight for the second reference picture based on a result of the judgment; and generating a predictive image for the current block by adding a first block included in the first reference picture and a second
(Continued)

block included in the second reference picture, the first block being weighted by the first weight, and the second block being weighted by the second weight.

6 Claims, 43 Drawing Sheets

(51) Int. Cl.
    *H04N 19/58*       (2014.01)
    *H04N 13/106*     (2018.01)
    *H04N 19/573*     (2014.01)
    *H04N 19/577*     (2014.01)
    *H04N 19/597*     (2014.01)

(52) U.S. Cl.
    CPC ........... *H04N 19/577* (2014.11); *H04N 19/58* (2014.11); *H04N 19/597* (2014.11)

(58) Field of Classification Search
    CPC ...... H04N 19/578; H04N 19/58; H04N 13/00; H04N 13/10; H04N 13/106
    See application file for complete search history.

(56) References Cited

U.S. PATENT DOCUMENTS

| | | | | |
|---|---|---|---|---|
| 6,057,884 A * | 5/2000 | Chen | ........................ | H04N 7/52 375/240.16 |
| 7,372,905 B2 * | 5/2008 | Foo | ...................... | H04N 19/513 375/240.18 |
| 7,852,936 B2 * | 12/2010 | Mukerjee | ............. | H04N 19/105 375/240.12 |
| 8,451,894 B2 | 5/2013 | Tanimoto et al. | | |
| 8,964,843 B2 * | 2/2015 | Furukawa | ............... | G06T 3/4007 348/459 |
| 2002/0009137 A1 * | 1/2002 | Nelson | ..................... | H04N 7/01 375/240.1 |
| 2005/0111547 A1 * | 5/2005 | Holcomb | ............... | H04N 19/70 375/240.03 |
| 2006/0093038 A1 * | 5/2006 | Boyce | .................... | G06T 9/004 375/240.16 |
| 2007/0286262 A1 * | 12/2007 | Sestok | ................. | H04B 1/0082 375/148 |
| 2008/0069232 A1 * | 3/2008 | Kondo | ................. | H04N 19/105 375/240.16 |
| 2009/0060038 A1 * | 3/2009 | Nakaishi | .............. | H04N 19/105 375/240.12 |
| 2009/0168886 A1 * | 7/2009 | Ikeda | ................... | H04N 19/105 375/240.16 |
| 2009/0238269 A1 | 9/2009 | Pandit et al. | | |
| 2009/0279606 A1 * | 11/2009 | Lee | ...................... | H04N 19/105 375/240.12 |
| 2009/0304068 A1 | 12/2009 | Pandit et al. | | |
| 2010/0086027 A1 * | 4/2010 | Panchal | ........... | H04N 19/00024 375/240.12 |
| 2010/0220784 A1 | 9/2010 | Tanimoto et al. | | |
| 2011/0206123 A1 * | 8/2011 | Panchal | ................. | H04N 19/70 375/240.15 |
| 2011/0285815 A1 * | 11/2011 | Kervec | ................ | H04N 19/577 348/43 |
| 2012/0189056 A1 * | 7/2012 | Li | .......................... | H04N 19/50 375/240.15 |
| 2012/0189058 A1 * | 7/2012 | Chen | .................... | H04N 19/159 375/240.15 |
| 2012/0328005 A1 * | 12/2012 | Yu | ........................ | H04N 19/105 375/240.03 |
| 2013/0243103 A1 * | 9/2013 | Sasaki | .................... | H04N 13/00 375/240.25 |
| 2014/0198850 A1 * | 7/2014 | Choi | .................... | H04N 19/597 375/240.15 |

FOREIGN PATENT DOCUMENTS

| | | | | |
|---|---|---|---|---|
| WO | WO 2004054225 A2 * | 6/2004 | ............. | G06T 9/004 |
| WO | WO 2005109898 A1 * | 11/2005 | ........... | H04N 19/105 |
| WO | WO 2006118384 A1 * | 11/2006 | ........... | H04N 19/105 |
| WO | 2007/077989 | 7/2007 | | |
| WO | WO 2007092215 A2 * | 8/2007 | ........... | H04N 19/105 |
| WO | 2008/005574 | 1/2008 | | |
| WO | 2008/005575 | 1/2008 | | |

* cited by examiner

FIG. 1A - PRIOR ART
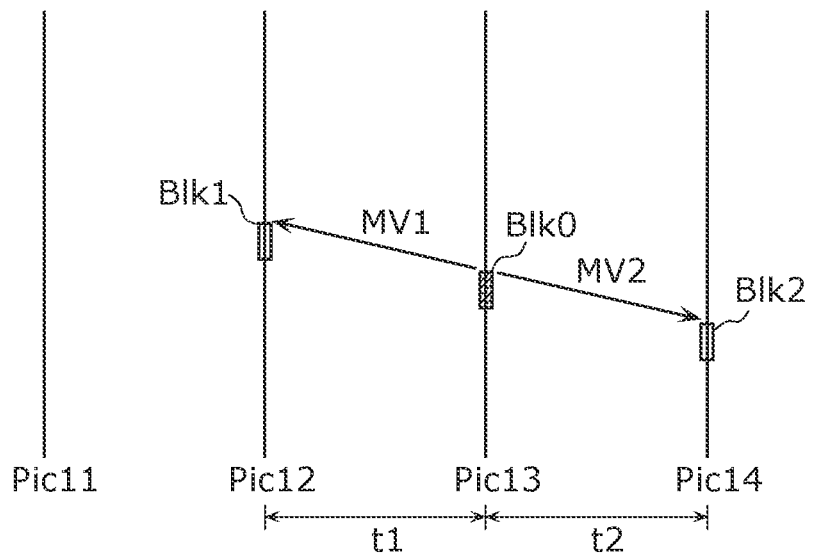
$$Blk0' = \frac{(Blk1 \times t2 + Blk2 \times t1)}{t1 + t2}$$
FIG. 1B - PRIOR ART
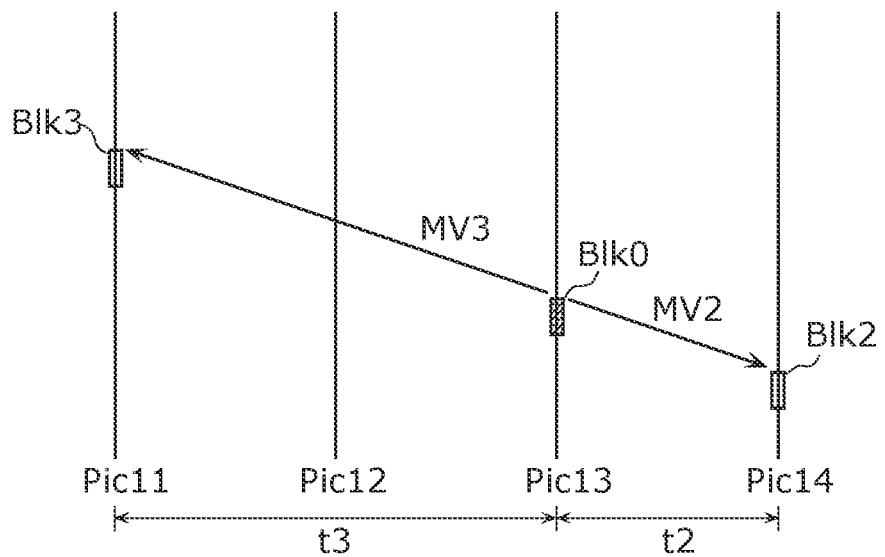
$$Blk0' = \frac{(Blk3 \times t2 + Blk2 \times t3)}{t3 + t2}$$

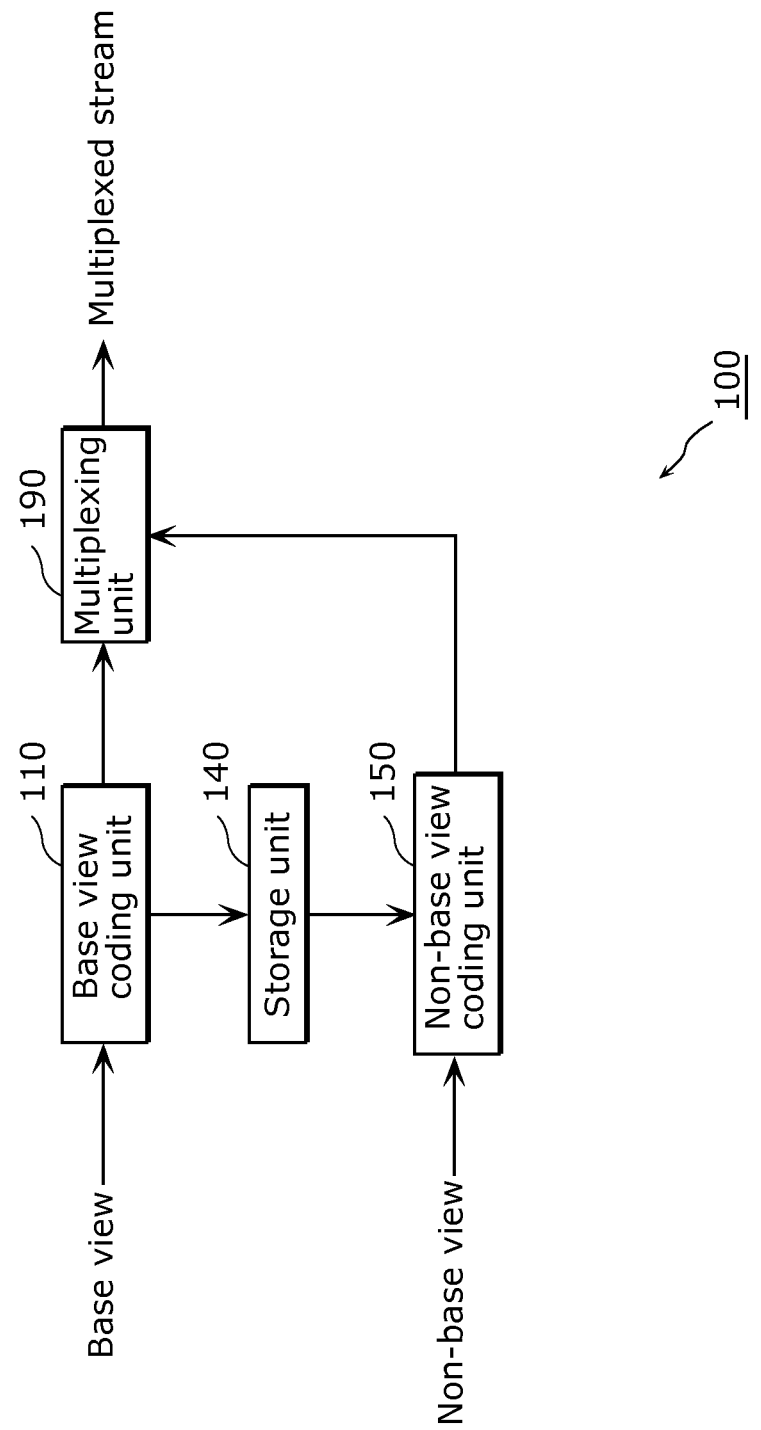

FIG. 32
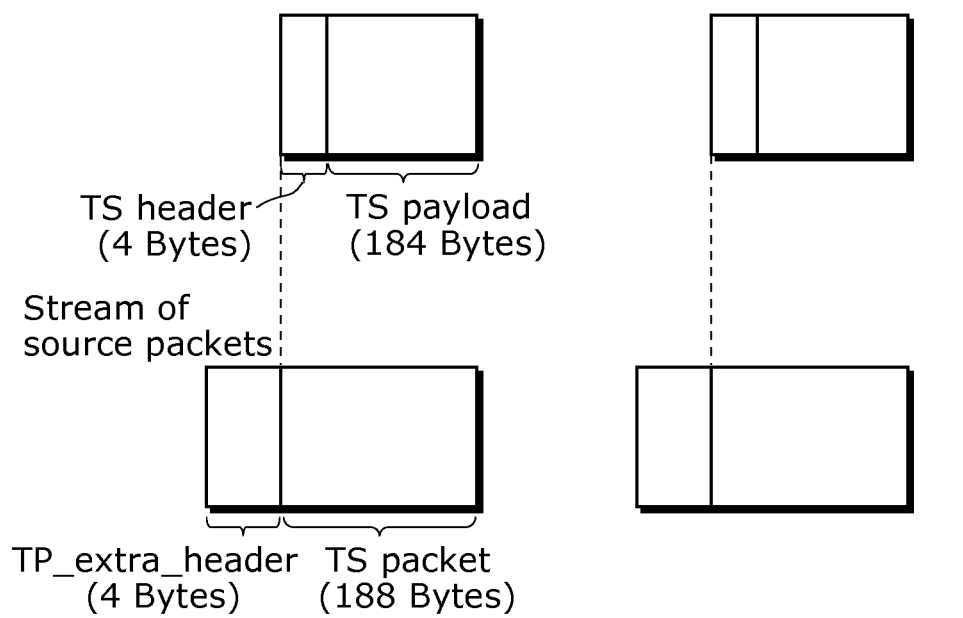
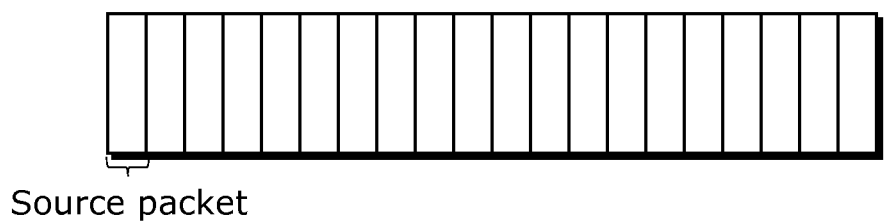

| Corresponding standard | Driving frequency |
|---|---|
| MPEG-4 AVC | 500 MHz |
| MPEG-2 | 350 MHz |
| ⋮ | ⋮ | ex900 ex1000

PREDICTIVE IMAGE CODING AND DECODING USING TWO REFERENCE PICTURES

CROSS REFERENCE TO RELATED APPLICATION

The present application claims the benefit of U.S. Provisional Patent Application No. 61/617,795 filed on Mar. 30, 2012. The entire disclosure of the above-identified application, including the specification, drawings and claims is incorporated herein by reference in its entirety.

FIELD

The present disclosure relates to image coding methods for coding moving pictures and image decoding methods for decoding coded moving pictures, and particularly relates to an image coding method and an image decoding method accompanying generating a predictive image.

BACKGROUND

In the moving picture coding process, the amount of data is compressed using redundancy of a moving picture in a spatial direction and a temporal direction in general. A transformation into a frequency domain is generally used as a method for using the redundancy in the spatial direction. In addition, as a way to use the redundancy in the temporal direction, an inter-picture prediction (hereafter referred to as an inter prediction) coding is used. When performing inter predictive coding on a picture, a coded picture preceding or following a current picture to be coded in display time order is used as a reference picture. Subsequently, a motion vector is derived by estimating motion of the current picture with respect to the reference picture, and the redundancy in the temporal direction is removed by calculating a difference between the predictive image data obtained by performing motion compensation based on a motion vector and image data of the current picture. Here, when estimating the motion, a difference value between the current block in the current picture and a block in the reference picture is calculated, and a block in the reference picture having the smallest difference value is determined as the reference block. Subsequently, the motion vector is estimated using the current block and the reference block. A moving picture coding method referred to as H.264 has been standardized (See Non-patent literature 1).

CITATION LIST

Non Patent Literature

[Non-Patent Literature 1] ITU-T Recommendation H.264 "Advanced Video Coding for Generic Audiovisual Services" March, 2010

SUMMARY

Technical Problem

However, broadcast or content distribution using high-definition images (4K×2K) has been considered, and there is a need for improving coding efficiency compared to a moving image coding method that has been standardized.

One non-limiting and exemplary embodiment provides an image coding method and an image decoding method capable of improving coding efficiency.

Solution to Problem

The image coding method according to an aspect of the present disclosure is an image coding method for coding, for each block, a picture composing a multi-view video having a first view and a second view, the image coding method including: determining a temporal distance between a current picture to be coded and a first reference picture to which a current block to be coded included in the current picture refers as a first temporal distance; determining a temporal distance between the first reference picture and a second reference picture to which the current block refers as a second temporal distance; judging whether or not the first temporal distance and the second temporal distance satisfy a predetermined condition, and calculating a first weight for the first reference picture and a second weight for the second reference picture based on a result of the judgment; and generating a predictive image for the current block by adding a first block included in the first reference picture and a second block included in the second reference picture, the first block being weighted by the first weight, and the second block being weighted by the second weight, in which the first block and the second block are referred to by the current block.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The image coding method and the image decoding method according to the present disclosure are capable of improving coding efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1A is a diagram for describing an example of weighted prediction in an implicit mode.

FIG. 1B is a diagram for describing another example of weighted prediction in an implicit mode.

FIG. 2 is a block diagram of an image coding apparatus according to the embodiment 1.

FIG. 32 shows a structure of TS packets and source packets in the multiplexed data.

FIG. 40 shows an example of a look-up table in which video data standards are associated with driving frequencies.

DESCRIPTION OF EMBODIMENT(S)

(Knowledge Underlying the Present Disclosure)

Figure 3:
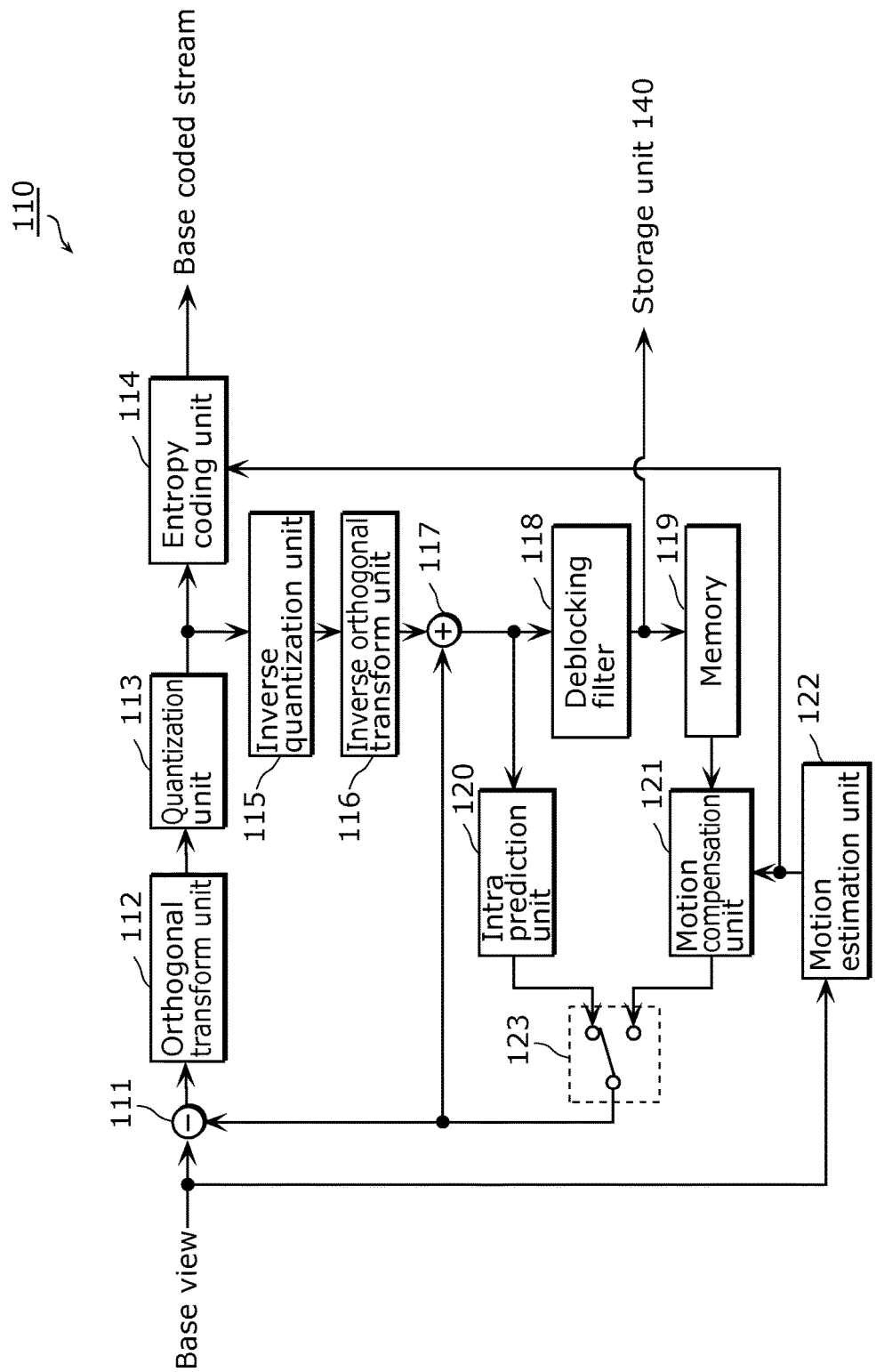
FIG. 3 is a block diagram of a base view coding unit according to the embodiment 1.

Conventionally, an image coding method for performing predictive coding on a moving picture for each block and decoding a predictive-coded image for the block has been proposed.

In the image coding method according to the non-patent literature 1, quantized values are generated by transforming frequency and quantizing the difference between the blocks in the moving picture and the predictive images predicted for the blocks, and entropy coding is performed on the quantized values. The moving picture is coded by the process for each block, and a coded stream is generated as a result. A differential image is generated by inverse quantization on the quantized values generated for the blocks and inverse frequency transform, and a reconstructed image is generated by adding the differential image and the predictive image.

Here, since the reconstructed image is generated as a block, there is a distortion between an adjacent block which is the reconstructed image and a block which is another reconstructed image (block boundary). Accordingly, a deblocking filter is used for removing the distortion.

The deblocking filter multiplies a predetermined coefficient (filtering coefficient) for each of the pixel values of the pixels arranged horizontally or vertically over a block boundary, and multiplies pixel values to which the coefficients are multiplied so as to derive the pixel values of the pixels neighboring over the block boundary. With this, the distortion in the block boundary is removed. Accordingly, the reconstructed image whose distortion in the block boundary is removed is used for generating the predictive image described above.

Furthermore, in the image decoding method according to the non-patent literature 1, by performing the entropy decoding on the coded stream, quantized values for the current block to be decoded are extracted from the coded stream. A differential image is generated by inverse quantization on the quantized values generated for the blocks and inverse frequency transform, and a reconstructed image is generated by adding the differential image and the predictive image. Subsequently, the distortion in the block boundary in the reconstructed image is removed by the filtering by the deblocking filter. The reconstructed image whose distortion in the block boundary is removed is used for generating the predictive image, in the same manner as the image coding method. By performing the process for each block, the coded stream is decoded and output as a decoded image.

Here, when generating a predictive image in the image coding method and the image decoding method according to the non-patent literature 1, there is a case where the weighted prediction is used. Note that, the weighted prediction includes an explicit mode and an implicit mode.

FIG. 1A is a diagram for describing an example of weighted prediction in an implicit mode.

For example, as illustrated in FIG. 1A, when the pictures Pic11, Pic12, Pic13, and Pic14 are arranged in display order, a block Blk0 included in the picture Pic13 is coded or decoded as a current block. Furthermore, when coding or decoding the current block Blk0, the picture Pic12 and the picture Pic14 are referred to as the reference pictures.

In this case, a block Blk1 in the reference picture 12 indicated by a motion vector MV1 of the current block Blk0 and a block Blk2 in the reference picture Pic14 indicated by another motion vector MV2 of the current block Blk0 for generating the predictive image by the weighted prediction in the implicit mode is used for generating a predictive image by the weighted prediction in the implicit mode.

Furthermore, a temporal distance t1 between the picture Pic13 including the current block Blk0 and the reference picture Pic12 and a temporal distance t2 between the picture Pic13 and the reference picture Pic14 are used for generating a predictive image by the weighted prediction in the implicit mode.

Stated differently, the predictive image Blk0' for the current block Blk0 is calculated by Blk0'=(Blk1×t2+Blk2×t1)/(t1+t2).

FIG. 1B is a diagram for describing another example of weighted prediction in an implicit mode.

For example, as described above, when the pictures Pic11, Pic12, Pic13, and Pic14 are arranged in display order, a block Blk0 included in the picture Pic13 is coded or decoded as a current block. Furthermore, when coding or decoding the current block Blk0, the picture Pic11 and the picture Pic14 are referred to as a reference picture.

In this case, a block Blk3 in the reference picture Pic11 indicated by a motion vector MV3 of the current block Blk0 and a block Blk2 in the reference picture Pic14 indicated by another motion vector MV2 of the current block Blk0 are used for generating a predictive image by the weighted prediction in the implicit mode.

Furthermore, a temporal distance t3 between the picture Pic13 including the current block Blk0 and the reference picture Pic11 and a temporal distance t2 between the picture Pic13 and the reference picture Pic14 are used for generating a predictive image by the weighted prediction in the implicit mode.

Stated differently, the predictive image Blk0' for the current block Blk0 is calculated by Blk0'=(Blk3×t2+Blk2×t3)/(t3+t2).

As described above, in the weighted prediction in the implicit mode, the relationship between the temporal distances in the picture including the current block and the two reference pictures are implicitly used as the weighted coefficient for the block in the reference picture. Furthermore, the longer the temporal distance between the picture including the current block and the reference picture, the smaller the contribution of the reference picture to the predictive image, and the shorter the distance between the picture including the current block and the reference picture, the larger the contribution of the reference picture to the predictive image.

With this, even in a moving image such as fade-in (an image in which a dark image gradually becomes brighter) or fade-out (an image in which a bright image gradually becomes darker), it is possible to prevent degradation in image quality and provide coding efficiency by using an image in which a reference picture is adaptively multiplied by the weighted coefficient for prediction.

However, the inventors realized that an appropriate predictive image cannot be generated when coding and decoding a multi-view video in the image coding method and an image decoding method according to the non-patent literature 1.

In multi-view video coding (MVC), a multi-view video including multiple views is coded or decoded. Here, when coding or decoding the current block included in one of the views, there is a case where a picture included in another view is referred. In this case, the temporal distance between the current block and the reference picture, that is, the temporal distance between the current picture which is a picture including the current block and the reference picture is 0. For example, the temporal distance t1, t2, or t3 used for the expressions illustrated in FIG. 1A and FIG. 1B is 0. As a result, at least one of the two reference pictures is not used for the weighted prediction, resulting in generation of a predictive image which is not appropriate. Furthermore, when the temporal distances for the two reference pictures are 0, the denominators of the expressions in FIG. 1A and FIG. 1B are 0, making it impossible to calculate the predictive image. As a result, the image quality is degraded, reducing the coding efficiency.

In order to solve the problem, the image coding method according to an aspect of the present disclosure is an image coding method for coding, for each block, a picture composing a multi-view video having a first view and a second view, the image coding method including: determining a temporal distance between a current picture to be coded and a first reference picture to which a current block to be coded included in the current picture refers as a first temporal distance; determining a temporal distance between the first reference picture and a second reference picture to which the current block refers as a second temporal distance; judging whether or not the first temporal distance and the second temporal distance satisfy a predetermined condition, and calculating a first weight for the first reference picture and a second weight for the second reference picture based on a result of the judgment; and generating a predictive image for the current block by adding a first block included in the first reference picture and a second block included in the second reference picture, the first block being weighted by the first weight, and the second block being weighted by the second weight, in which the first block and the second block are referred to by the current block.

With this, according to whether or not the first temporal distance and the second temporal distance satisfy a certain condition, appropriate first weight and second weight are calculated. As a result, it is possible to generate a predictive image having a small predictive error from the current block. Accordingly, it is possible to increase the coding efficiency which suppresses the degradation in image quality.

Furthermore, the predetermined condition may include at least one of a first condition where the first temporal distance and the second temporal distance are equal and a second condition where a value of the first temporal distance is 0, and when at least one of the first condition and the second condition is satisfied, the first block with the first weight and the second block with the second weight are not added. Stated differently, the predetermined condition includes at least one of a first condition where the first temporal distance and the second temporal distance are equal and a second condition where a value of the first temporal distance is 0, and when at least one of the first condition and the second condition is satisfied, the first weight and the second weight are set to be equal when calculating the first weight and the second weight.

With this, even when the current block and the reference picture belong to different views, it is possible to set the first weight and the second weight appropriately, improving the coding efficiency.

Furthermore, the predetermined condition may include a first condition where the first temporal distance and the second temporal distance are equal and a second condition where a value of the first temporal distance is 0, when calculating the first weight and the second weight, (i) when the first condition is satisfied, an inter-view distance between the current picture and the second reference picture is added to the second temporal distance, and (ii) when the first condition is not satisfied but the second condition is satisfied, an inter-view distance between the current picture and the first reference picture is set as the first temporal distance.

With this, even when the current block and the reference picture belong to different views, it is possible to set the first weight and the second weight appropriately, improving the coding efficiency.

In order to solve the problem, the image decoding method according to an aspect of the present disclosure is an image decoding method for decoding, for each block, a picture composing a multi-view video having a first view and a second view, the image decoding method including: determining a temporal distance between a current picture to be decoded and a first reference picture to which a current block to be decoded included in the current picture refers as a first temporal distance; determining a temporal distance between the first reference picture and a second reference picture to which the current block refers as a second temporal distance; judging whether or not the first temporal distance and the second temporal distance satisfy a predetermined condition, and calculating a first weight for the first reference picture and a second weight for the second reference picture based on a result of the judgment; and generating a predictive image for the current block by adding a first block included in the first reference picture and a second block included in the second reference picture, the first block being weighted by the first weight, and the second block being weighted by the second weight, in which the first block and the second block are referred to by the current block.

With this, according to whether or not the first temporal distance and the second temporal distance satisfy a certain condition, appropriate first weight and second weight are calculated. As a result, it is possible to generate a predictive image having a small predictive error from the current block. Accordingly, a bitstream with improved coding efficiency which suppresses the degradation in image quality can be appropriately decoded.

Furthermore, the predetermined condition may include at least one of a first condition where the first temporal distance and the second temporal distance are equal and a second condition where a value of the first temporal distance is 0, and when at least one of the first condition and the second condition is satisfied, the first block with the first weight and the second block with the second weight are not added. Stated differently, the predetermined condition includes at least one of a first condition where the first temporal distance and the second temporal distance are equal and a second condition where a value of the first temporal distance is 0, and when at least one of the first condition and the second condition is satisfied, the first weight and the second weight are set to be equal when calculating the first weight and the second weight.

With this, even when the current block and the reference picture belong to different views, it is possible to set the first weight and the second weight appropriately, and a bitstream with the improved coding efficiency can be appropriately decoded.

Furthermore, the predetermined condition may include a first condition where the first temporal distance and the second temporal distance are equal and a second condition where a value of the first temporal distance is 0, when calculating the first weight and the second weight, (i) when the first condition is satisfied, an inter-view distance between the current picture and the second reference picture is added to the second temporal distance, and (ii) when the first condition is not satisfied but the second condition is satisfied, an inter-view distance between the current picture and the first reference picture is set as the first temporal distance.

With this, even when the current block and the reference picture belong to different views, it is possible to set the first weight and the second weight appropriately, and a bitstream with improved the coding efficiency can be appropriately decoded.

The following shall specifically describe the embodiments with reference to the drawings.

Each of the exemplary embodiments described below show a general or specific example. Numerical values, shapes, material, components, arrangement and connection of components, steps, order of steps described in the following embodiments are merely examples, and do not intend to limit the scope of Claims. In addition, among the components in the embodiments, the components not recited in an independent claim defining the most generic concept shall be treated as optional components.

Embodiment 1

FIG. 2 is a block diagram of an image coding apparatus according the embodiment 1.

An image coding apparatus 100 is an apparatus for coding a multi-view video having a base view and a non-base view for each block, and includes a base view coding unit 110, a storage unit 140, a non-base view coding unit 150, and a multiplexing unit 190. For example, a base view is composed of pictures seen by the left eye of a viewer, and a non-base view is composed of pictures seen by the right eye of the viewer. The reflection of the pictures in the base view and the non-base view in the eyes of the viewer allows the viewer to view the video as a stereoscopic image.

The base view coding unit 110 codes the base view, and outputs the base coded stream generated by the coding to the multiplexing unit 190. The base view coding unit 110 also stores a locally decoded image of the base view in the storage unit 140. The storage unit 140 is a memory for storing the locally decoded image having a size of a picture as a reference picture used for compensating disparity. The non-base view coding unit 150 codes a non-base view by referring to the locally decoded image of the base view (reference picture) stored in the storage unit 140 and outputs a non-base coded stream generated by the coding to the multiplexing unit 190. The multiplexing unit 190 generates a multiplexed stream by multiplexing the base coded stream and the non-base coded stream and outputs the multiplexed stream.

FIG. 3 is a block diagram of the base view coding unit 110.

The base view coding unit 110 includes a subtractor 111, an orthogonal transform unit 112, a quantization unit 113, an entropy coding unit 114, an inverse quantization unit 115, an inverse orthogonal transform unit 116, an adder 117, a deblocking filter 118, a memory 119, an intra prediction unit 120, a motion compensation unit 121, a motion estimation unit 122, and a switch 123.

The subtractor 111 obtains the base view and obtains a predictive image from the switch 123. Subsequently, the subtractor 111 generates a differential image by subtracting the predictive image from the current block included in the base view.

The orthogonal transform unit 112 transforms a differential image generated by the subtractor 111 into a coefficient block including frequency coefficients by performing orthogonal transform (frequency transform) such as discrete cosine transform. The quantization unit 113 generates a quantized coefficient block by quantizing the frequency coefficients in the coefficient block.

The inverse quantization unit 115 performs inverse quantization on the coefficient block quantized by the quantization unit 113. The inverse orthogonal transform unit 116 generates a decoded differential image by performing inverse orthogonal transform (inverse frequency conversion) such as inverse discrete cosine transform on the frequency coefficients in the inverse-quantized coefficient block.

The adder 117 obtains the predictive image from the switch 123, and generates a locally decoded image (reconstructed image) by adding the predictive image and the decoded differential image generated by the inverse orthogonal transform unit 116.

Deblocking filter 118 removes distortion between the blocks of the locally decoded image generated by the adder 117, and stores the locally decoded image in the memory 119 and the storage unit 140. The memory 119 is a memory for storing the locally decoded image having a size of a picture as a reference picture used for motion compensation.

The intra prediction unit 120 generates a predictive image (intra predictive image) by performing intra prediction on the current block using the locally decoded image generated by the adder 117.

The motion estimation unit 122 estimates a motion vector with regard to the current block included in the base view, and outputs the estimated motion vector to the motion compensation unit 121 and the entropy coding unit 114.

The motion compensation unit 121 refers to the reference picture stored in the memory 119, and performs motion compensation on the current block using the motion vector estimated by the motion estimation unit 122. The motion compensation unit 121 generates a predictive image (inter predictive image) of the current block by performing the motion compensation.

When the current block is inter-predictive coded, the switch 123 outputs a predictive image (intra predictive image) generated by the intra prediction unit 120 to the subtractor 111 and the adder 117. When the current block is inter-predictive coded, the switch 123 outputs the predictive image (inter predictive image) generated by the motion compensation unit 121 to the subtractor 111 and the adder 117.

The entropy coding unit 114 generates the base coded stream by performing entropy coding (variable length coding) on the coefficient block quantized by the quantization unit 113 and the motion vector estimated by the motion estimation unit 122.

Figure 4:
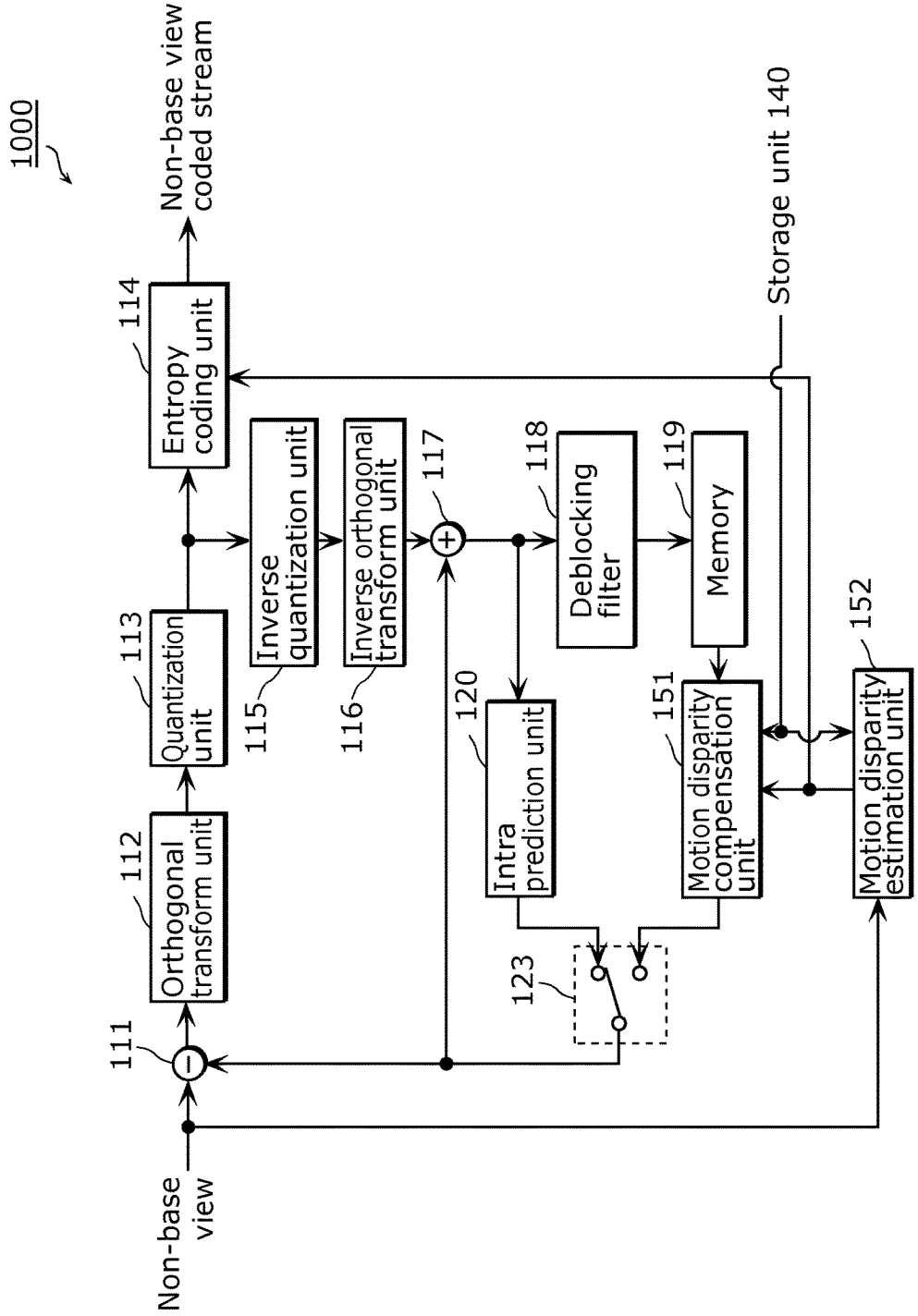
FIG. 4 is a block diagram of a non-base view coding unit according to the embodiment 1.

FIG. 4 is a block diagram of the base view coding unit 150.

The non-base view coding unit 150 codes the non-base view in the same manner as the base view coding unit 110 coding the base view. Here, the non-base view coding unit 150 codes a non-base view while referring to the locally decoded image having a size of a picture generated by the base view coding unit 110 and stored in the storage unit 140 as a reference picture.

The non-base view coding unit 150 includes the subtractor 111, the orthogonal transform unit 112, the quantization unit 113, the entropy coding unit 114, the inverse quantization unit 115, the inverse orthogonal transform unit 116, the adder 117, the deblocking filter 118, the memory 119, the intra prediction unit 120, a motion disparity compensation unit 151, a motion disparity estimation unit 152, and the switch 123. Stated differently, the non-base view coding unit 150 includes all of the components of the base view coding unit 120 except for the motion compensation unit 121 and the motion estimation unit 122, and includes the motion disparity compensation unit 151 and the motion disparity estimation unit 152 instead of the motion compensation unit 121 and the motion estimation unit 122.

The motion disparity estimation unit 152 estimates at least one of a motion vector or a disparity vector for the current block included in the non-base view. Furthermore, the motion disparity estimation unit 152 outputs the estimated vector to the motion disparity compensation unit 151 and the entropy coding unit 114.

To put it differently, if the reference picture used referred to for coding the current block is a non-base view image stored in the memory 119, the motion disparity estimation unit 152 estimates a motion vector of the current block with respect to the reference picture. In contrast, if the reference picture referred to for coding the current block is a base view image stored in the storage unit 140, the motion disparity estimation unit 152 estimates a disparity vector of the current block with respect to the reference picture.

The motion disparity compensation unit 151 performs at least one of the motion compensation and disparity compensation on the current block included in the non-base view.

More specifically, if the one or two reference pictures referred to for coding the current block is a non-base view image stored in the memory 119, the motion disparity compensation unit 151 performs motion compensation on the current block by referring to the reference pictures and using one or two motion vectors estimated by the motion disparity estimation unit 152. By performing the motion compensation, the motion disparity compensation unit 151 generates a predictive image of the current block. Furthermore, if the one or two reference pictures referred to for coding the current block is a base view image stored in the storage unit 140, the motion disparity compensation unit 151 performs disparity compensation on the current block by using one or two disparity vectors estimated by the motion disparity estimation unit 152 as well as referring to the reference pictures. By performing the motion compensation, the motion disparity compensation unit 151 generates a predictive image of the current block.

Furthermore, if one of the two pictures referred to for coding the current block is a non-base view image stored in the memory 119, and the other of the two images is a base view image stored in the storage unit 140, the motion disparity compensation unit 151 refers to these reference pictures and uses a motion vector and a disparity vector estimated by the motion disparity estimation unit 152. With this, the motion disparity compensation unit 151 performs motion compensation and disparity compensation on the current block. By performing the motion compensation and the disparity compensation, the motion disparity compensation unit 151 generates a predictive image of the current block.

Here, if two reference pictures are referred to for coding the current block in the non-base view, the motion disparity compensation unit 151 according to the embodiment performs weighted prediction in the implicit mode as necessary.

Figure 5:
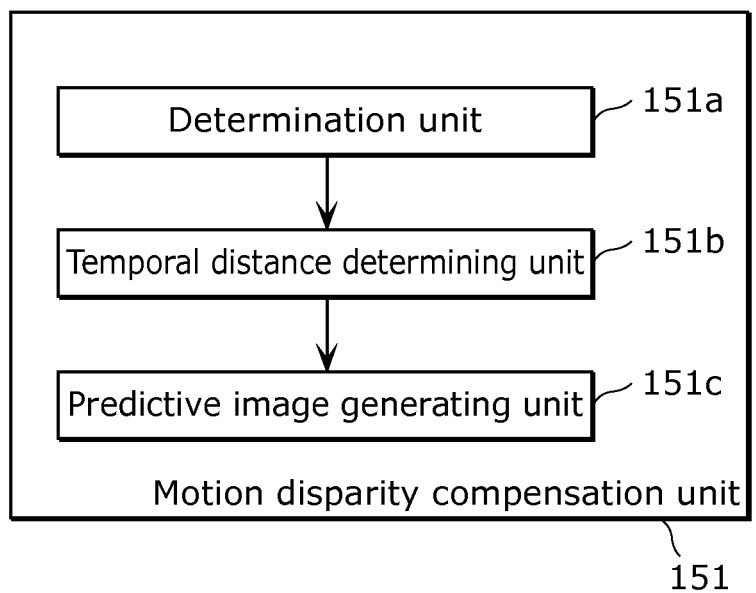
FIG. 5 is a block diagram illustrating functional configuration in the motion disparity compensation unit for the weighted prediction in the implicit mode according to the embodiment 1.

FIG. 5 is a block diagram illustrating functional configuration in the motion disparity compensation unit 151 regarding the weighted prediction in the implicit mode.

The motion disparity compensation unit 151 includes a determination unit 151a, a temporal distance determining unit 151b, and a predictive image generating unit 151c.

The determination unit 151a determines whether or not a reference picture for the current block is included in the non-base view including the current block.

When the determination unit 151a determines that the reference picture is included, the temporal distance determining unit 151b determines an actual temporal distance between the current block and its reference picture as a temporal distance used for the weighted prediction. If the determination unit 151a determines that the reference picture is not included, the temporal distance determining unit 151b determines a value greater than 0 as the temporal distance used for the weighted prediction instead of the actual temporal distance.

The predictive image generating unit 151c generates a predictive image for the current block by performing weighted addition according to the temporal distance determined by the temporal distance determining unit 151b on the first block included in the reference picture and the second block included in the other reference picture for the current block. Here, the first block is a block at a position indicated by the first vector of the current block, and the second block is a block at a position indicated by the second vector of the current block.

Figure 6A:
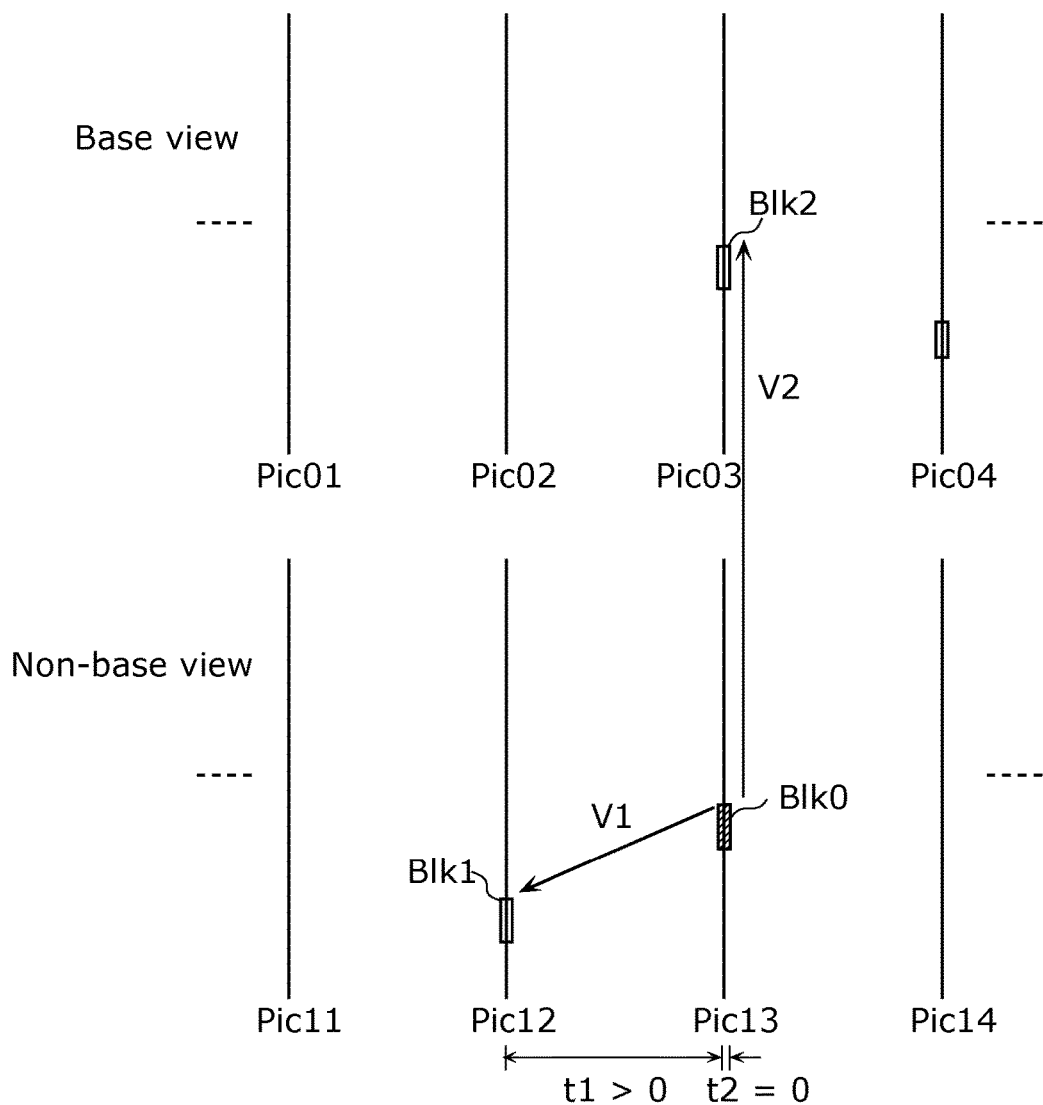
FIG. 6A is a diagram illustrating an example of weighted prediction in the implicit mode by the motion disparity compensation unit in the image coding apparatus according to the embodiment 1.

FIG. 6A illustrates an example of the weighted prediction in the implicit mode by the motion disparity compensation unit 151.

For example, as illustrated in FIG. 6A, pictures Pic01, Pic02, Pic03, and Pic04 are arranged in the base view in display order, and pictures Pic11, Pic12, Pic13, and Pic14 are arranged in the non-base view in display order. Here, the picture order counts (POC) of the picture Pic01 and the picture Pic11 are the same. Similarly, the POC of the picture Pic02 and the picture Pic12 are the same, the POC of the picture Pic03 and the picture Pic13 are the same, and the POC of the picture Pic04 and the picture Pic14 are the same.

In this state, the block Blk0 included in the picture Pic13 in the non-base view is coded as the current block. When coding the current block Blk0, the picture Pic12 included in the non-base view and the picture Pic03 included in the base view are referred to as the reference pictures.

In this case, the determining unit 151a in the motion disparity compensation unit 151 determines that one of the two reference pictures Pic12 and Pic03, Pic12 is included in the non-base view. As a result, the temporal distance determining unit 151b in the motion disparity compensation unit 151 determines an actual temporal distance t1 (t1>0) between the current block Blk0 and the reference picture Pic12 as a temporal distance T1 used for the weighted prediction.

Furthermore, the determining unit 151a determines that the other of the two reference pictures Pic12 and Pic03, that is, Pic03 is not included in the non-base view, that is, included in the base view. Here, since the POC of the picture Pic13 and the reference picture Pic03 is the same, the actual temporal distance t2 between the current block Blk0 and the reference picture Pic03 is 0. Accordingly, the temporal distance determining unit 151b in the motion disparity compensation unit 151 determines the temporal distance T2 used for the weighted prediction as "1", instead of the actual temporal distance t2 (t2=0). Alternatively, the motion disparity compensation unit 151 determines the temporal distance t1 as the temporal distance T2.

Next, the motion disparity compensation unit 151 calculates a predictive image Blk0' in the current block Blk0, using an operational expression Blk0'=(Blk1×T2+Blk2×T1)/(T1+T2). Note that, Blk1 is an image of the first block in the reference picture Pic12 indicated by the motion vector V1 of the current block Blk0. Note that, Blk2 is an image of the second block in the reference picture Pic03 indicated by the motion vector V2 of the current block Blk0.

Stated differently, when the temporal distance T1=t1 and the temporal distance T2=1, the motion disparity compensation unit 151 calculates the predictive image Blk0' of the current block Blk0 by Blk0'=(Blk1+Blk2×t1)/(t1+1). Accordingly, if the temporal distance T2=1, the reference picture Pic03 is used for the weighted prediction as a reference picture closest to the current block Blk0. Accordingly, an image similar to the block Blk2 included in the reference picture Pic03 can be appropriately generated as the predictive image.

Stated differently, when the temporal distance T1=t1 and the temporal distance T2=1, the motion disparity compensation unit 151 calculates the predictive image Blk0' of the current block Blk0 by Blk0'=(Blk1+Blk2)/2. Accordingly, if the temporal distance T2=t1, the weighted prediction is performed assuming the temporal distances between the current block and the reference pictures Pic03 and Pic12 are equal. As a result, it is not necessary to use different temporal distances as in the regular bi-prediction, and thus the processing load on the weighted prediction can be reduced.

As described above, according to the embodiment 1, when the current block included in the non-base view in the multi-view video is coded by the weighed prediction using two reference pictures, whether or not the reference picture is included in the non-base view is determined. Subsequently, if the reference picture is determined not to be included in the non-base view, a value greater than 0 is used for the weighted prediction instead of the actual temporal distance between the current block and the reference picture for the current block. Accordingly, an appropriate predictive image is generated using the two reference pictures. Consequently, it is possible to prevent the degradation in image quality, improving the coding efficiency.

Figure 6B:
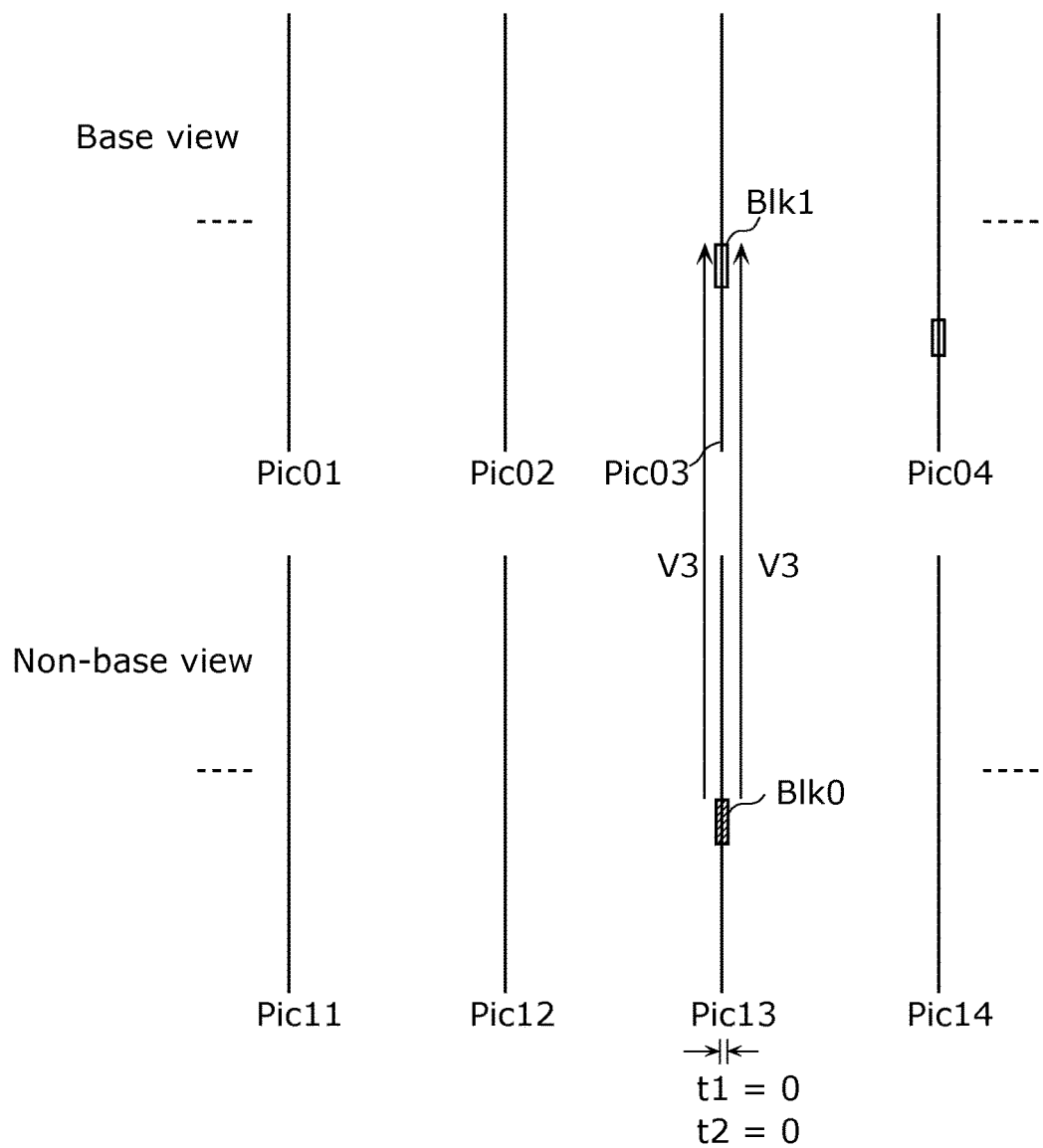
FIG. 6B is a diagram illustrating another example of weighted prediction in the implicit mode by the motion disparity compensation unit according to the embodiment 1.

FIG. 6B illustrates another example of the weighted prediction in the implicit mode by the motion disparity compensation unit 151.

For example, as illustrated in FIG. 6A, pictures Pic01, Pic02, Pic03, and Pic04 are arranged in the base view in display order, and pictures Pic11, Pic12, Pic13, and Pic14 are arranged in the non-base view.

In this state, the block Blk0 included in the picture Pic13 in the non-base view is coded as the current block. When coding the current block Blk0, the picture Pic03 included in the base view is referred to twice as the two reference pictures.

In this case, the determining unit 151a in the motion disparity compensation unit 151 determines that the reference picture Pic03 is not included in the non-base view, that is, included in the base view. Here, since the POC of the picture Pic13 and the reference picture Pic03 is the same, the actual temporal distances t1 and t2 between the current block Blk0 and the reference picture Pic03 are 0. Accordingly, the temporal distance determining unit 151b in the motion disparity compensation unit 151 determines the temporal distance T1 used for the weighted prediction as "1", instead of the actual temporal distance t1 (t1=0). Accordingly, the temporal distance determining unit 151b determines the temporal distance T2 used for the weighted prediction as "1", instead of the actual temporal distance t2 (t2=0).

Next, the motion disparity compensation unit 151 calculates a predictive image Blk0' of the current block Blk0, using an operational expression Blk0'=(Blk1×T2+Blk1×T1)/(T1+T2). Note that, Blk1 is an image in the block in the reference picture Pic03 indicated by the two disparity vectors V3 in the current block Blk0. Since the temporal distances T1 and T2=1, the motion disparity compensation unit 151 calculates the predictive image Blk0' of the current block Blk0 using Blk0'=(Blk1+Blk1)/2.

As described above, in the embodiment 1, when neither of the two reference pictures is included in the non-base view, the weighted prediction is performed assuming that the temporal distances between the current block and the two reference pictures are equal. As a result, it is not necessary to use different temporal distances as in the regular bi-prediction, and thus the processing load on the weighted prediction can be reduced.

Figure 7:
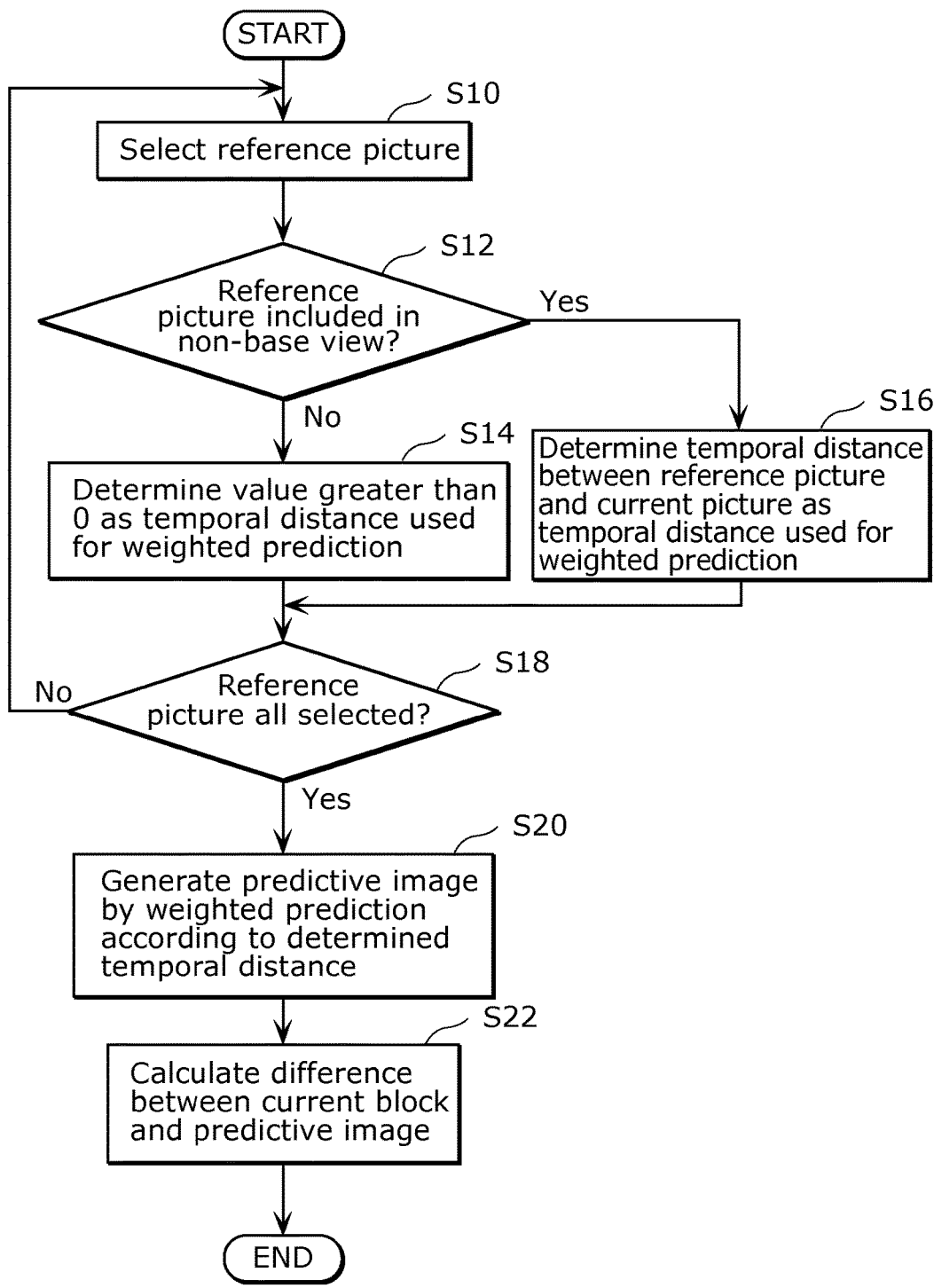
FIG. 7 is a flowchart illustrating coding of a block accompanying the weighted prediction in the implicit mode according to the embodiment 1.

FIG. 7 is a flowchart illustrating coding of a block accompanying the weighted prediction in the implicit mode. First, the determining unit 151a in the motion disparity compensation unit 151 selects one of the two reference pictures referred to for coding the current block as the first reference picture (step S10).

Next, the determining unit 151a determines whether or not the first reference picture selected in step S10 is included in the non-base view including the current block (step S12).

Here, when the determination unit 151a determines that the first reference picture is included in the non-base view (yes in step S12), the temporal distance determining unit 151b determines the actual temporal distance t1 between the current block and the reference picture as the temporal distance T1 used for the weighted prediction (step S16). In contrast, if the determination unit 151a determines that the first reference picture is not included in the non-base view (no in step S12), the temporal distance determining unit 151b determines a value greater than 0 as the temporal distance T1 used for the weighted prediction, instead of the actual temporal distance t1 (step S14).

Next, the determination unit 151a determines whether or not both of the two reference pictures are selected (step S18). Here, if the determination unit 151a determines that not all of the two reference pictures are selected (no in step S18), the determination unit 151a selects the remaining unselected reference picture as the second reference picture (step S10). Subsequently, the determination unit 151a and the temporal distance determining unit 151b determine the temporal distance T2 used for the weighted prediction for the second reference picture in the same manner as the temporal distance T1, by performing the process in steps S12, S14, and S16 described above on the second reference picture.

Next, the predictive image generating unit 151c in the motion disparity compensation unit 151 performs weighted addition on the first block and the second block according to the temporal distances T1 and T2. The first block is indicated by the first vector (motion vector or disparity vector) of the current block included in the first reference picture, and the second block is indicated by the second vector (motion vector or disparity vector) of the current block. With this, the motion disparity compensation unit 151 generates a predictive image for the current block (step S20).

Subsequently, the subtractor 111 calculates a difference between the current block and a predictive image (step S22).

Figure 8:
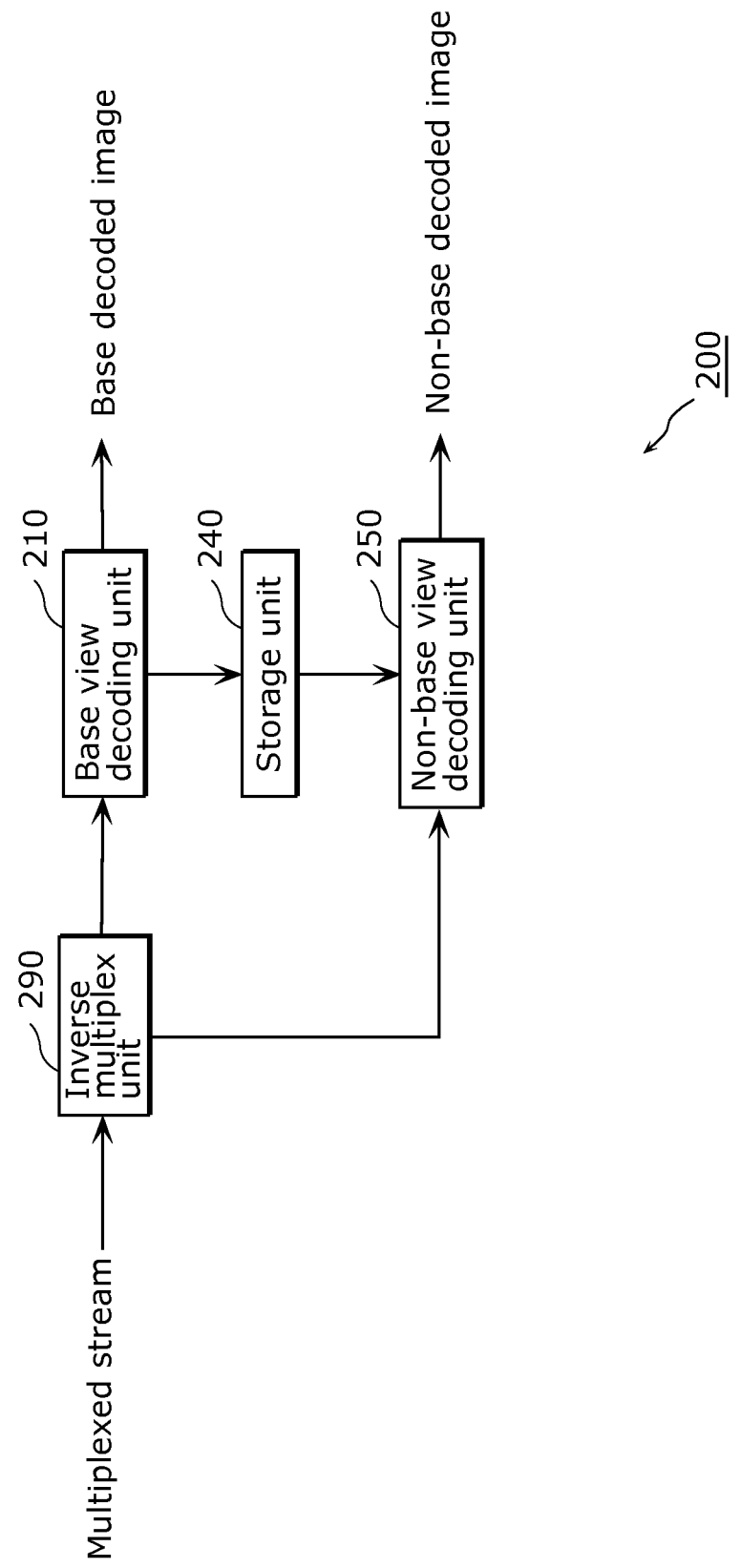
FIG. 8 is a block diagram of an image decoding apparatus according to the embodiment 1.

FIG. 8 is a block diagram of an image decoding apparatus according the embodiment 1.

The image decoding apparatus 200 is an apparatus for decoding a multiplexed stream generated by the image coding apparatus 100 for each block, and includes a base view decoding unit 210, a storage unit 240, a non-base view decoding unit 250, and an inverse multiplexing unit 290.

The inverse multiplexing unit 290 separates the base coded stream and the non-base coded stream from the multiplexed stream by performing inverse multiplexing on the multiplexed stream. The base view decoding unit 210 generates a base decoded image by decoding the base coded stream, and outputs the base decoded image. The base view decoding unit 210 also stores the generated base decoded image in the storage unit 240. The storage unit 240 is a memory for storing the base decoded image having a size of a picture as a reference picture used for compensating disparity. The non-base view decoding unit 250 decodes the non-base coded stream referring to the base decoded image stored in the storage unit 240, and outputs a non-base decoded image generated by the decoding.

Figure 9:
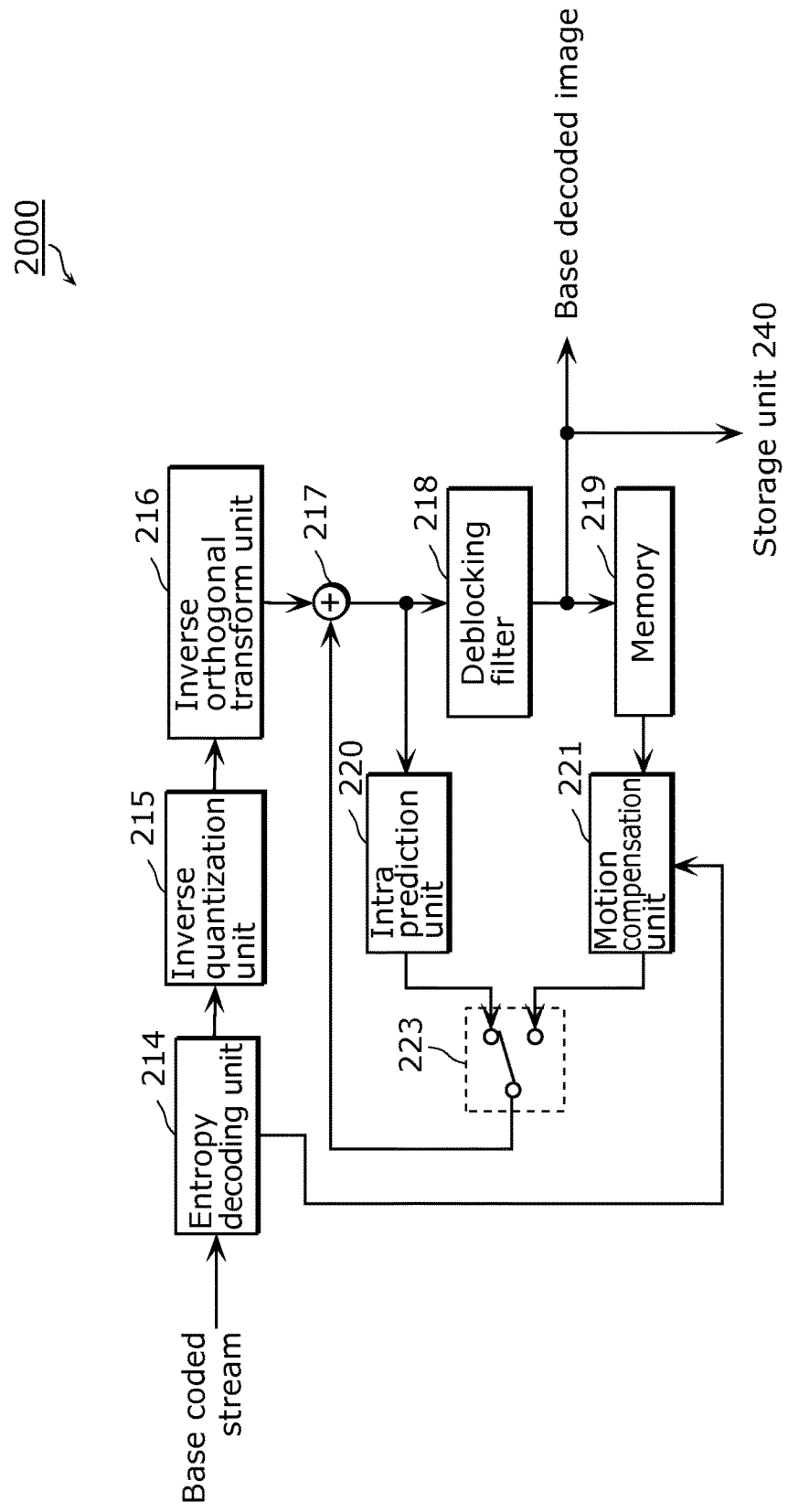
FIG. 9 is a block diagram of a base view decoding unit according to the embodiment 1.

FIG. 9 is a block diagram of the base view decoding unit 210.

The base view decoding unit 210 includes the entropy decoding unit 214, the inverse quantization unit 215, the inverse orthogonal transform unit 216, the adder 217, the deblocking filter 218, the memory 219, the intra prediction unit 220, the motion compensation unit 221, and the switch 223.

The entropy decoding unit 214 obtains the base coded stream, and performs entropy decoding (variable length decoding) on the base coded stream.

The inverse quantization unit 215 performs inverse quantization on the quantized coefficient block generated by the entropy decoding by the entropy decoding unit 214. The inverse orthogonal transform unit 216 generates a decoded differential image by performing inverse orthogonal transform (inverse frequency conversion) such as inverse discrete cosine transform on the frequency coefficients in the inverse-quantized coefficient block.

The adder 2104 obtains the predictive image from the switch 223, and generates a base decoded image (reconstructed image) by adding the predictive image and the decoded differential image generated by the inverse orthogonal transform unit 216.

The deblocking filter 218 removes block distortion in the base decoded image generated by the adder 217, stores the base decoded image in the memory 219, and outputs the base decoded image. The deblocking filter 218 stores the base decoded image in the storage unit 240. The memory 219 is a memory for storing the base decoded image having a size of a picture as a reference picture used for motion compensation.

The intra prediction unit 220 generates a predictive image (intra predictive image) by performing intra prediction on the current block using the base decoded image generated by the adder 217.

The motion compensation unit 221 performs motion compensation on the current block by referring to a reference picture stored in the memory 219 and using a motion vector generated by entropy decoding by the entropy decoding unit 214. The motion compensation unit 221 generates a predictive image (inter predictive image) for the current block by the motion compensation.

When the current block is intra-predictive coded, the switch 223 outputs a predictive image (intra predictive image) generated by the intra prediction unit 220 to the adder 217. When the current block is inter-predictive coded, the switch 223 outputs the predictive image (inter predictive image) generated by the motion compensation unit 221 to the adder 217.

Figure 10:
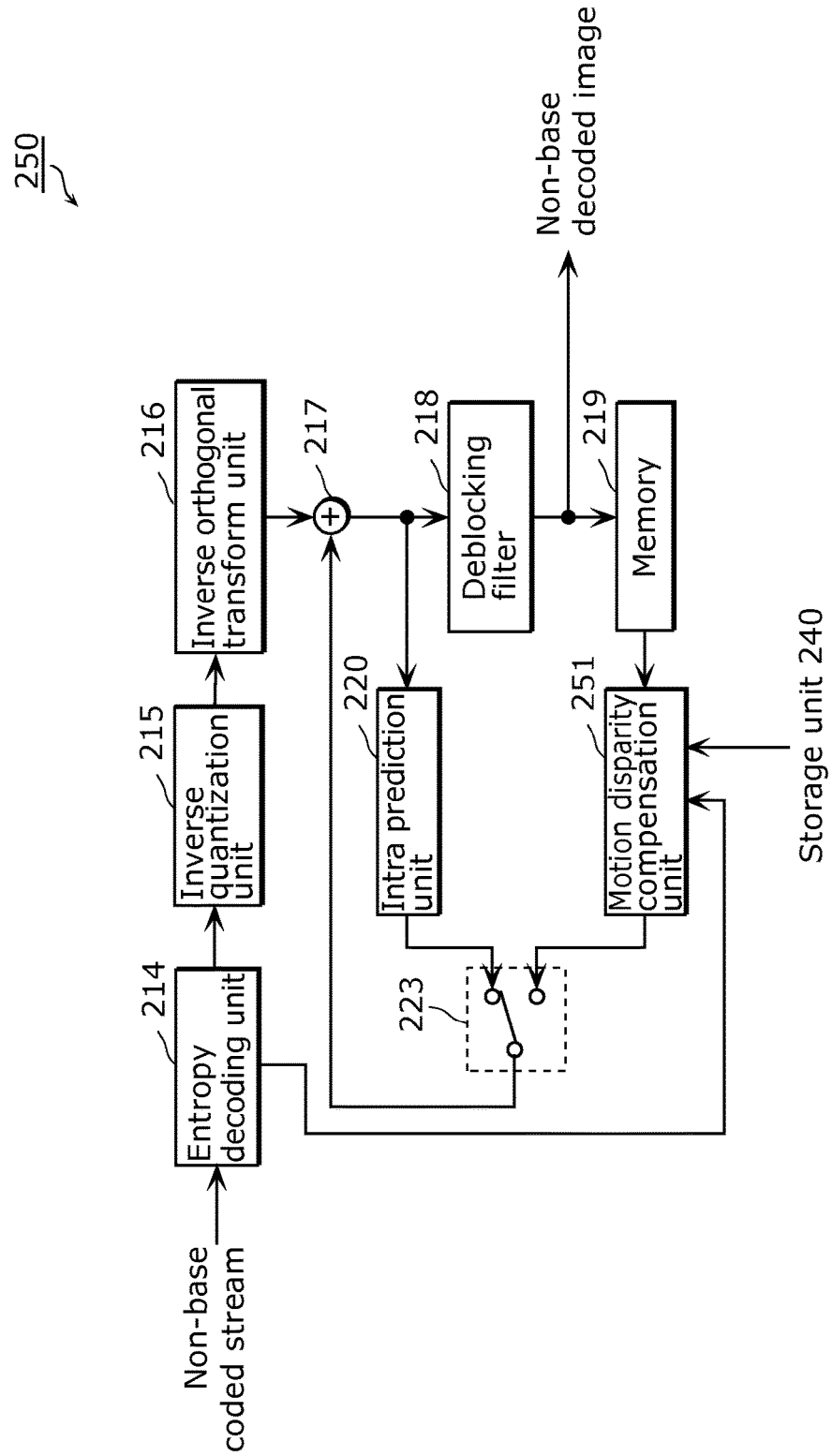
FIG. 10 is a block diagram of a non-base view decoding unit according to the embodiment 1.

FIG. 10 is a block diagram of the non-base view decoding unit 250.

The non-base view decoding unit 250 decodes a non-base coded stream in the same manner as the base view decoding unit 210 decoding the base coded stream. Here, the non-base view decoding unit 250 decodes a non-base coded stream while referring to the base decoded image having a size of a picture generated by the base view decoding unit 210 and stored in the storage unit 240 as the reference picture, and decodes the non-base coded stream.

The non-base view decoding unit 250 includes the entropy decoding unit 214, the inverse quantization unit 215, the inverse orthogonal transform unit 216, the adder 217, the deblocking filter 218, the memory 219, the intra prediction unit 220, the motion compensation unit 251, and the switch 223. To put it differently, the non-base view decoding unit 250 includes all of the components of the base view decoding unit 210 except for the motion compensation unit 221, and includes a motion disparity compensation unit 251 instead of the motion compensation unit 221.

The motion disparity compensation unit 251 performs at least one of the motion compensation and disparity compensation on the current block included in the non-base view.

Stated differently, if the one or two reference pictures referred to for decoding the current block is a non-base image stored in the memory 219, the motion disparity compensation unit 251 performs motion compensation on the current block by referring to the reference pictures and using the one or two motion vectors generated by the entropy decoding. By performing the motion compensation, the motion disparity compensation unit 251 generates a predictive image of the current block. Furthermore, if the one or two reference pictures referred to for decoding the current block is a base view image stored in the storage unit 240, the motion disparity compensation unit 251 performs disparity compensation on the current block by referring to the reference picture and using one or two disparity vectors generated by the entropy decoding. By performing the motion compensation, the motion disparity compensation unit 251 generates a predictive image of the current block.

Furthermore, if one of the two reference pictures referred to for decoding the current block is a non-base view image stored in the memory 219 and the other or the two reference pictures is a base view image stored in the storage unit 240, the motion disparity compensation unit 251 performs motion compensation and disparity compensation on the current block by referring to the reference pictures and using the motion vector and the disparity vector generated by the entropy decoding. By performing the motion compensation and the disparity compensation, the motion disparity compensation unit 251 generates a predictive image of the current block.

Here, if two reference pictures are referred to for decoding the current block in the non-base view, the motion disparity compensation unit 251 according to the embodiment performs weighted prediction in the implicit mode as necessary. The weighted prediction in the implicit mode by the motion disparity compensation unit 251 is the same as the weighted prediction in the implicit mode by the motion disparity compensation unit 151 in the non-base view coding unit 150.

Figure 11:
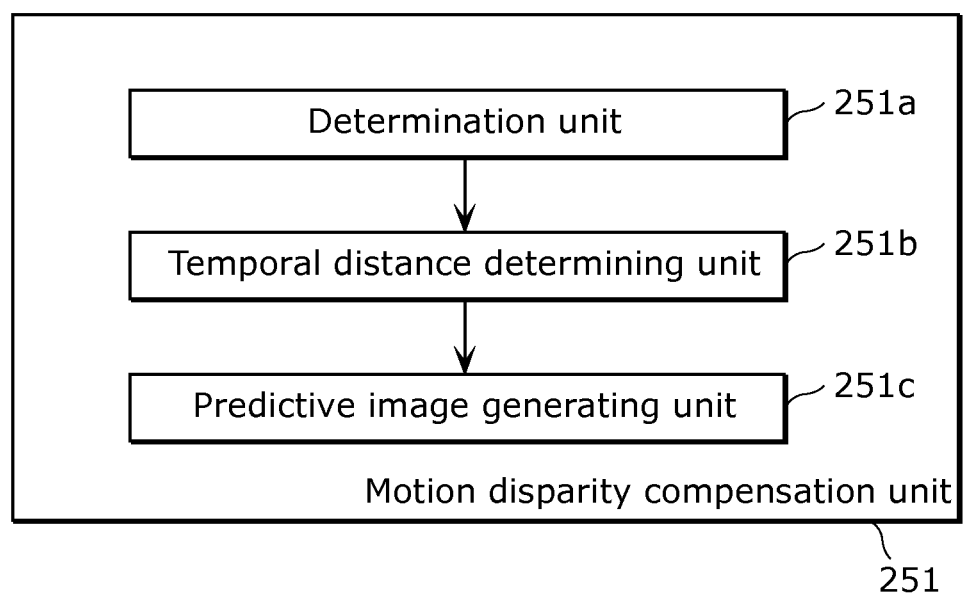
FIG. 11 is a block diagram illustrating functional configuration in the motion disparity compensation unit for the weighted prediction in the implicit mode in the image decoding apparatus according to the embodiment 1.

FIG. 11 is a block diagram illustrating functional configuration in the motion disparity compensation unit 251 for the weighted prediction in the implicit mode.

The motion disparity compensation unit 251 includes a determination unit 251a, a temporal distance determining unit 251b, and a predictive image generating unit 251c.

The determination unit 251a determines whether or not a reference picture for the current block is included in the non-base view including the current block.

When the determination unit 251a determines that the reference picture is included, the temporal distance determining unit 251b determines an actual temporal distance between the current block and its reference picture as a temporal distance used for the weighted prediction. If the determination unit 251a determines that the reference picture is not included, the temporal distance determining unit 251b determines a value greater than 0 as the temporal distance used for the weighted prediction instead of the actual temporal distance.

The predictive image generating unit 251c generates a predictive image for the current block by performing weighted addition according to the temporal distance determined by the temporal distance determining unit 251b on the first block included in the reference picture and the second block included in the other reference picture for the current block. Here, the first block is a block at a position indicated by the first vector of the current block, and the second block is a block at a position indicated by the second vector of the current block.

The motion disparity compensation unit 251 generates the predictive image in the same manner as the weighted prediction in the implicit mode by the motion disparity compensation unit 151 illustrated in FIG. 6A and FIG. 6B.

Figure 12:
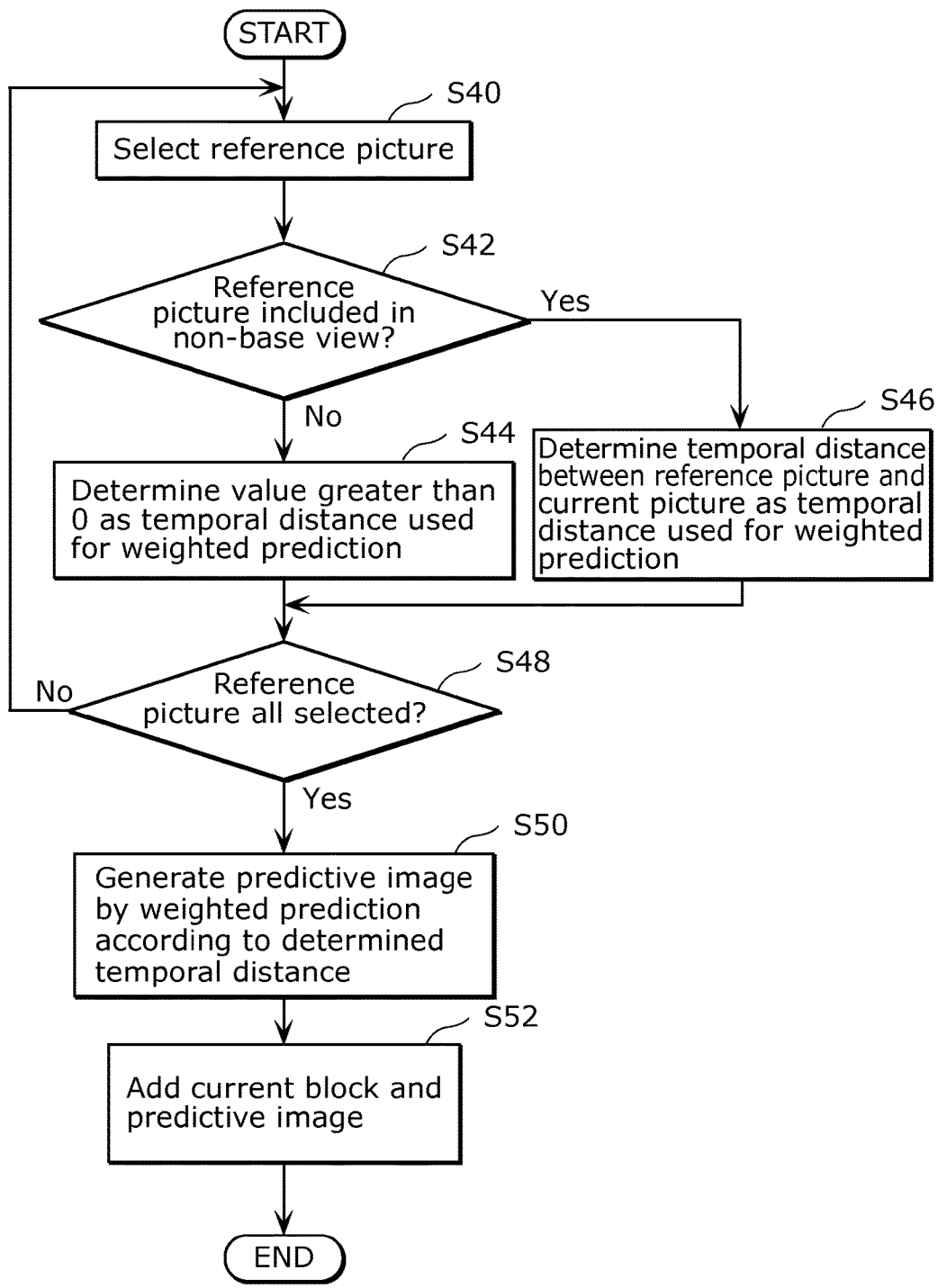
FIG. 12 is a flowchart illustrating decoding of a block accompanying the weighted prediction in the implicit mode according to the embodiment 1.

FIG. 12 is a flowchart illustrating decoding of a block accompanying the weighted prediction in the implicit mode.

First, the determining unit 251a in the motion disparity compensation unit 251 selects one of the two reference pictures referred to for decoding the current block as the first reference picture (step S40).

Next, the determining unit 251a determines whether or not the first reference picture selected in step S40 is included in the non-base view including the current block (step S42).

Here, when the determination unit 251a determines that the first reference picture is included in the non-base view (yes in step S42), the temporal distance determining unit 251b determines the actual temporal distance t1 between the current block and the first reference picture as the temporal distance T1 used for the weighted prediction (step S46). In contrast, if the determination unit 251a determines that the first reference picture is not included in the non-base view (no in step S42), the temporal distance determining unit 251b determines a value greater than 0 as the temporal distance T1 used for the weighted prediction, instead of the actual temporal distance t1 (step S44).

Next, the determination unit 251a determines whether or not both of the two reference pictures are selected (step S48). Here, if the determination unit 251a determines that not all of the two reference pictures are selected (no in step S48), the determination unit 251a selects the remaining unselected reference picture as the second reference picture (step S40). Subsequently, the determination unit 251a and the temporal distance determining unit 251b determine the temporal distance T2 used for the weighted prediction for the second reference picture in the same manner as the temporal distance T1, by performing the process in steps S42, S44, and S46 described above on the second reference picture.

Next, the predictive image generating unit 251c in the motion disparity compensation unit 251 performs weighted addition on the first block and the second block according to the temporal distances T1 and T2. The first block is indicated by the first vector (motion vector or disparity vector) of the current block included in the first reference picture, and the second block is indicated by second vector (motion vector or disparity vector) of the current block. With this, the motion disparity compensation unit 251 generates a predictive image for the current block (step S50).

Subsequently, the adder 217 adds the current block and the predictive image (step S52).

As described above, according to the embodiment 1, when the current block included in the non-base view in the coded multi-view image is decoded by the weighed prediction using two reference pictures, whether or not the reference picture is included in the non-base view is determined. Subsequently, if the reference picture is determined not to be included in the non-base view, a value greater than 0 is used for the weighted prediction instead of the actual temporal distance between the current block and the reference picture for the current block. Accordingly, an appropriate predictive image is generated using the two reference pictures. As a result, degradation in image quality can be prevented.

Embodiment 2

In the embodiment, when a predictive image of the current picture is generated by weighted prediction in the implicit mode, the weight used for weighted prediction is switched depending on the temporal distance calculated by the display order of the current picture of the reference picture, instead of determining whether or not the reference picture is included in the non-base view.

Figure 13:
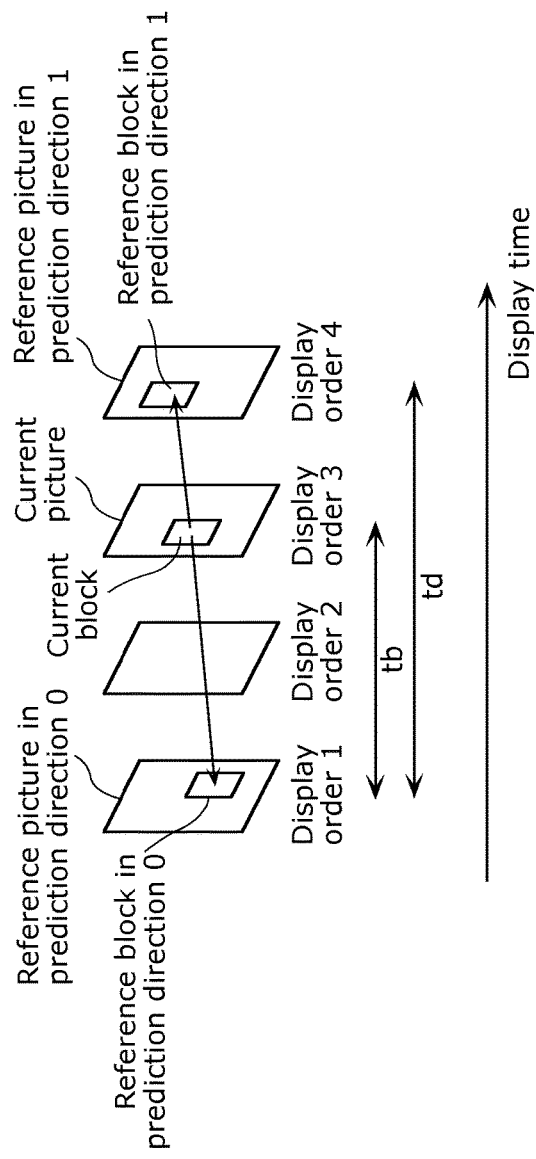
FIG. 13 is a diagram illustrating weighted prediction in the implicit mode used for describing the embodiment 2.

FIG. 13 is a diagram illustrating weighted prediction in the implicit mode used for describing the embodiment 2. In FIG. 13, a predictive image predSampleL0 in the prediction direction 0 is generated by motion compensation using a reference block in the prediction direction 0 in the reference picture in the prediction direction 0 on the current block in the current picture. Furthermore, a predictive image predSampleL1 in the prediction direction 1 is generated by motion compensation using a reference block in the prediction direction 1 in the reference picture in the prediction direction 1. Subsequently, the predictive image predSamplePleBi for bi-prediction is generated by the following (expression 2-1) using the predictive image in the prediction direction 0 predSampleL0 and the predictive image in the prediction direction 1 predSampleL1 and w0c and w1c which are weights for the weighted prediction.

predSampleBi=w0c×predSampleL0+w1c×predSampleL1  (Expression 2-1)

Here, the prediction direction 0 and the prediction direction 1 represent either one of the two reference picture lists used for bi-prediction (reference picture list L0 and reference picture list L1). In the embodiment 2, the description shall be made assuming that the prediction direction 0 is the reference picture list L0 and the prediction direction 1 is the reference picture list L1. However, it is not limited to this example, and the prediction direction 0 may be assigned to the reference picture list L1 and the prediction direction 1 may be assigned to the reference picture list L0. The weight w0c and w1c of the weighted prediction are calculated by the following (Expression 2-2) and (Expression 2-3).

w0c=1−WSF  (Expression 2-2)

w1c=WSF  (Expression 2-3)

Here, the weighted scale factor (WSF) is calculated by the following (Expression 2-4).

WSF=tb/td  (Expression 2-4)

Here, tb represents the difference between the current picture and the reference picture in the reference direction 0 in display order. In the example in FIG. 13, tb is 2. In addition, td is the difference between the reference picture in the prediction direction 0 and the reference picture in the prediction direction 1 in display order. In the example in FIG. 13, td is 3. More specifically, in the example in FIG. 13, WSF=⅔, w0c=⅓, and w1c=⅔. As a result, from (Expression 2-1), the predictive image for bi-prediction predSamplePleBi is calculated by (⅓)×predSampleL0+(⅔)×predSampleL1. Note that, here, tb corresponds to t1 or t3 in FIG. 1A and FIG. 1B, and td corresponds to t1+t2 or t3+t2 in FIG. 1A and FIG. 1B.

Figure 14:
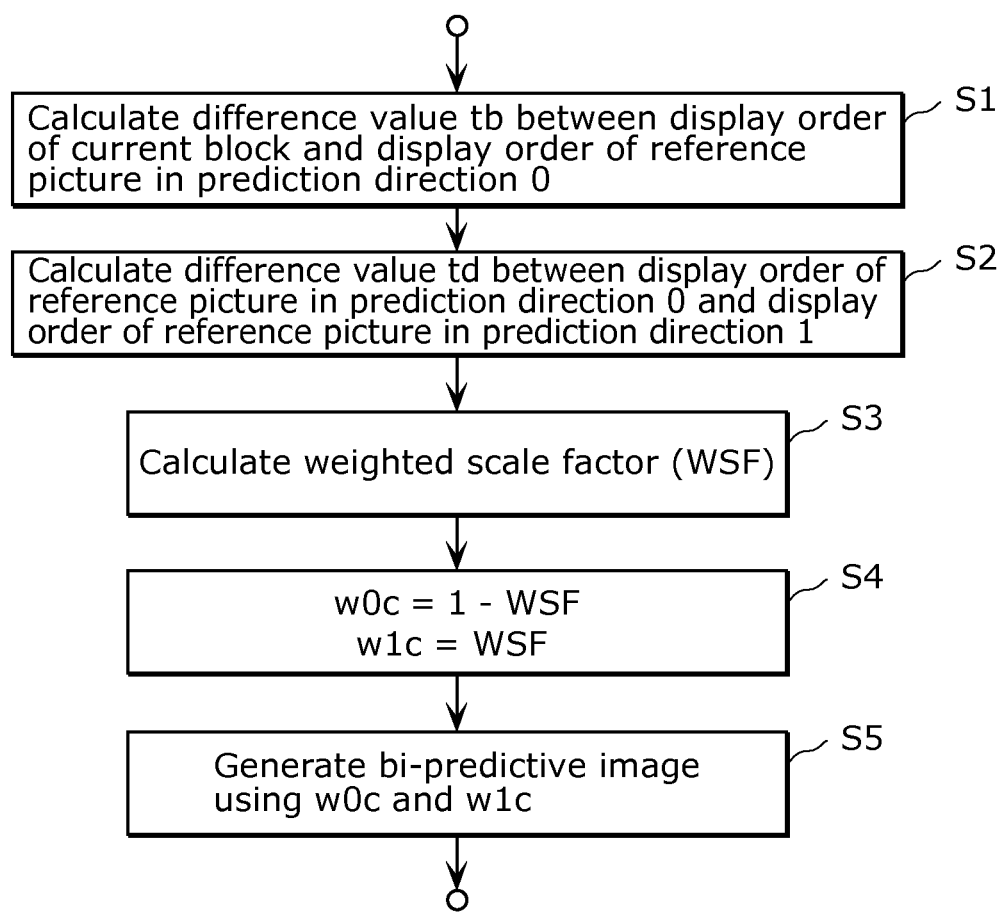
FIG. 14 is a flowchart illustrating weighted prediction in the implicit mode used for describing the embodiment 2.
Figure 15:
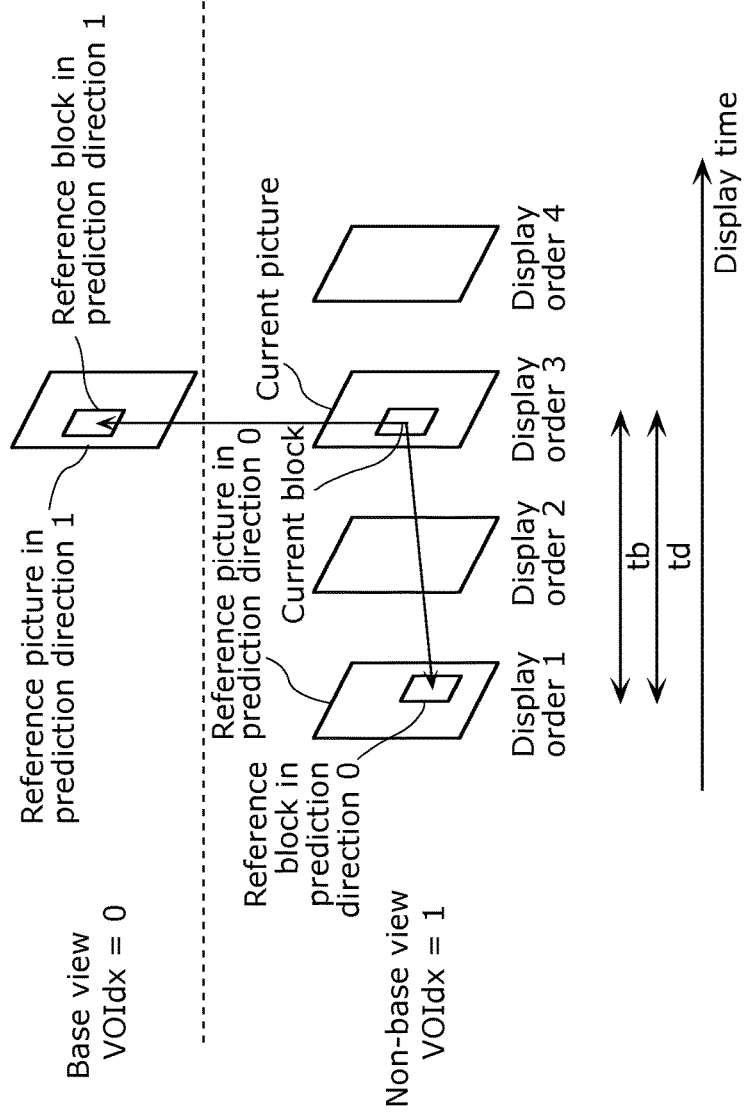
FIG. 15 illustrates an example in which a reference picture in the prediction direction 1 belongs to a different view.
Figure 16:
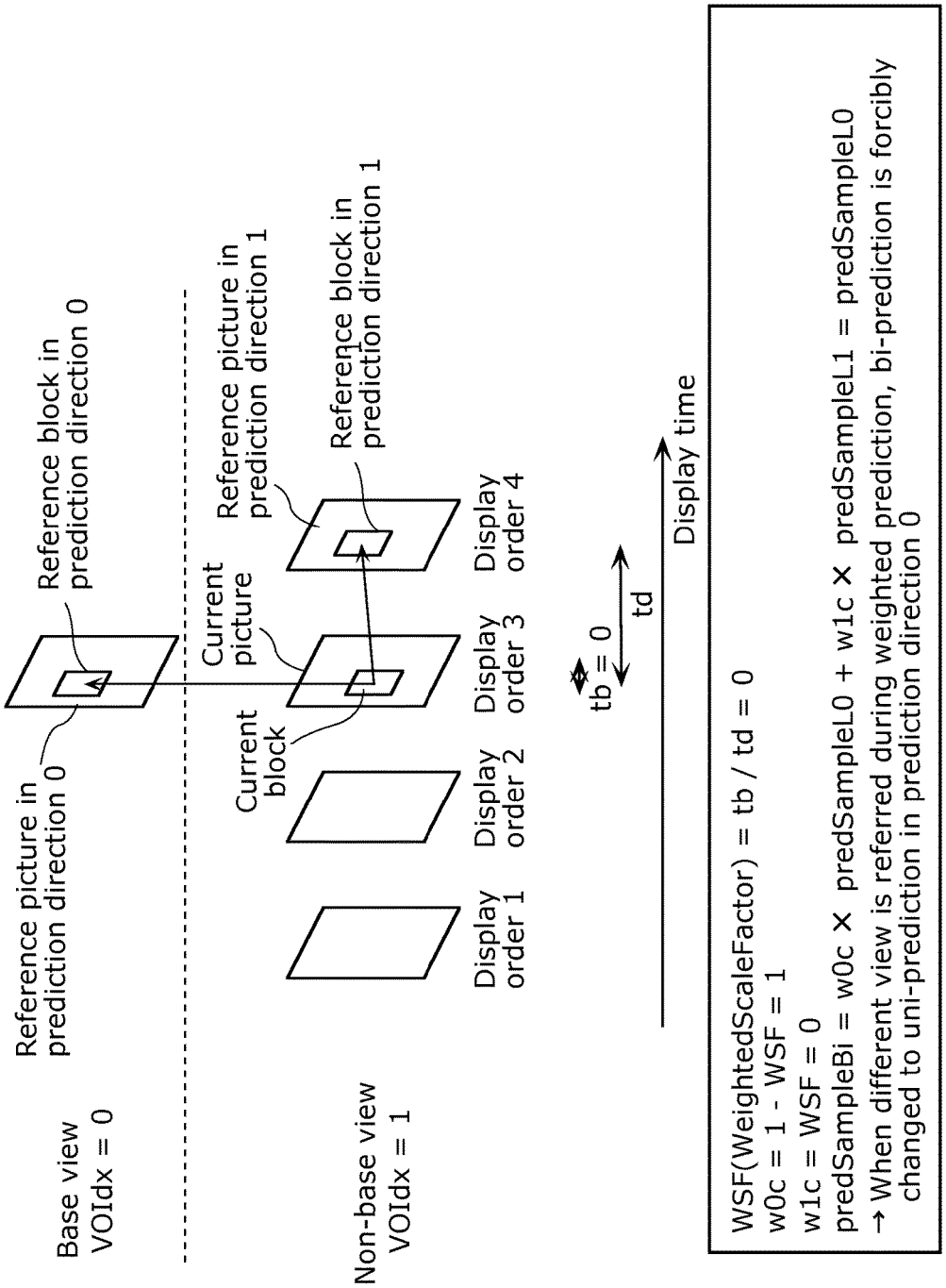
FIG. 16 illustrates an example in which a reference picture in the prediction direction 0 belongs to a different view.

FIG. 14 is a flowchart illustrating weighted prediction in the implicit mode used for describing the embodiment 2. In S1, the difference value tb between the display order of the current block and the display order of the reference picture in the prediction direction 0 is calculated. In S2, the difference value td between the display order of the reference picture in the prediction direction 0 and the display order of the reference picture in the prediction direction 1 is calculated. In S3, WSF is calculated using (Expression 2-4). In S4, w0c and w1c are calculated using (Expression 2-2) and (Expression 2-3), respectively. In S5, the predictive image for bi-prediction predSamplePleBi is calculated using (Expression 2-1). In the weighted prediction in the implicit mode described in FIG. 13 and FIG. 14, there is a problem in the weighted prediction in the implicit mode that the image is degraded and the coding efficiency decreases at the time of multi-view video coding (MVC) when the temporal distance between the current block and the reference block, that is the temporal distance between the current picture which is a picture including the current block and the reference picture is 0. FIG. 15 and FIG. 16 illustrate examples of the problem.

FIG. 15 illustrates an example in which a reference picture in the prediction direction 1 belongs to a different view. In the example in FIG. 15, the reference picture in the prediction direction 1 belongs to the base view. In the embodiment 2, the description shall be made using an example in which the current block belongs to a non-base view, and the reference picture belongs to a base view. However, it is not limited to this example, and the reference picture may belong to a non-base view different from the current picture. In the example in FIG. 15, the difference tb in display order of the current picture and the reference picture in the prediction direction 0 and the difference td in display order of the reference picture in the prediction direction 0 and the reference picture in the prediction direction 1 are the same value (tb=td=2) and WSF is 1 according to (Expression 2-4). As a result, w0c is 0 and w1c is 1 according to (Expression 2-2) and (Expression 2-3). Accordingly, the predictive image for bi-prediction predSampleBi calculated by the weighted prediction is equal to the predictive image in the prediction direction 1 predSampleL1 by (Expression 2-1). Stated differently, when using the weighed prediction, if the reference picture in the prediction direction 1 belongs to a different view, the predictive image for bi-prediction is always the predictive image in the prediction direction 1 which is uni-prediction. Accordingly, the image quality is degraded, and the coding efficiency decreases.

FIG. 16 illustrates an example in which a reference picture in the prediction direction 0 belongs to a different view. In the example in FIG. 16, the reference picture in the prediction direction 0 belongs to the base view. In the embodiment 2, the description shall be made using an example in which the current block belongs to a non-base view, and the reference picture belongs to a base view. However, it is not limited to this example, and the reference picture may belong to a non-base view different from the current picture. In the example in FIG. 16, the difference tb between the current picture and the reference picture in the prediction direction 0 is 0, and WSF is 0 according to (Expression 2-4). As a result, w0c is 1 and w1c is 0 according to (Expression 2-2) and (Expression 2-3). Accordingly, the predictive image for bi-prediction predSampleBi calculated by the weighted prediction is equal to the predictive image in the prediction direction 1 predSampleL0 by (Expression 2-1). Stated differently, when using the weighed prediction, if the reference picture in the prediction direction 0 belongs to a different view, the predictive image for bi-prediction is always the predictive image in the prediction direction 0 which is uni-prediction. Accordingly, the image quality is degraded, and the coding efficiency decreases.

In the embodiment 2, when generating the predictive image for the current picture by the weighted prediction in the implicit mode, the problem is solved by switching the weight used for the weighted prediction according to the temporal distance calculated from the display order of the current picture or the reference picture.

Note that, in the embodiment 2, the description for the image coding apparatus and the image decoding apparatus is omitted since the configuration of these apparatuses are identical to the image coding apparatus and the image decoding apparatus according to the embodiment 1 except for the difference in the operations by the motion compensation unit 121 in FIG. 3, the motion disparity compensation unit 151 in FIG. 4, the motion compensation unit 221 in FIG. 9, and the motion disparity compensation unit 251 in FIG. 10.

Figure 17:
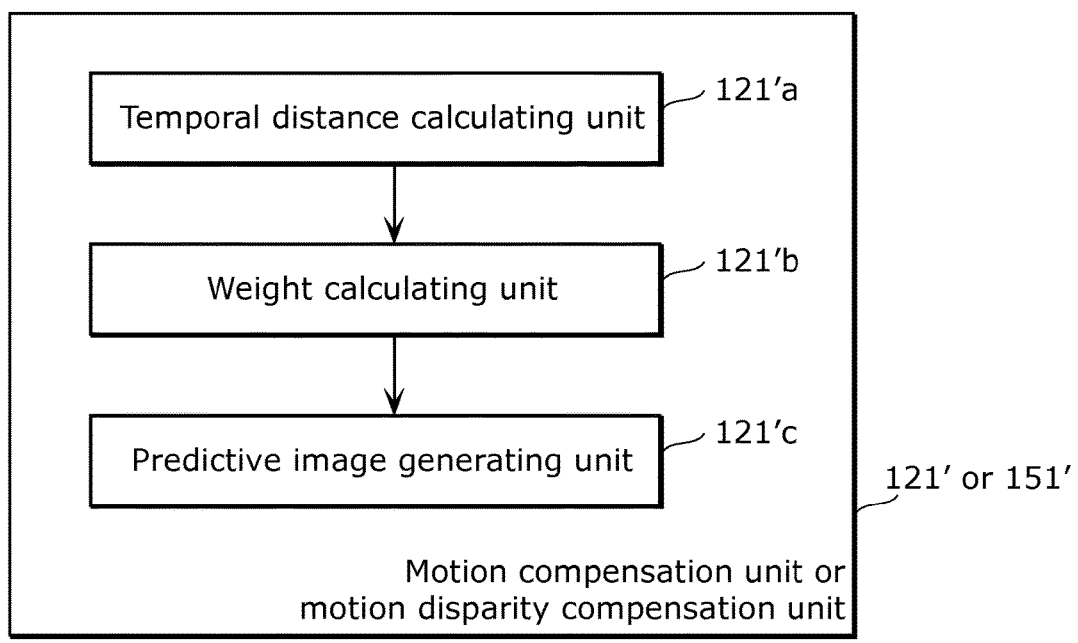
FIG. 17 is a block diagram illustrating functional configuration in the motion disparity compensation unit or the motion disparity compensation unit for the weighted prediction in the implicit mode in the image coding apparatus according to the embodiment 2.

FIG. 17 is a block diagram illustrating the functional configuration related to the weighted prediction in the implicit mode in the motion compensation unit 121' and the motion disparity compensation unit 151' in the image coding apparatus according to the embodiment 2. In the embodiment 2, an example in which the motion compensation unit 121' and the motion disparity compensation unit 151' are implemented by the same configuration is illustrated. The motion compensation unit 121' or the motion disparity compensation unit 151' includes a temporal distance calculating unit 121'a, a weight calculating unit 121'b, and a predictive image generating unit 121'c. The temporal distance calculating unit 121'a calculates the difference tb between the current picture and the reference picture in the prediction direction 0 in display order, and the difference td between the reference picture in the prediction direction 0 and the reference picture in the prediction direction 1. The weight calculating unit 121'b calculates the weight w0c and w1c for the weighted prediction using tb and td. The predictive image generating unit 121'c calculates the predictive image for bi-prediction predSampleBi for the current block using w0c and w1c.

Figure 18:
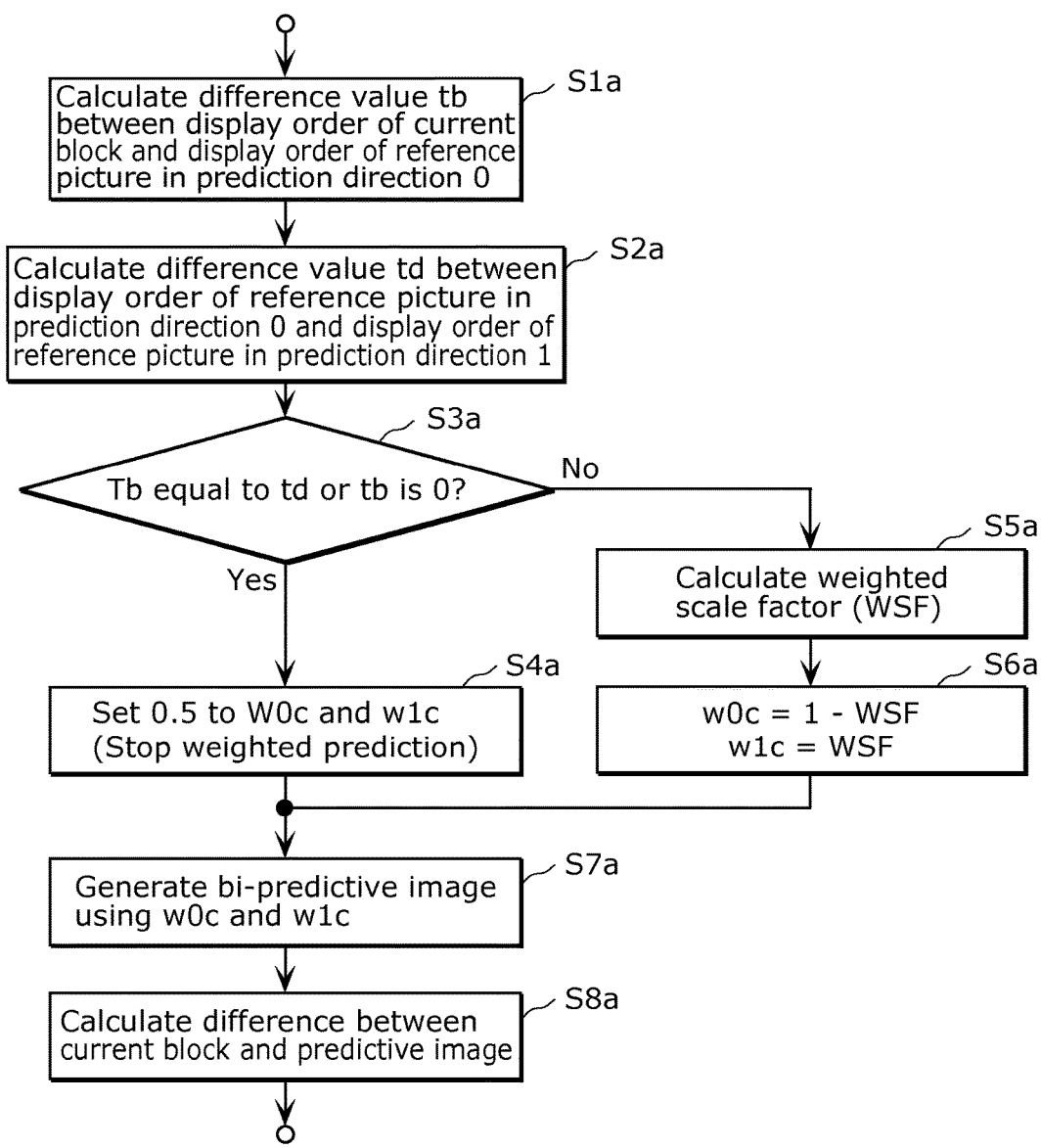
FIG. 18 is a flowchart for generating a predictive image in the weighted prediction by the image coding apparatus according to the embodiment 2.

FIG. 18 is a flowchart for generating a predictive image for the weighted prediction by the image coding apparatus according to the embodiment 2. The following shall describe FIG. 18. In S1a, the difference value tb between the display order of the current block and the display order of the reference picture in the prediction direction 0 is calculated. In S2a, the difference value td between the display order of the reference picture in the prediction direction 0 and the display order of the reference picture in the prediction direction 1 is calculated. In S3a, whether or not the values tb and td are equal, or whether or not the value of tb is 0, and if it is true, the value 0.5 is set to w0c and w1c in S4a. Stated differently, existence of the reference structure as illustrated in FIG. 15 or FIG. 16 is determined from the values of tb and td, and if it is true, a bi-predictive image in a case where the weighted prediction is not used is generated by evening out the weight for the weighted prediction. If S3a is false, WSF is calculated using (Expression 2-4) in S5a, and w0c and w1c are calculated using (Expression 2-2) and (Expression 2-3) in S6a. In S7a, the predictive image for bi-prediction predSampleBi is calculated using (Expression 2-1). In S8a, the difference between the current block and the predictive image is calculated.

As described above, the existence of the reference structure as illustrated in FIG. 15 or FIG. 16 where the temporal distance between the current picture which is a picture including the current block and the reference picture is 0 is determined from the values of tb and td, and when the reference structure as illustrated in FIG. 15 or FIG. 16 exists, the weight for the weighted prediction is evened out. Accordingly, an appropriate predictive image is generated using the two reference pictures by generating a bi-predictive image when the weighted prediction is not used. As a result, degradation in image quality can be prevented.

Note that, when S3a is true, the value 0.5 is set to w0c and w1c to make the weight for the weighted prediction even in FIG. 18, it is not limited to this example. For example, a bi-predictive image may be generated by calculating w0c and w1c from (Expression 2-2) using (Expression 2-4), and setting a value greater than 0 to w0c whose value is 0 or to w1c.

In the embodiment 2, the existence of the reference structure as illustrated in FIG. 15 or FIG. 16 is determined from the values of tb and td, and when there is a reference structure as illustrated in FIG. 15 or FIG. 16, a bi-predictive image for a case where the weighted prediction is not used by evening out the weight for the weighted prediction. However, it is not limited to this example. For example, as illustrated in FIG. 19, when there is a reference structure as illustrated in FIG. 15 or FIG. 16, a difference value of a view order index (VOIdx) assigned for the coding (decoding)

order of each view or a view_id assigned for each view may be used, instead of the difference value in display order.

Figure 19:
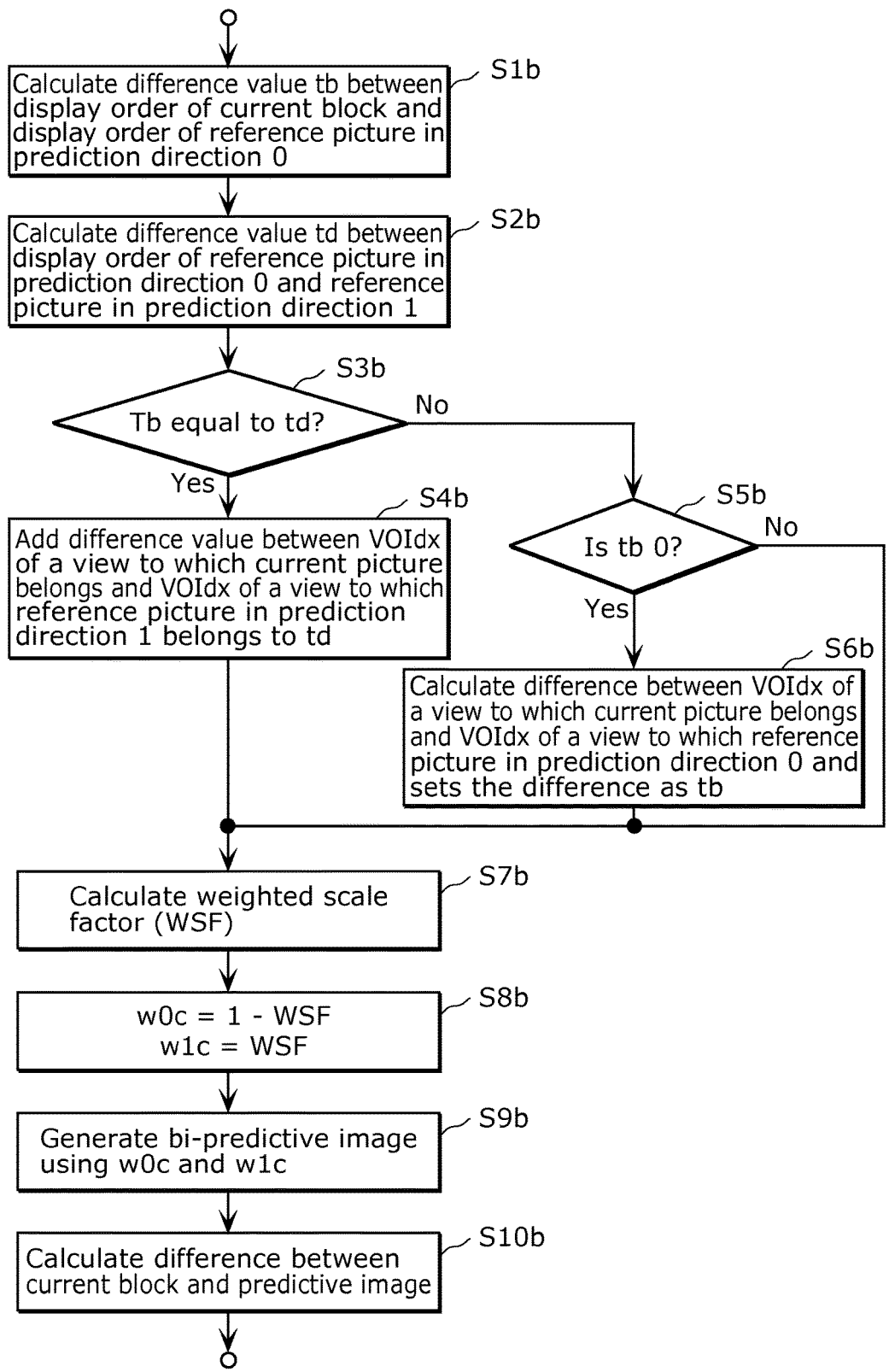
FIG. 19 illustrates an example according to the embodiment 2 in which a difference value between VOIdx is used.

FIG. 19 illustrates an example according to the embodiment 2 in which a difference value between VOIdx is used. In S1b, the difference value tb between the display order of the current block and the display order of the reference picture in the prediction direction 0 is calculated. In S2b, the difference value td between the display order of the reference picture in the prediction direction 0 and the display order of the reference picture in the prediction direction 1 is calculated. In S3b, whether the values tb and td are equal to each other is determined, and if it is true, a difference value (inter-view distance) between the VOIdx of the view to which the current picture belongs to and the VOIdx of the view to which the reference picture in the prediction direction 1 belongs to, and the difference value is added to td. If S3b is false, whether or not the value of tb is 0 is determined in S5b, and if it is true, a difference value between the VOIdx of the view to which the current picture belongs to and the VOIdx of the view to which the reference picture in the prediction direction 0 belongs to, and sets the difference value to tb. More specifically, whether or not there is a reference structure illustrated in FIG. 15 or FIG. 16 is determined from the values of tb and td, and if it is true, td and tb are appropriately calculated using the difference value of VOIdx of the view to which the current picture and the reference picture belong to, in addition to the difference value in display order. In S7b, WSF is calculated using (Expression 2-4), and in S8b, w0c and w1c are calculated. In S9b, the predictive image for bi-prediction predSampleBi is calculated using (Expression 2-1). In S10b, the difference between the current block and the predictive image is calculated. As described above, the existence of the reference structure as illustrated in FIG. 15 or FIG. 16 is determined from the values of tb and td. When there is a reference structure in FIG. 15 or FIG. 16, it is possible to prevent the degradation in image quality by performing the weighted prediction by calculating td and tb appropriately using the difference value of VOIdx of the view to which the current picture and the reference picture belong to, in addition to the difference value between the current picture and the reference picture in display order.

Note that, in the embodiment, the description is made using an example where the current picture refers to a picture in a different view, for example, where a picture included in a non-base view is coded. However, it is not limited to this example. For example, the embodiment 2 may be applied to a case where the current picture refers to a picture in a different layer. For example, the embodiment 2 may be applied to scalable video coding (SVC). In SVC, there is a case in which a predictive image is generated referring to a reference picture belonging to a different layer, and there is a problem of decreased coding efficiency and degraded image quality when the temporal distance between the current block and the reference picture, that is the temporal distance between the current picture which is a picture including the current block and the reference picture is 0, in the same manner as MVC.

Accordingly, by applying the embodiment 2, the existence of the reference structure in which the temporal distance between the current picture which is a picture including the current block and the reference picture is 0 from the values of tb and td, and the weight for the weighted prediction is evened out when there is such a reference structure. Accordingly, an appropriate predictive image is generated using the two reference pictures by generating a bi-predictive image when the weighted prediction is not used. As a result, degradation in image quality can be prevented. Furthermore, the existence of the reference structure in which the temporal distance between the current picture which is a picture including the current block and the reference picture is 0 is determined from the values of tb and td, and if there is such a reference structure, it is possible to prevent degradation in image quality by performing the weighted prediction by calculating td and tb appropriately using a difference value of the identification signals of layers to which the current picture and the reference picture belong to, in addition to the difference value between the current picture and the reference picture in display order.

Figure 20:
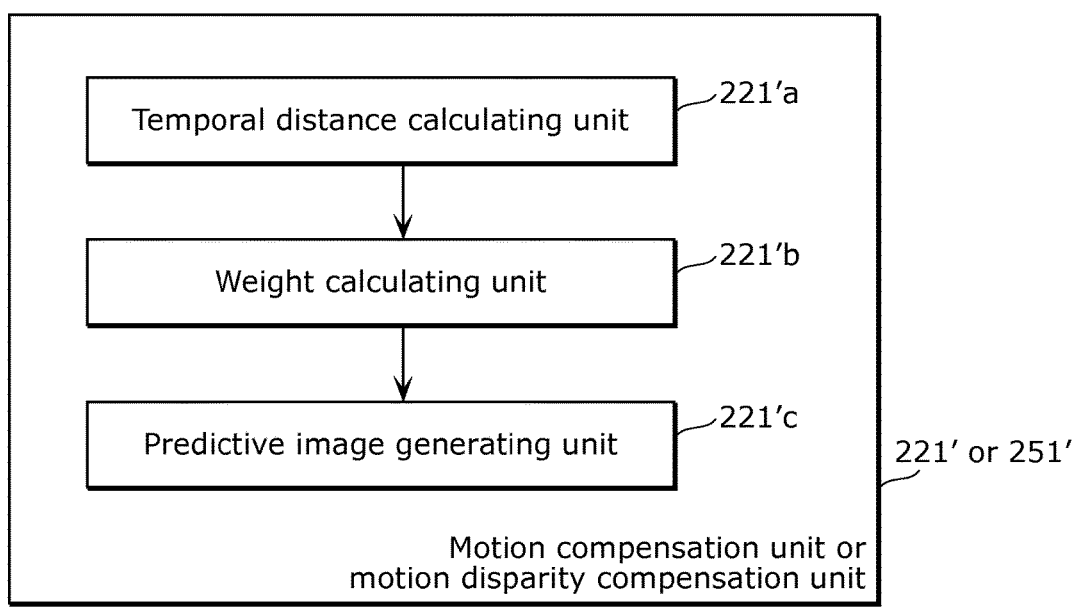
FIG. 20 is a block diagram illustrating functional configuration in the motion disparity compensation unit or the motion disparity compensation unit for the weighted prediction in the implicit mode in the image decoding apparatus according to the embodiment 2.

FIG. 20 is a block diagram illustrating the functional configuration related to the weighted prediction in the implicit mode in the motion compensation unit 221' or the motion disparity compensation unit 251' in the image decoding apparatus according to the embodiment 2. In the embodiment 2, an example in which the motion compensation unit 222' and the motion disparity compensation unit 251' are implemented by the same configuration are described. The motion compensation unit 221' or the motion disparity compensation unit 251' includes a temporal distance calculating unit 221'a, a weight calculating unit 221'b, and a predictive image generating unit 221'c. The temporal distance calculating unit 221'a calculates the difference tb between the current picture and the reference picture in the prediction direction 0 in display order, and the difference td between the reference picture in the prediction direction 0 and the reference picture in the prediction direction 1. The weight calculating unit 221'b calculates the weight w0c and w1c for the weighted prediction using tb and td. The predictive image generating unit 221'c calculates the predictive image for bi-prediction predSampleBi for the current block using w0c and w1c.

Figure 21:
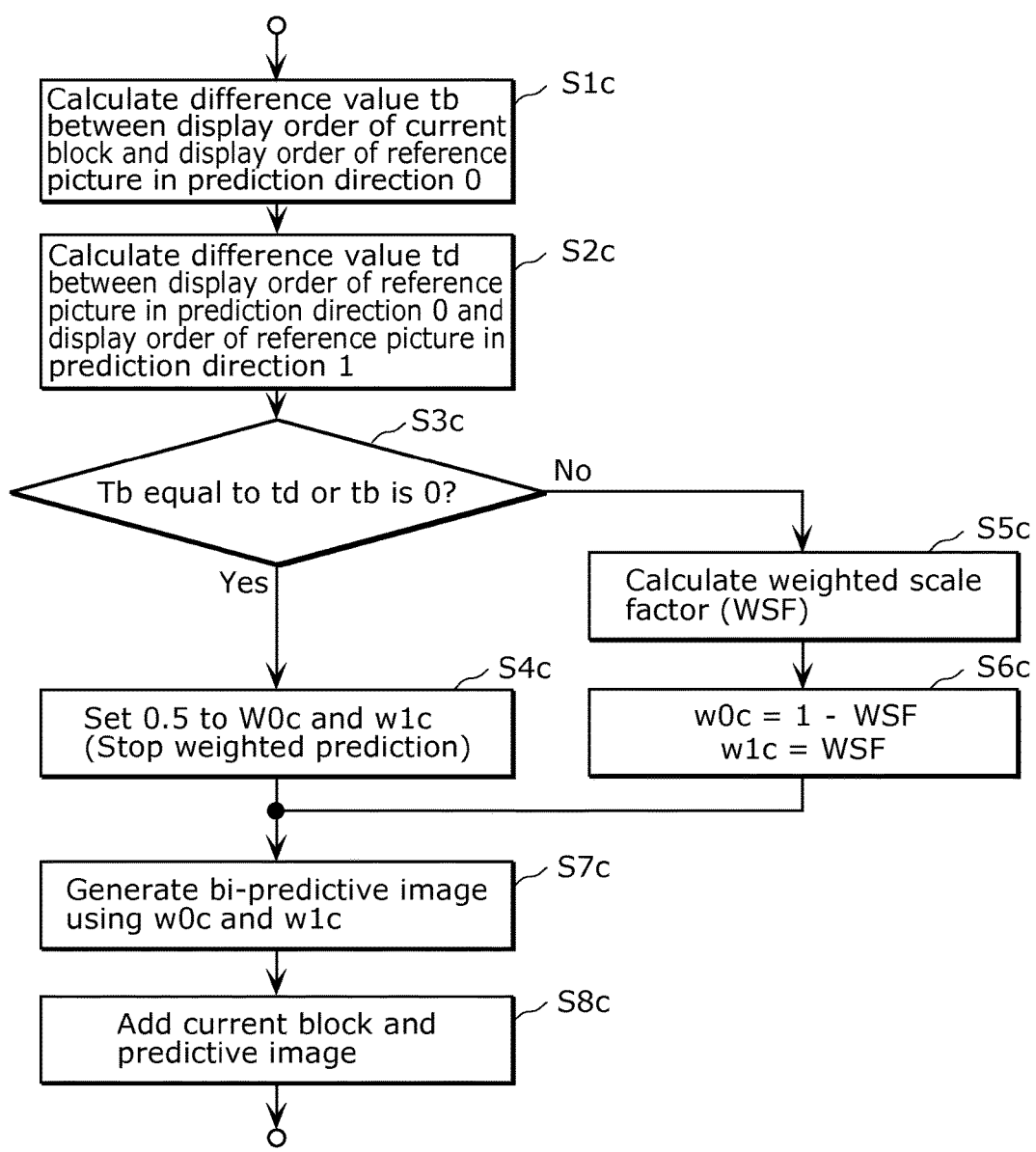
FIG. 21 is a flowchart for generating a predictive image in the weighted prediction by the image decoding apparatus according to the embodiment 2.

FIG. 21 is a flowchart for generating a predictive image for the weighted prediction by the image decoding apparatus according to the embodiment 2. The following shall describe FIG. 21. In S1c, the difference value tb between the display order of the current block and the display order of the reference picture in the prediction direction 0 is calculated. In S2c, the difference value td between the display order of the reference picture in the prediction direction 0 and the display order of the reference picture in the prediction direction 1 is calculated. In S3c, whether or not the values tb and td are equal, or whether or not the value of tb is 0, and if it is true, the value 0.5 is set to w0c and w1c in S4c. Stated differently, existence of the reference structure as illustrated in FIG. 15 or FIG. 16 is determined from the values of tb and td, and if it is true, a bi-predictive image in a case where the weighted prediction is not used by evening out the weight for the weighted prediction. If S3c is false, WSF is calculated using (Expression 2-4) in S5c, and w0c and w1c are calculated using (Expression 2-2) and (Expression 2-3) in S6c. In S7c, the predictive image for bi-prediction predSampleBi is calculated using (Expression 2-1). In S8c, the current block and the predictive image are added.

As described above, the existence of the reference structure as illustrated in FIG. 15 of FIG. 16 where the temporal distance between the current picture which is a picture including the current block and the reference picture is 0 is determined from the values of tb and td, and when the reference structure as illustrated in FIG. 15 or FIG. 16 exists, the weight for the weighted prediction is evened out. Accordingly, an appropriate predictive image is generated using the two reference pictures by generating a bi-predictive image when the weighted prediction is not used, and a bitstream capable of preventing degradation in image quality can be appropriately decoded.

Note that, when S3c is true, the value 0.5 is set to w0c and w1c to make the weight for the weighted prediction even in S4c in FIG. 21, it is not limited to this example. For example, a bi-predictive image may be generated by calculating w0c and w1c from (Expression 2-2) using (Expression 2-4), and setting a value greater than 0 to w0c whose value is 0 or to w1c.

In the embodiment 2, the existence of the reference structure as illustrated in FIG. 15 or FIG. 16 is determined from the values of tb and td, and when there is a reference structure as illustrated in FIG. 15 or FIG. 16, a bi-predictive image for a case where the weighted prediction is not used is generated by evening out the weight for the weighted prediction. However, it is not limited to this example. For example, as illustrated in FIG. 22, when there is a reference structure as illustrated in FIG. 15 or FIG. 16, a difference value of a view order index (VOIdx) assigned for the coding (decoding) order of each view or a view_id assigned for each view, instead of the difference value in display order.

Figure 22:
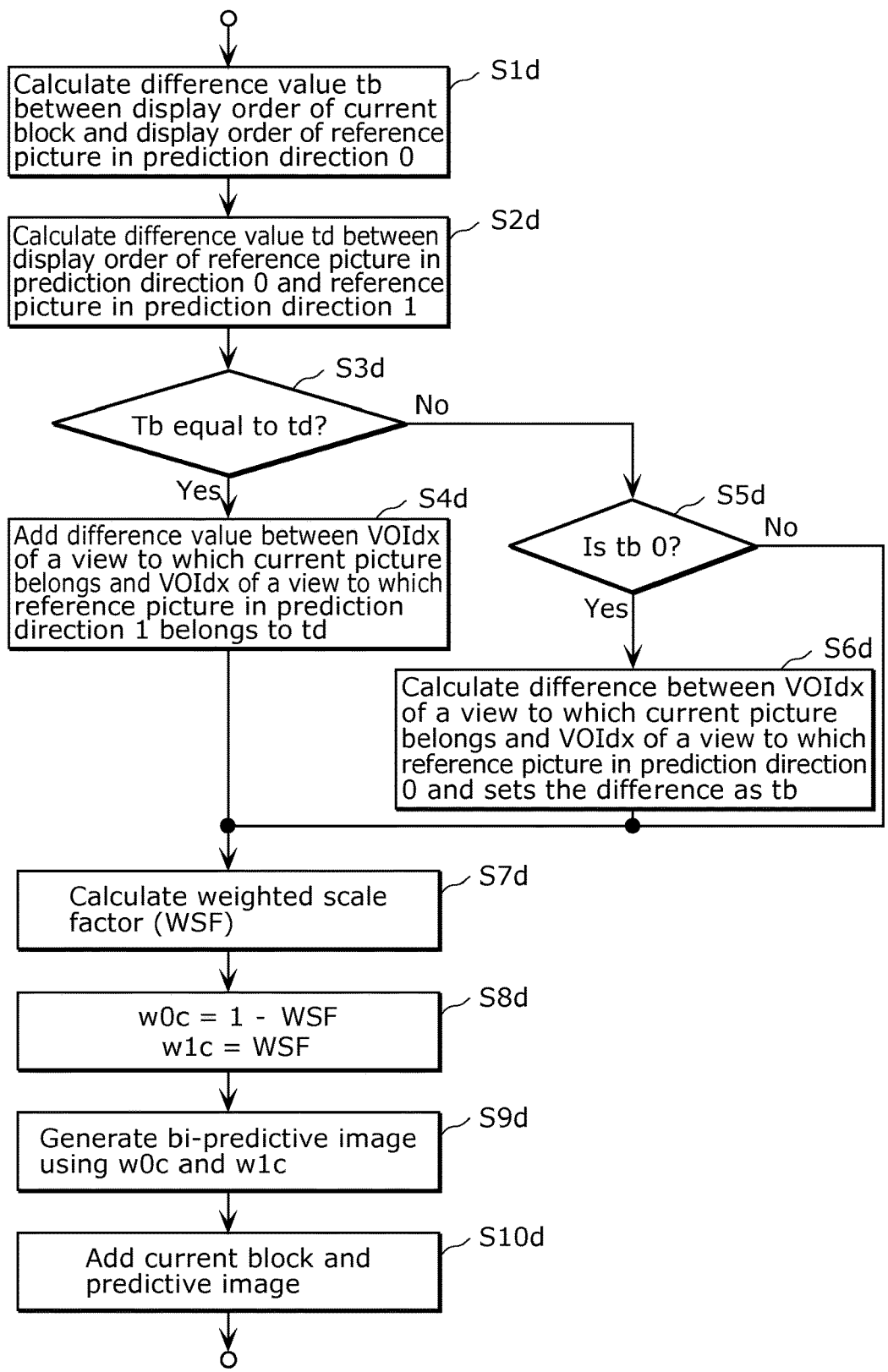
FIG. 22 illustrates an example according to the embodiment 2 in which a difference value between VOIdx is used.

FIG. 22 illustrates an example according to the embodiment 2 in which a difference value between VOIdx is used. In S1d, the difference value tb between the display order of the current block and the display order of the reference picture in the prediction direction 0 is calculated. In Std, the difference value td between the display order of the reference picture in the prediction direction 0 and the display order of the reference picture in the prediction direction 1 is calculated. In S3d, whether the values tb and td are equal to each other is determined, and if it is true, a difference value (inter-view distance) between the VOIdx of the view to which the current picture belongs to and the VOIdx of the view to which the reference picture in the prediction direction 1 belongs to, and the difference value is added to td in S4d. If S3d is false, whether or not the value of tb is 0 is determined in S5d, and if it is true, in S6d, a difference value between the VOIdx of the view to which the current picture belongs to and the VOIdx of the view to which the reference picture in the prediction direction 0 belongs to, and sets the difference value to tb. More specifically, whether or not there is a reference structure illustrated in FIG. 15 or FIG. 16 is determined from the values of tb and td, and if it is true, td and tb are appropriately calculated using the difference value of VOIdx of the view to which the current picture and the reference picture belong to, in addition to the difference value in display order. In S7d, WSF is calculated using (Expression 2-4), and in S8d, w0c and w1c are calculated. In S9d, the predictive image for bi-prediction predSampleBi is calculated using (Expression 2-1). In S10d, the current block and the predictive image are added. As described above, the existence of the reference structure as illustrated in FIG. 15 or FIG. 16 is determined from the values of tb and td, and when there is a reference structure as illustrated in FIG. 15 or FIG. 16, the bitstream capable of preventing degradation in image quality can be appropriately decoded using the difference value between VOIdx of the views to which the current picture and the reference picture belong to, in addition to the difference value between the current picture and the reference picture in display order.

Note that, in the embodiment, the description is made using an example where the current picture refers to a picture in a different view, for example, where a picture included in a non-base view is coded. For example, the embodiment 2 may be applied to a case where the current picture refers to a picture in a different layer. For example, the embodiment 2 may be applied to scalable video coding (SVC). In SVC, there is a case in which a predictive image is generated referring to a reference picture belonging to a different layer, and there is a problem of decreased coding efficiency and degraded image quality when the temporal distance between the current block and the reference picture, that is the temporal distance between the current picture which is a picture including the current block and the reference picture is 0, in the same manner as MVC.

Accordingly, by applying the embodiment 2, the existence of the reference structure in which the temporal distance between the current picture which is a picture including the current block and the reference picture is 0 from the values of tb and td, and the weight for the weighted prediction is evened out when there is such a reference structure. Accordingly, an appropriate predictive image is generated using the two reference pictures by generating a bi-predictive image when the weighted prediction is not used, and a bitstream capable of preventing degradation in image quality can be appropriately decoded. Furthermore, the existence of a reference structure in which the temporal distance between the current picture which is a picture including the current block and the reference picture is 0 is determined based on the value of tb and td, and if there is the reference structure, a bitstream capable of preventing degradation in image quality can be appropriately decoded by calculating td and tb appropriately and performing the weighted prediction using a difference value between identification signals in the layers to which the current picture and the reference picture belong to, in addition to the difference value between the current picture and the reference picture in display order.

Note that, in the embodiments, each of the components may be composed of a dedicated hardware or by executing a software program suitable for the component. Each of the components may also be implemented by a CPU or a program execution unit such as a processor reading and executing a software program recorded in a hard disk or a recoding medium such as a semiconductor memory. The software program here is a program causing the computer to execute steps included in the following image coding method and image decoding method. The image coding method is an image coding method for coding, for each block, a picture composing a multi-view video having a first view and a second view, the image coding method including: determining a temporal distance between a current picture to be coded and a first reference picture to which a current block to be coded included in the current picture refers as a first temporal distance; determining a temporal distance between the first reference picture and a second reference picture to which the current block refers as a second temporal distance; judging whether or not the first temporal distance and the second temporal distance satisfy a predetermined condition, and calculating a first weight for the first reference picture and a second weight for the second reference picture based on a result of the judgment; and generating a predictive image for the current block by adding a first block included in the first reference picture and a second block included in the second reference picture, the first block being weighted by the first weight, and the second block being weighted by the second weight, in which the first block and the second block are referred to by the current block. The image decoding method is an image decoding method for decoding, for each block, a picture composing a multi-view video having a first view and a second view, the image decoding method including: determining a temporal distance between a current picture to be decoded and a first reference picture to which a current block to be decoded included in the current picture refers as a first temporal distance; determining a temporal distance between the first reference picture and a second reference picture to which the current block refers as a second temporal distance; judging whether or not the first temporal distance and the second temporal distance satisfy a predetermined condition, and calculating a first weight for the first reference picture and a second weight for the second reference picture based on a result of the judgment; and generating a predictive image for the current block by adding a first block included in the first reference picture and a second block included in the second reference picture, the first block being weighted by the first weight, and the second block being weighted by the second weight, in which the first block and the second block are referred to by the current block.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 23:
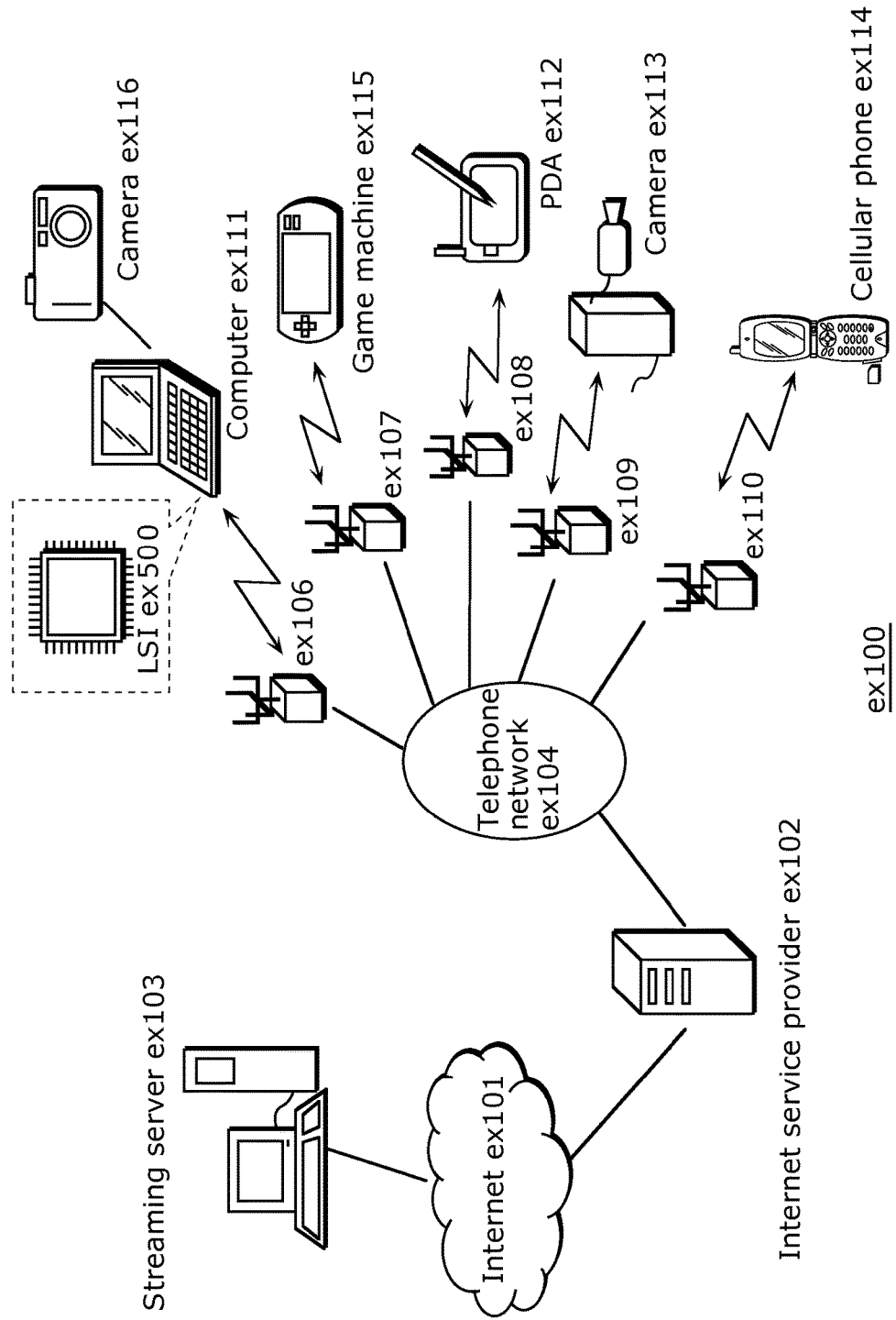
FIG. 23 shows an overall configuration of a content providing system for implementing content distribution services.

FIG. 23 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 23, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 24:
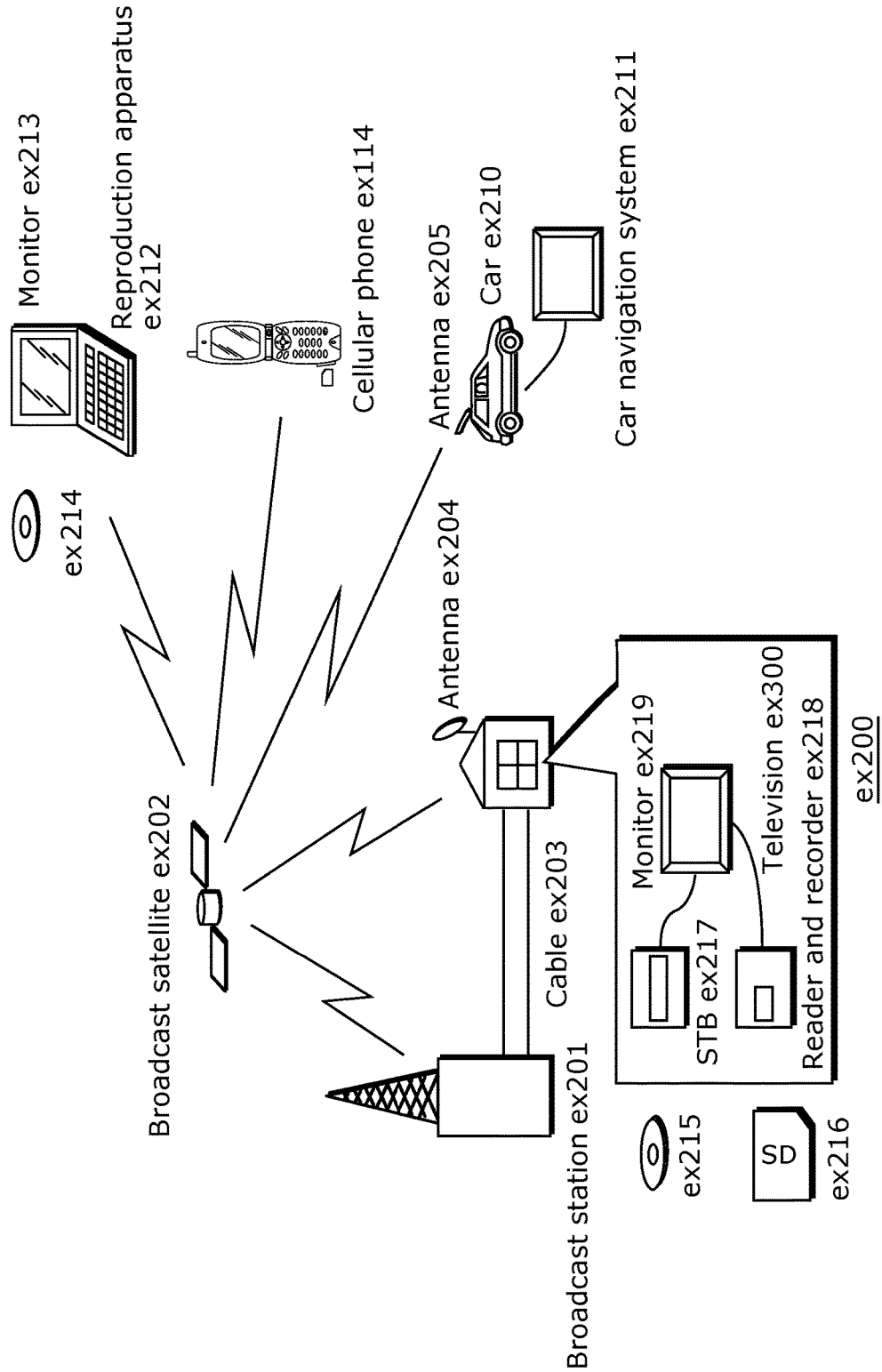
FIG. 24 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 24. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 25:
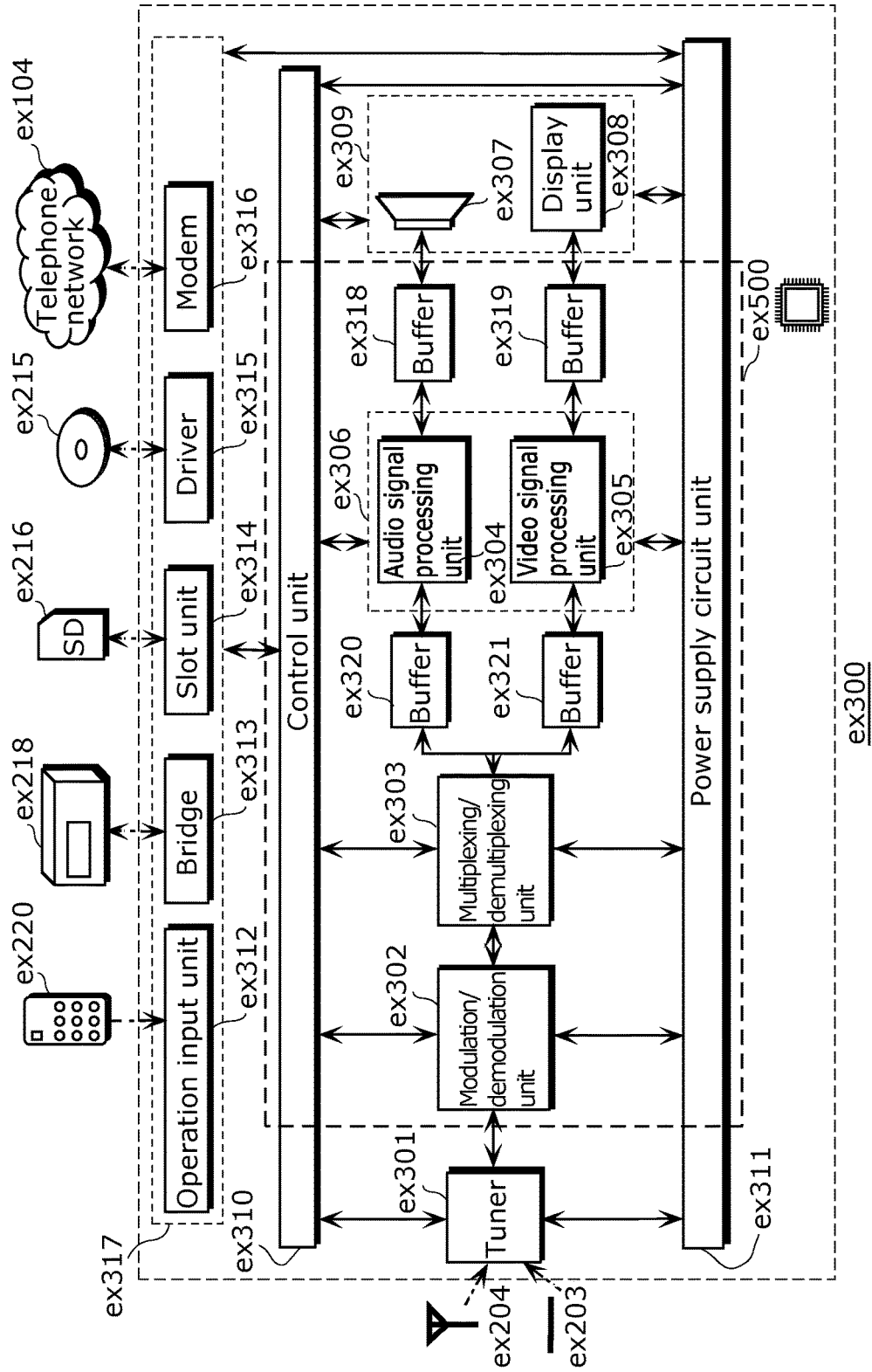
FIG. 25 shows a block diagram illustrating an example of a configuration of a television.

FIG. 25 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 26:
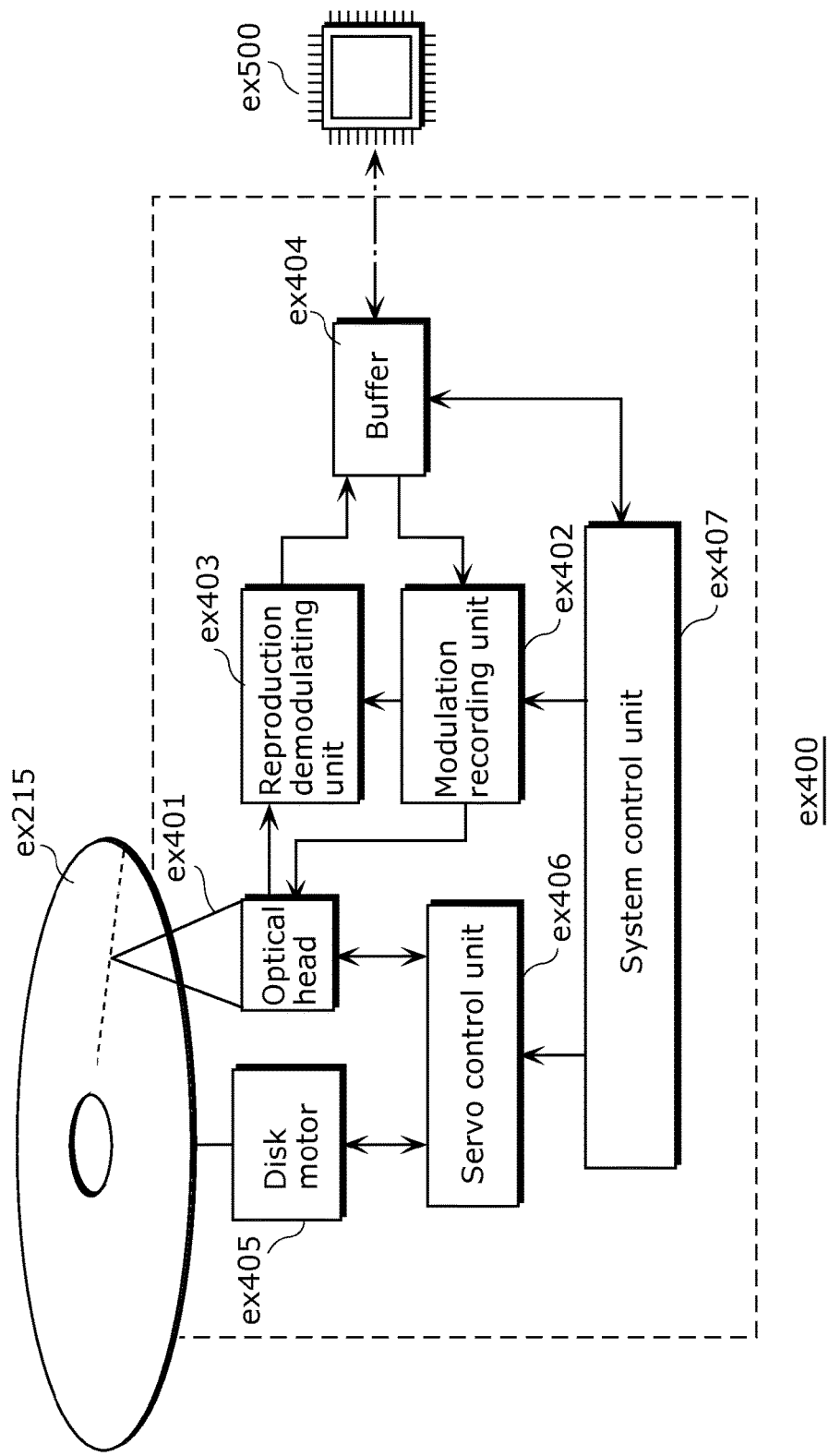
FIG. 26 shows a block diagram illustrating an example of a configuration of an information reproducing/recording unit that reads and writes information from and on a recording medium that is an optical disk.

As an example, FIG. 26 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 27:
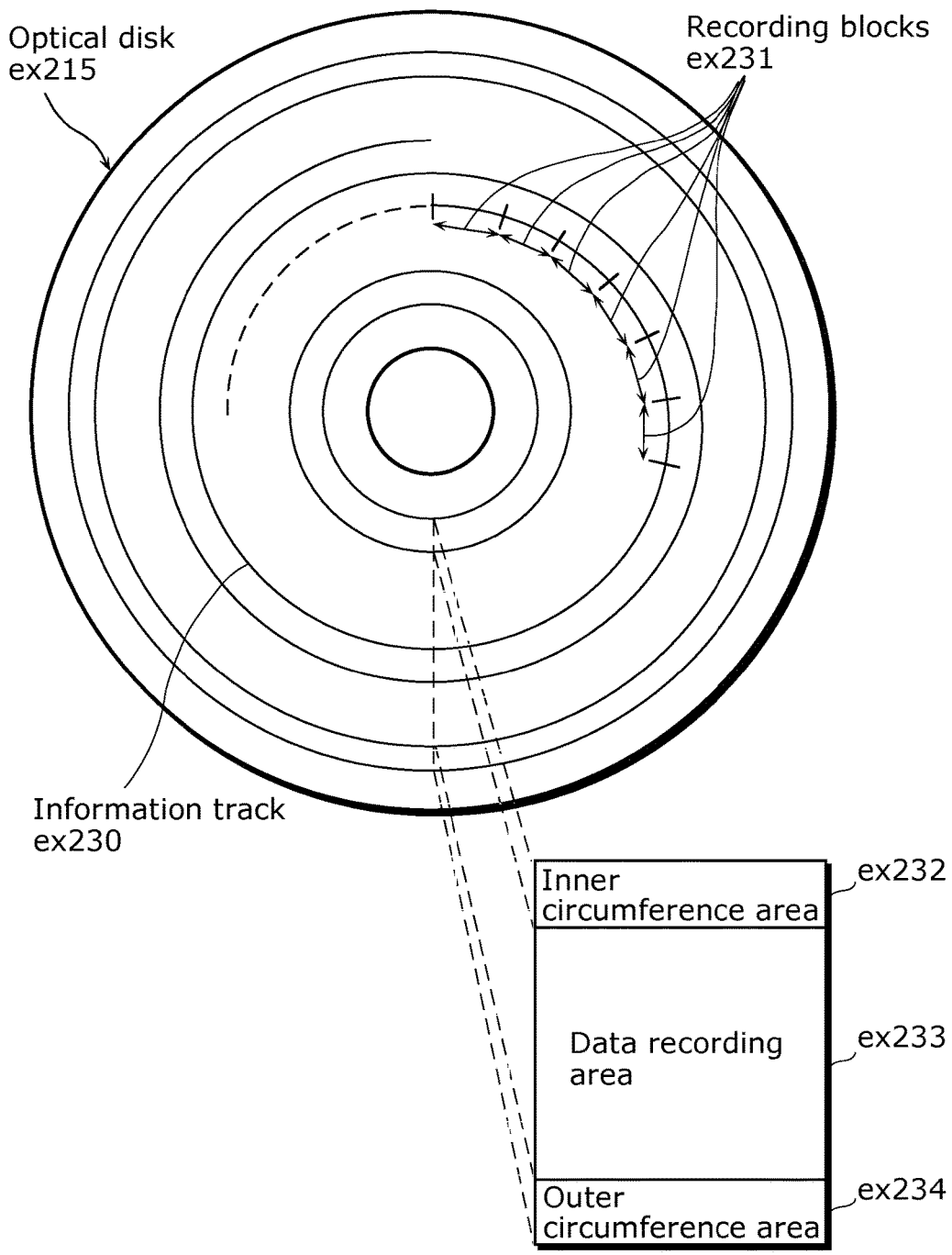
FIG. 27 shows an example of a configuration of a recording medium that is an optical disk.

FIG. 27 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 25. The same will be true for the configuration of the computer ex111, the cellular phone ex114, and others.

Figure 28A:
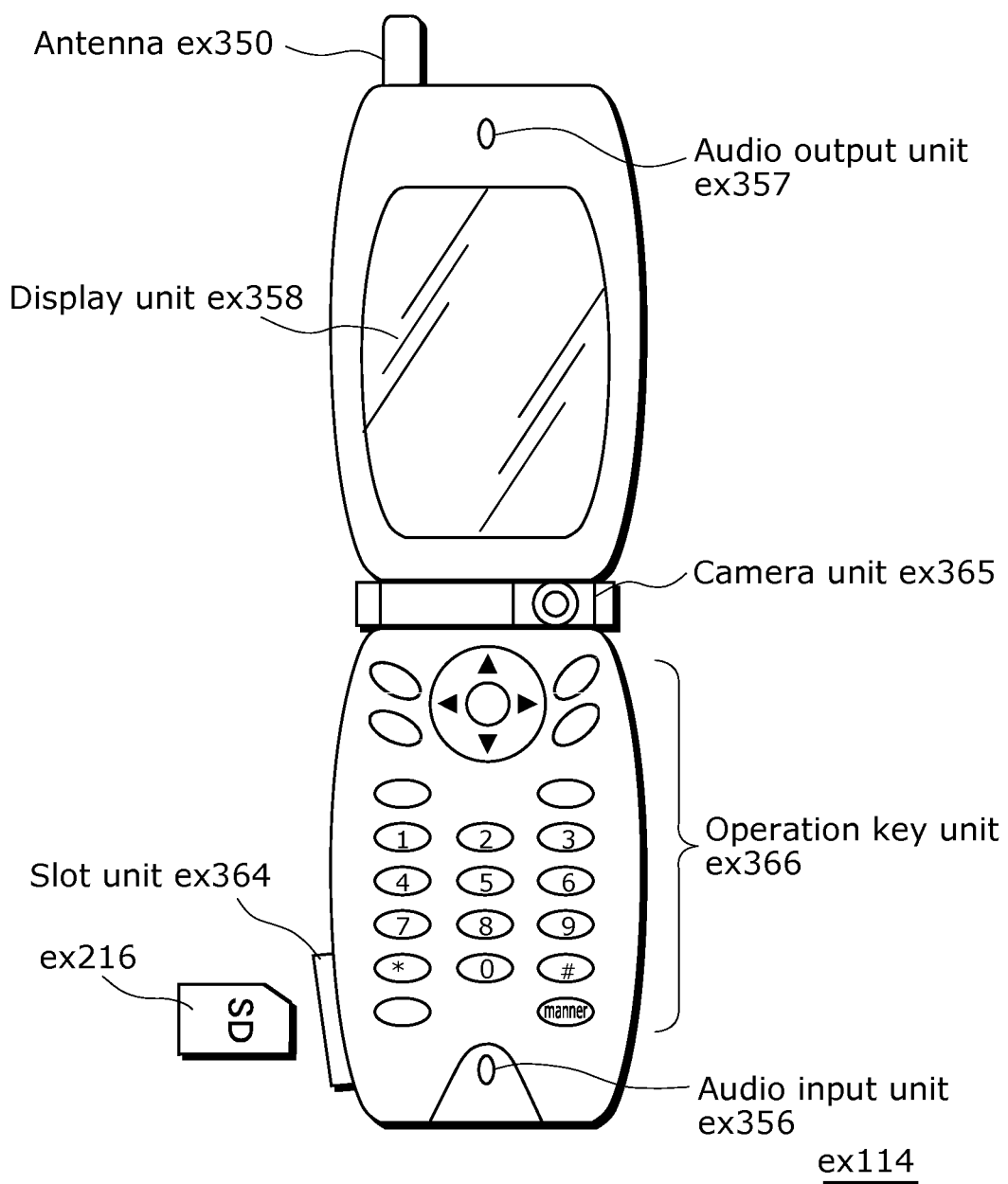
FIG. 28A shows an example of a cellular phone.

FIG. 28A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 28B:
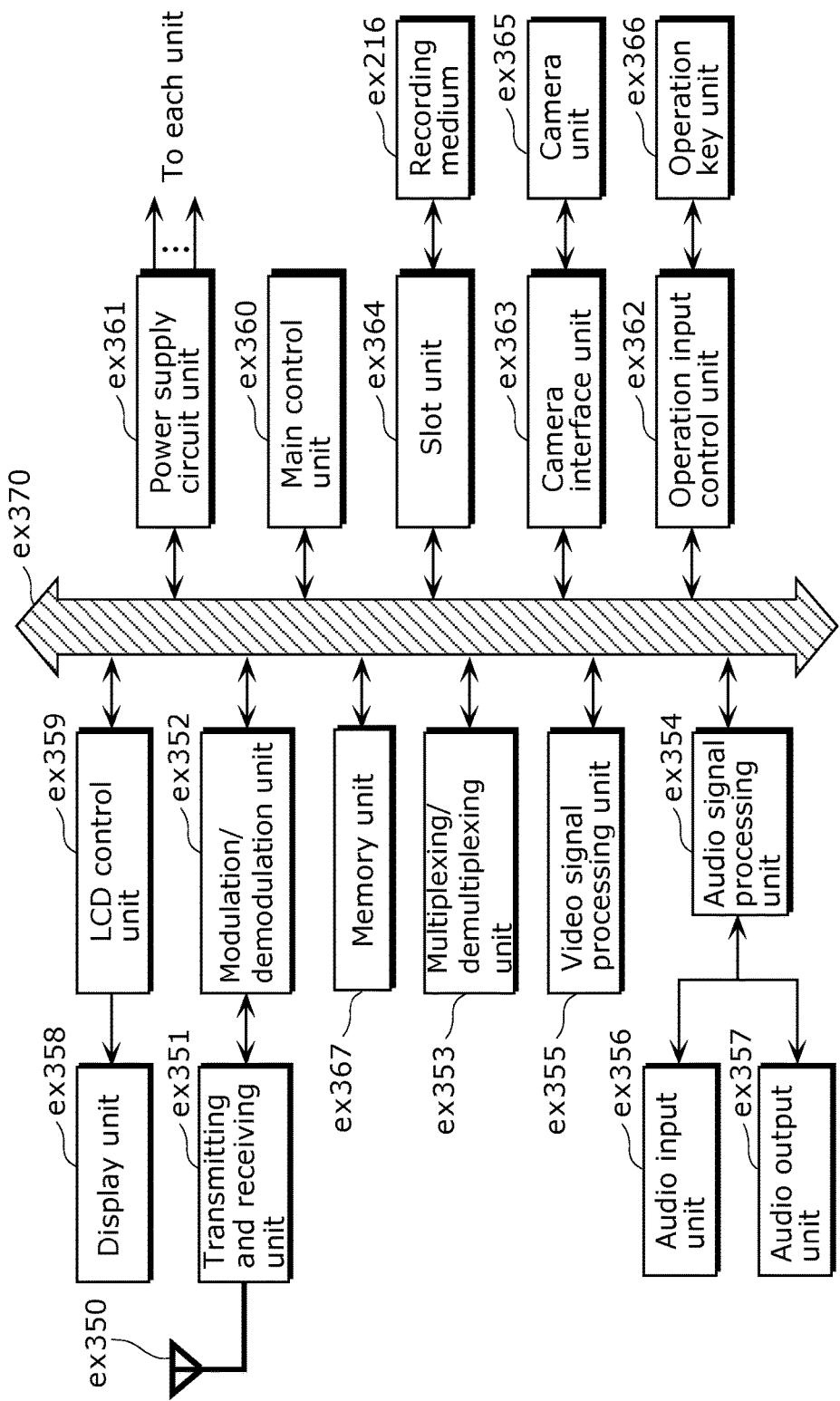
FIG. 28B is a block diagram showing an example of a configuration of a cellular phone.

Next, an example of a configuration of the cellular phone ex114 will be described with reference to FIG. 28B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 29:
FIG. 29 illustrates a structure of multiplexed data.

FIG. 29 illustrates a structure of the multiplexed data. As illustrated in FIG. 29, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 30:
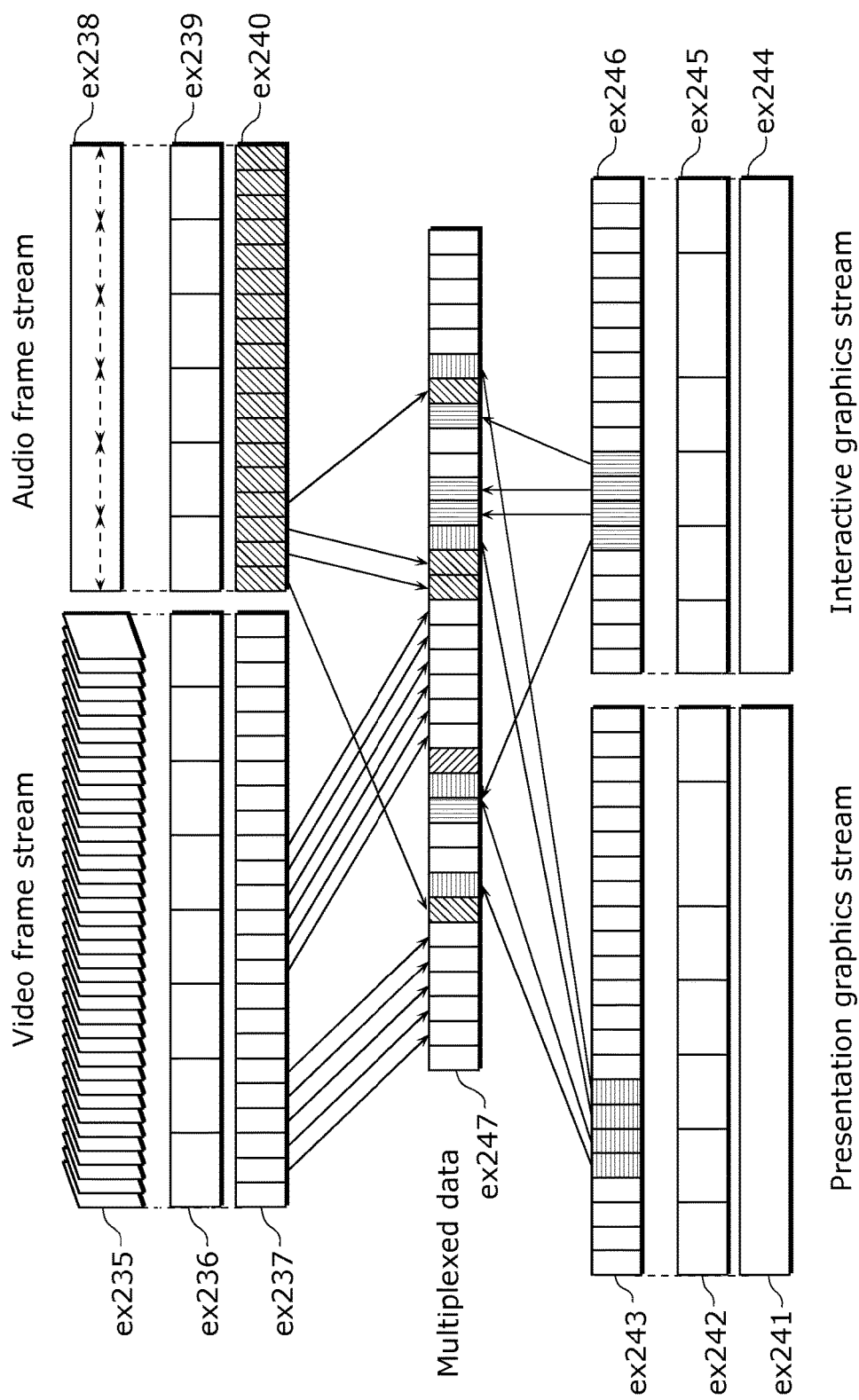
FIG. 30 schematically shows how each stream is multiplexed in multiplexed data.

FIG. 30 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 31:
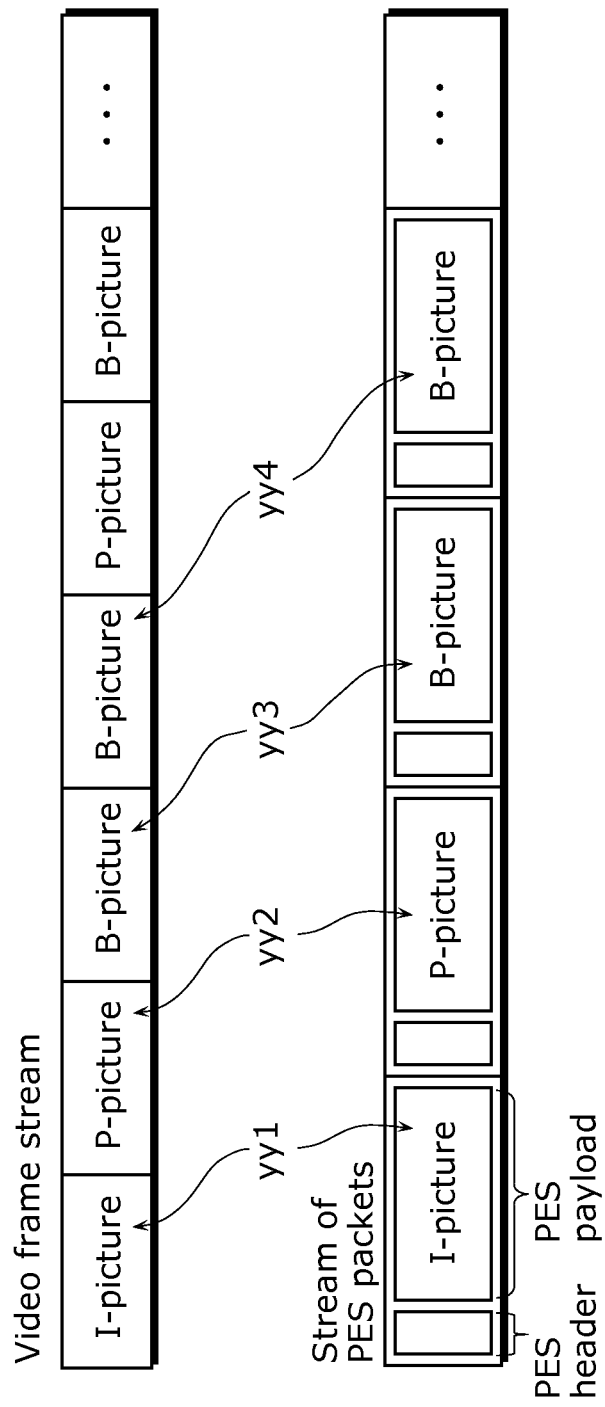
FIG. 31 shows how a video stream is stored in a stream of PES packets in more detail.

FIG. 31 illustrates how a video stream is stored in a stream of PES packets in more detail. The first bar in FIG. 31 shows a video frame stream in a video stream. The second bar shows the stream of PES packets. As indicated by arrows denoted as yy1, yy2, yy3, and yy4 in FIG. 31, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 32 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 32. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 33:
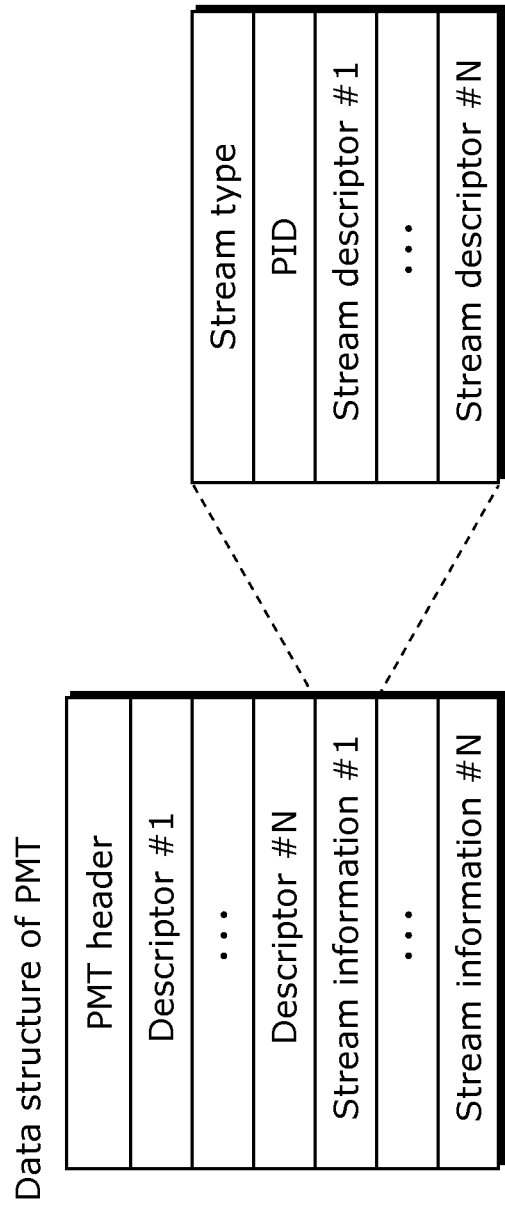
FIG. 33 shows a data structure of a PMT.

FIG. 33 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 34:
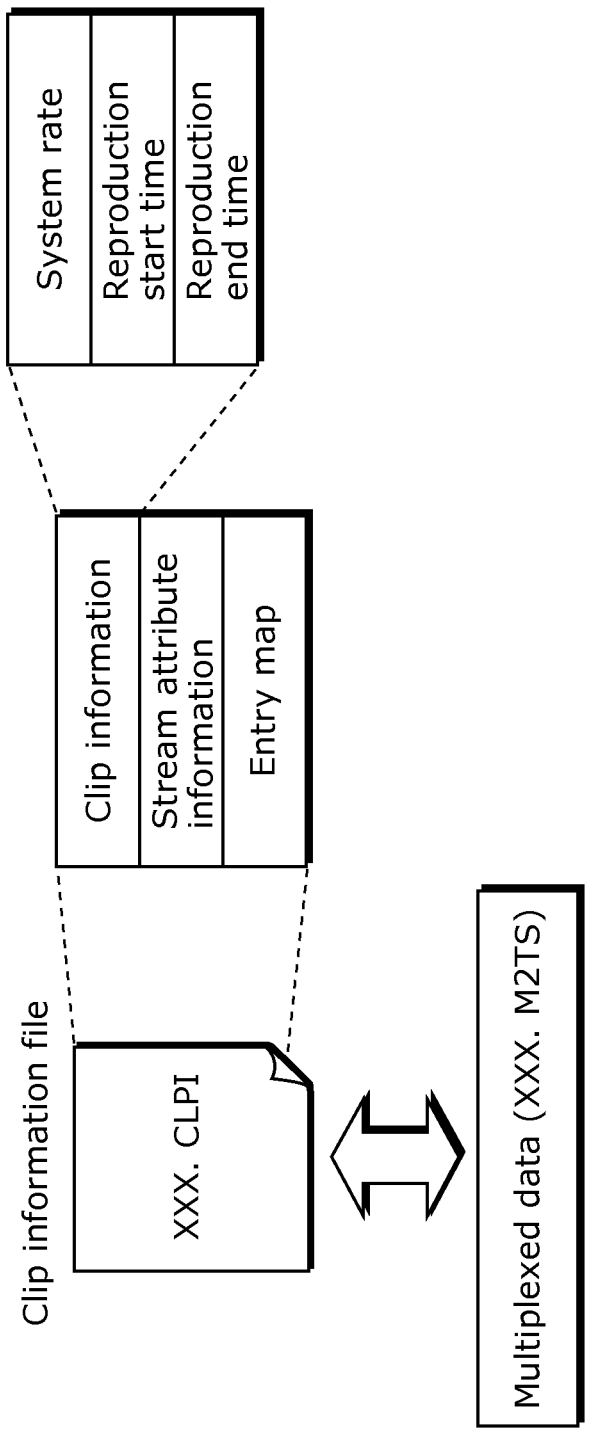
FIG. 34 shows an internal structure of multiplexed data information.

Each of the multiplexed data information files is management information of the multiplexed data as shown in FIG. 34. The multiplexed data information files are in one to one correspondence with the multiplexed data, and each of the files includes multiplexed data information, stream attribute information, and an entry map.

As illustrated in FIG. 34, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 35:
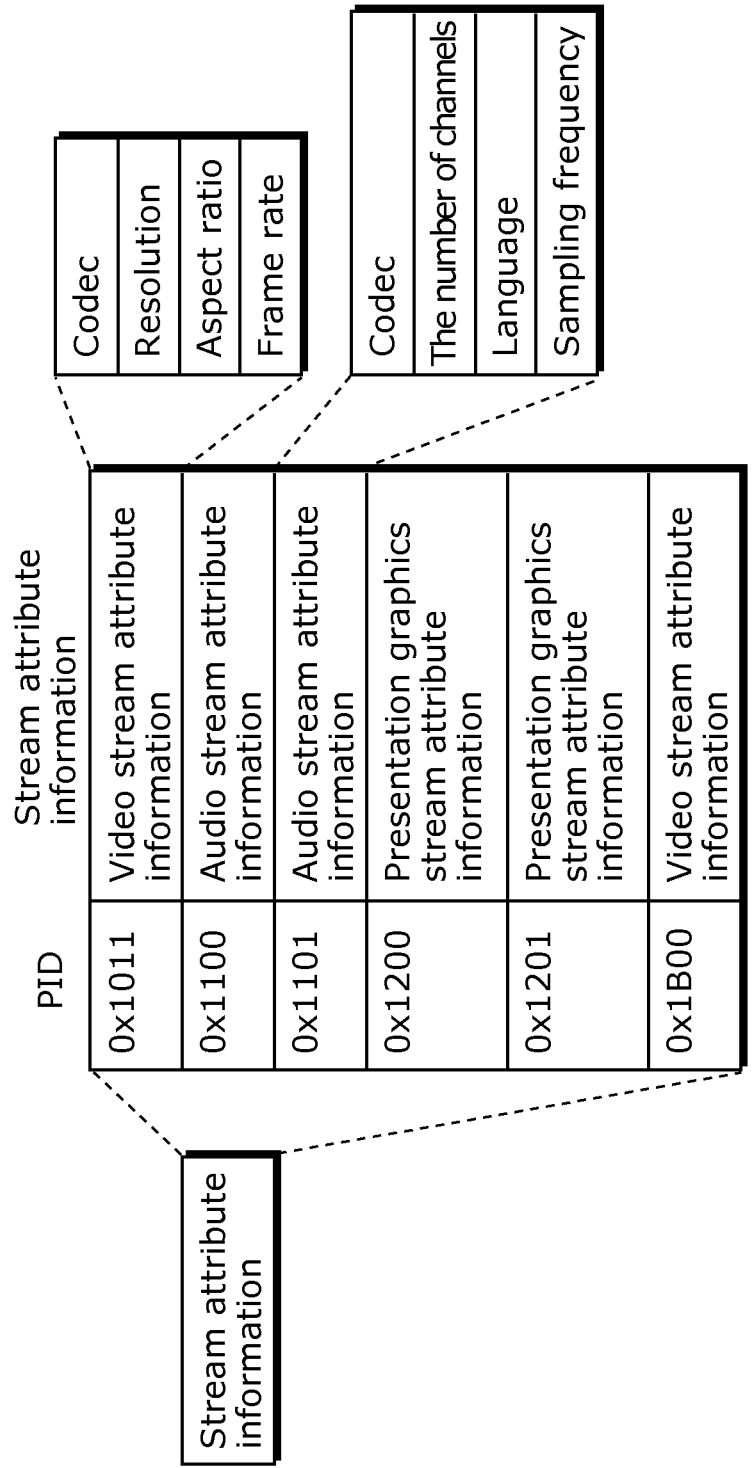
FIG. 35 shows an internal structure of stream attribute information.

As shown in FIG. 35, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 36:
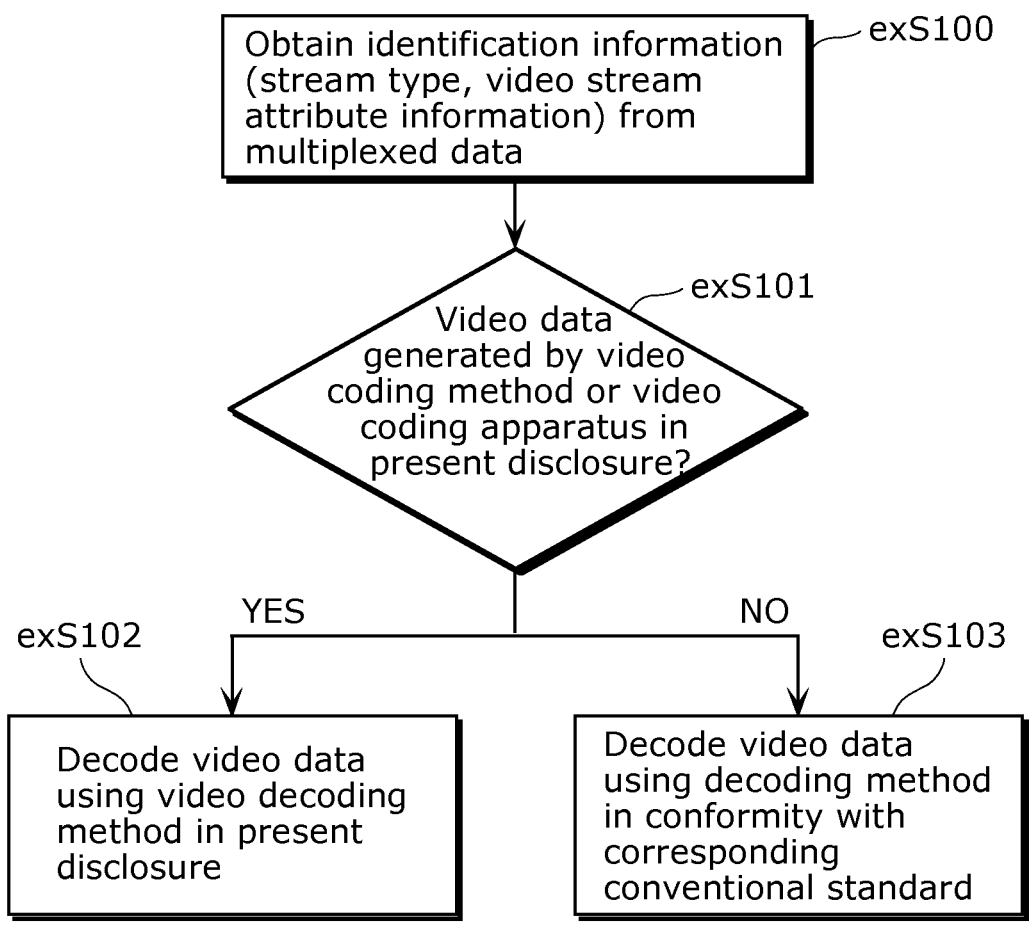
FIG. 36 shows steps for identifying video data.

Furthermore, FIG. 36 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 37:
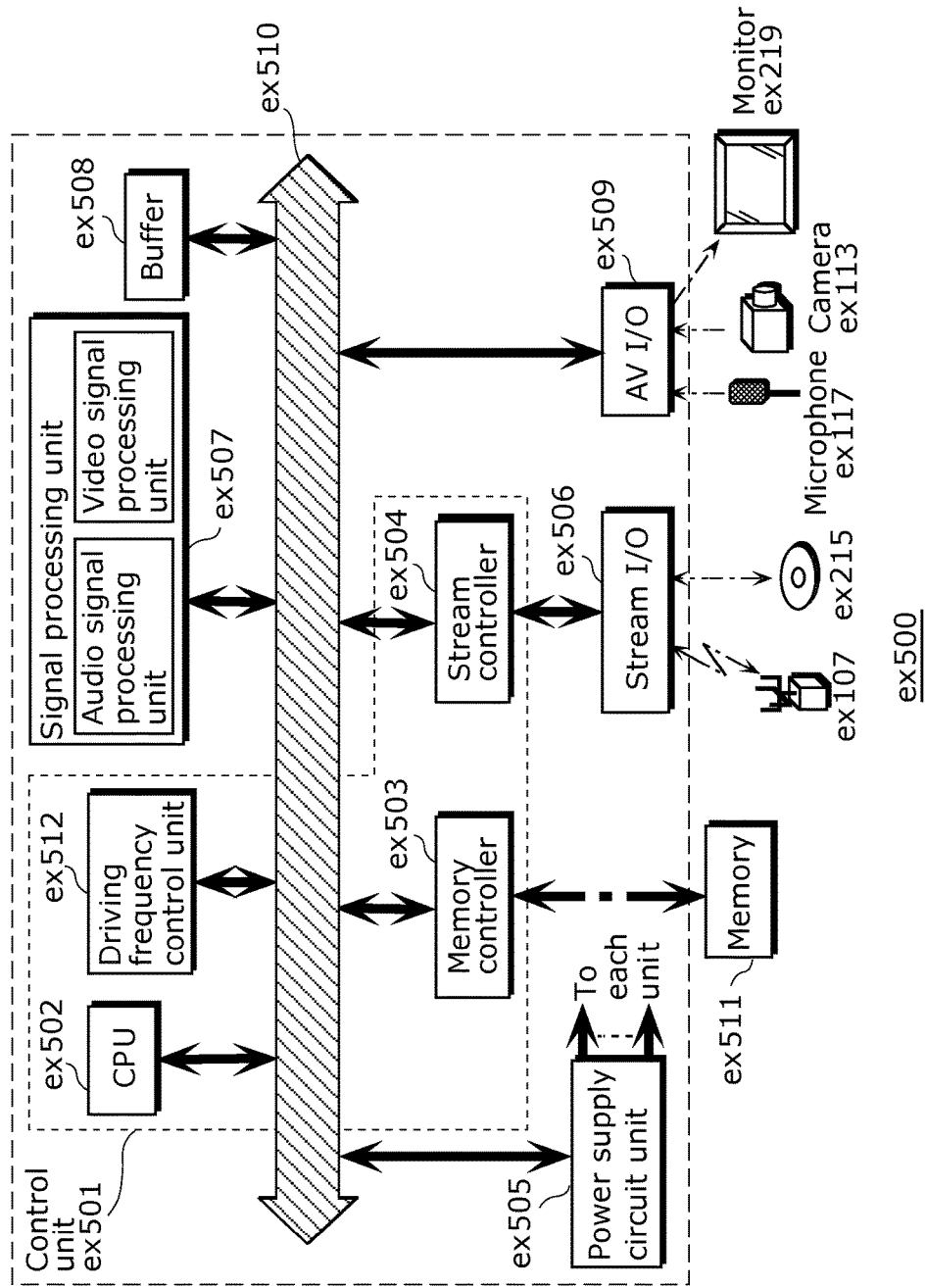
FIG. 37 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 37 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 38:
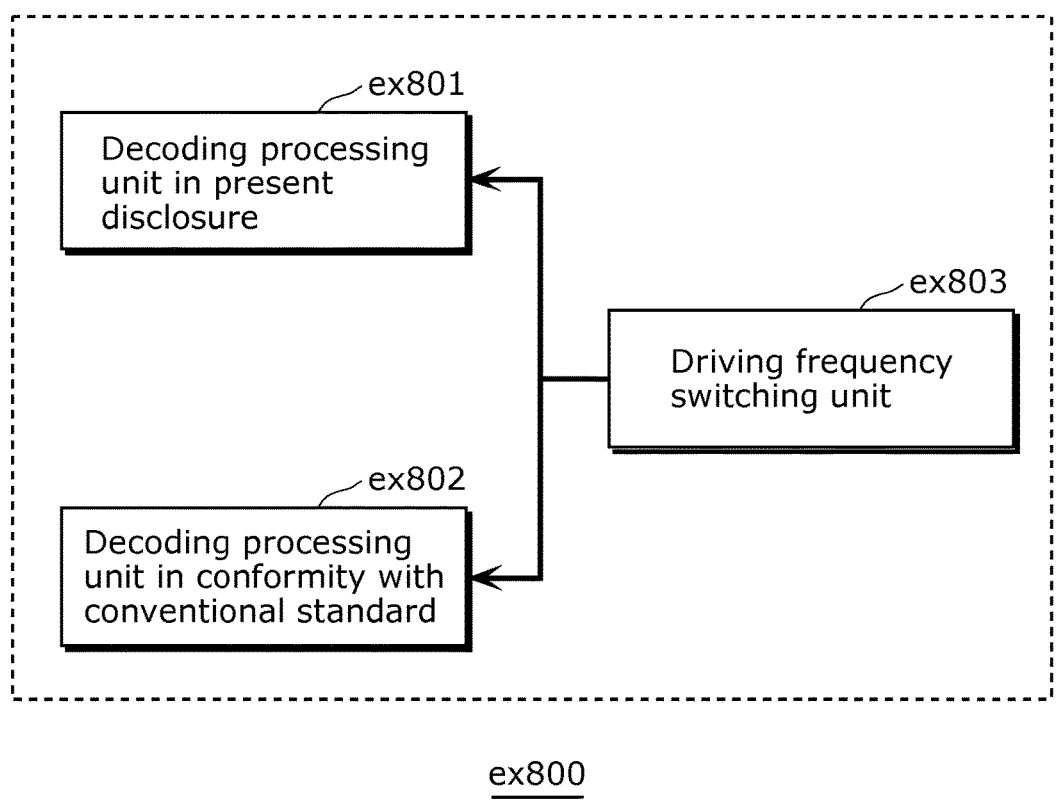
FIG. 38 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 38 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 37. Here, each of the decoding processing unit ex801 that executes the moving picture decoding method described in each of embodiments and the decoding processing unit ex802 that conforms to the conventional standard corresponds to the signal processing unit ex507 in FIG. 37. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 40. The driving frequency can be selected by storing the look-up table in the buffer ex508 and in an internal memory of an LSI, and with reference to the look-up table by the CPU ex502.

Figure 39:
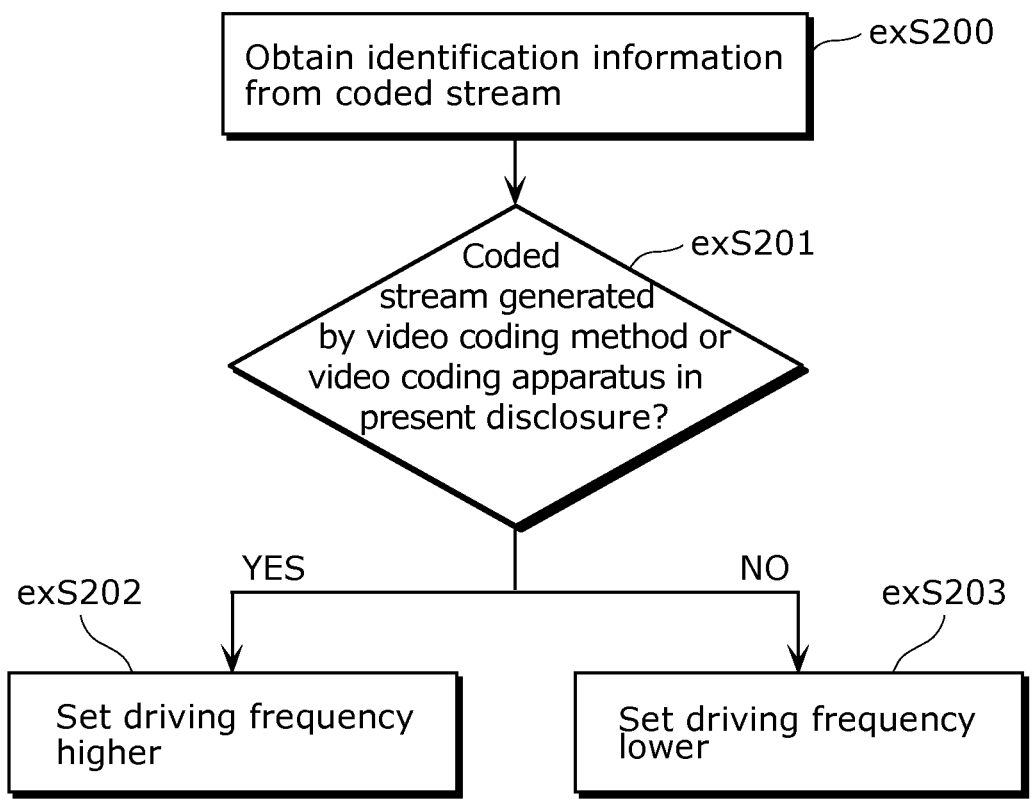
FIG. 39 shows steps for identifying video data and switching between driving frequencies.

FIG. 39 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 41A:
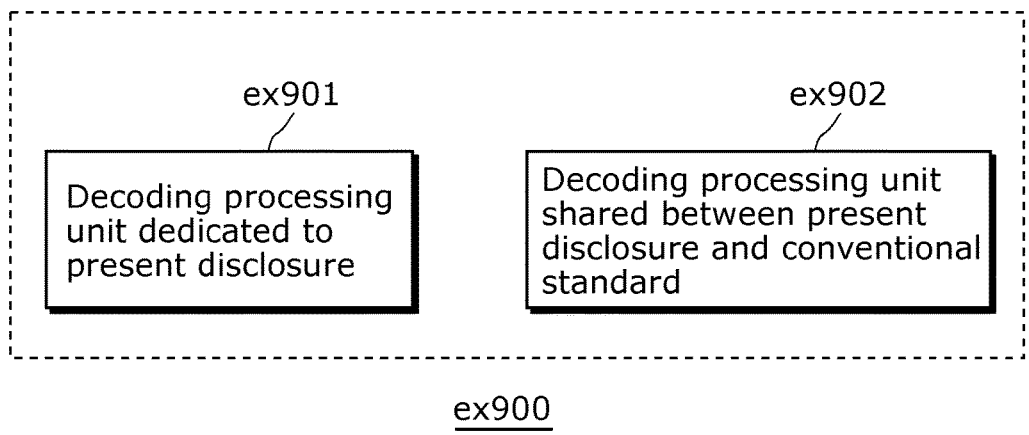
FIG. 41A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 41A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 41B:
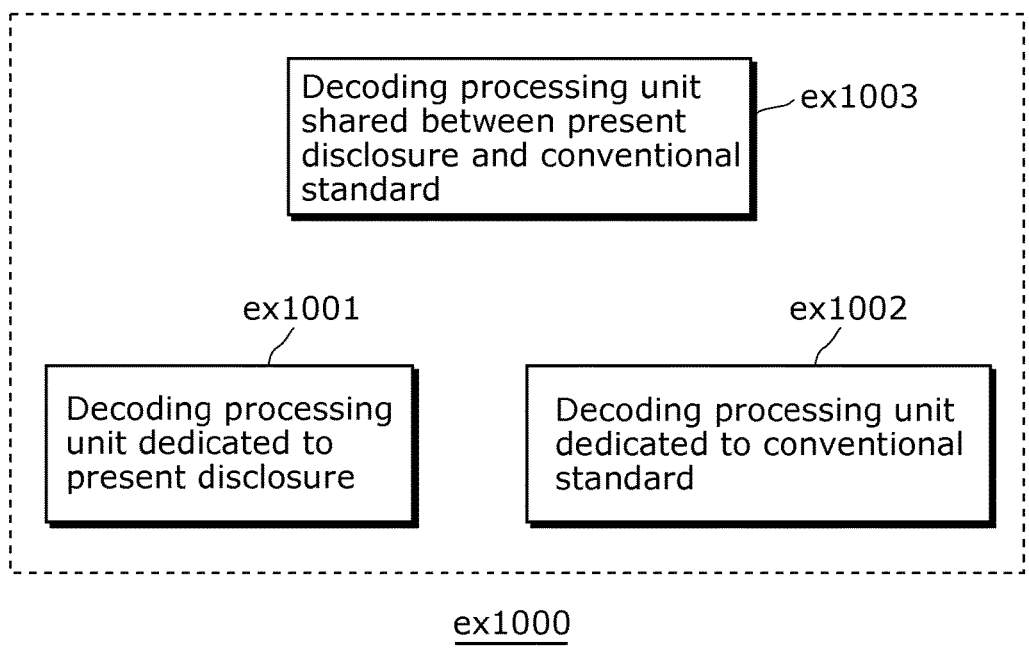
FIG. 41B is a diagram showing another example of a configuration for sharing a module of the signal processing unit.

Furthermore, ex1000 in FIG. 41B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

The image coding method and the image decoding method according to the present disclosure produce effects that allow suppressing the degradation in image quality and improving the coding efficiency, and are applicable to video cameras, mobile phones capable of capturing and replaying moving picture, personal computer, a recoding and reproduction apparatus, or others.

The invention claimed is:
1. An image coding method for coding, for each block, a picture composing a multi-view video having a first view and a second view, the image coding method comprising:
  determining a temporal distance between a current picture to be coded and a first reference picture to which a current block to be coded included in the current picture refers as a first temporal distance, the first reference picture being a reference picture included in one of the first view and the second view of the multi-view video;
  determining a temporal distance between the first reference picture and a second reference picture to which the current block refers as a second temporal distance, the second reference picture being a reference picture included in one of the first view and the second view of the multi-view video;
  judging whether or not the first temporal distance and the second temporal distance satisfy a predetermined condition;
  calculating a first weight for the first reference picture and a second weight for the second reference picture based on a result of the judgment; and
  generating a bi-prediction predictive image for the current block by adding a first block included in the first reference picture and a second block included in the second reference picture, the first block being weighted by the first weight, and the second block being weighted by the second weight,
  wherein the first block and the second block are referred to by the current block,
  wherein the predetermined condition includes (i) a first condition where the first temporal distance and the second temporal distance are equal and (ii) a second condition where a value of the first temporal distance is 0,
  wherein in the judging, when the first reference picture belongs to the first view along with the current picture and the second reference picture belongs to the second view different from the first view, the first condition where the first temporal distance and the second temporal distance are equal is judged to be satisfied,
  wherein in the calculating, when the first condition is judged to be satisfied, (i) an inter-view distance is added to the second temporal distance, the inter-view distance being a difference between a value of an index of the first view to which the current picture belongs and a value of an index of the second view to which the second reference picture belongs, and (ii) the first weight and the second weight are calculated based on the first temporal distance and the second temporal distance to which the inter-view distance has been added, the first weight and the second weight each being non-zero,
  wherein in the judging, when the second reference picture belongs to the first view along with the current picture and the first reference picture belongs to the second view different from the first view, the second condition where the value of the first temporal distance is 0 is judged to be satisfied, and
  wherein in the calculating, when the second condition is judged to be satisfied, (i) an inter-view distance is set to the first temporal distance, the inter-view distance being a difference between the value of the index of the first view to which the current picture belongs and the value of the index of the second view to which the first reference picture belongs, and (ii) the first weight and the second weight are calculated based on the first temporal distance to which the inter-view distance is set and the second temporal distance, the first weight and the second weight each being non-zero.
2. An image decoding method for decoding, for each block, a picture composing a multi-view video having a first view and a second view, the image decoding method comprising:

determining a temporal distance between a current picture to be decoded and a first reference picture to which a current block to be decoded included in the current picture refers as a first temporal distance, the first reference picture being a reference picture included in one of the first view and the second view of the multi-view video;

determining a temporal distance between the first reference picture and a second reference picture to which the current block refers as a second temporal distance, the second reference picture being a reference picture included in one of the first view and the second view of the multi-view video;

judging whether or not the first temporal distance and the second temporal distance satisfy a predetermined condition;

calculating a first weight for the first reference picture and a second weight for the second reference picture based on a result of the judgment; and generating a bi-prediction predictive image for the current block by adding a first block included in the first reference picture and a second block included in the second reference picture, the first block being weighted by the first weight, and the second block being weighted by the second weight, wherein the first block and the second block are referred to by the current block, wherein the predetermined condition includes (i) a first condition where the first temporal distance and the second temporal distance are equal and (ii) a second condition where a value of the first temporal distance is 0, wherein in the judging, when the first reference picture belongs to the first view along with the current picture and the second reference picture belongs to the second view different from the first view, the first condition where the first temporal distance and the second temporal distance are equal is judged to be satisfied, wherein in the calculating, when the first condition is judged to be satisfied, (i) an inter-view distance is added to the second temporal distance, the inter-view distance being a difference between a value of an index of the first view to which the current picture belongs and a value of an index of the second view to which the second reference picture belongs, and (ii) the first weight and the second weight are calculated based on the first temporal distance and the second temporal distance to which the inter-view distance has been added, the first weight and the second weight each being non-zero, wherein in the judging, when the second reference picture belongs to the first view along with the current picture and the first reference picture belongs to the second view different from the first view, the second condition where the value of the first temporal distance is 0 is judged to be satisfied, and wherein in the calculating, when the second condition is judged to be satisfied, (i) an inter-view distance is set to the first temporal distance, the inter-view distance being a difference between the value of the index of the first view to which the current picture belongs and the value of the index of the second view to which the first reference picture belongs, and (ii) the first weight and the second weight are calculated based on the first temporal distance to which the inter-view distance is set and the second temporal distance, the first weight and the second weight each being non-zero.

3. An image coding apparatus comprising:
a control circuitry; and
a storage accessible to the control circuitry,
wherein the control circuitry executes coding, for each block, a picture composing a multi-view video having a first view and a second view, the coding including:

determining a temporal distance between a current picture to be coded and a first reference picture to which a current block to be coded included in the current picture refers as a first temporal distance, the first reference picture being a reference picture included in one of the first view and the second view of the multi-view video;

determining a temporal distance between the first reference picture and a second reference picture to which the current block refers as a second temporal distance, the second reference picture being a reference picture included in one of the first view and the second view of the multi-view video;

judging whether or not the first temporal distance and the second temporal distance satisfy a predetermined condition;

calculating a first weight for the first reference picture and a second weight for the second reference picture based on a result of the judgment; and generating a bi-prediction predictive image for the current block by adding a first block included in the first reference picture and a second block included in the second reference picture, the first block being weighted by the first weight, and the second block being weighted by the second weight, wherein the first block and the second block are referred to by the current block, wherein the predetermined condition includes (i) a first condition where the first temporal distance and the second temporal distance are equal and (ii) a second condition where a value of the first temporal distance is 0, wherein in the judging, when the first reference picture belongs to the first view along with the current picture and the second reference picture belongs to the second view different from the first view, the first condition where the first temporal distance and the second temporal distance are equal is judged to be satisfied, wherein in the calculating, when the first condition is judged to be satisfied, (i) an inter-view distance is added to the second temporal distance, the inter-view distance being a difference between a value of an index of the first view to which the current picture belongs and a value of an index of the second view to which the second reference picture belongs, and (ii) the first weight and the second weight are calculated based on the first temporal distance and the second temporal distance to which the inter-view distance has been added, the first weight and the second weight each being non-zero, wherein in the judging, when the second reference picture belongs to the first view along with the current picture and the first reference picture belongs to the second view different from the first view, the second condition where the value of the first temporal distance is 0 is judged to be satisfied, and wherein in the calculating, when the second condition is judged to be satisfied, (i) an inter-view distance is set to the first temporal distance, the inter-view distance being a difference between the value of the index of the first view to which the current picture belongs and the value of the index of the second view to which the first reference picture belongs, and (ii) the first weight and the second weight are calculated based on the first temporal distance to which the inter-view distance is set and the second temporal distance, the first weight and the second weight each being non-zero.

4. An image decoding apparatus comprising:
a control circuitry; and
a storage accessible to the control circuitry,
wherein the control circuitry executes decoding, for each block, a picture composing a multi-view video having a first view and a second view, the decoding including:
determining a temporal distance between a current picture to be decoded and a first reference picture to which a current block to be decoded included in the current picture refers as a first temporal distance, the first reference picture being a reference picture included in one of the first view and the second view of the multi-view video;
determining a temporal distance between the first reference picture and a second reference picture to which the current block refers as a second temporal distance, the second reference picture being a reference picture included in one of the first view and the second view of the multi-view video;
judging whether or not the first temporal distance and the second temporal distance satisfy a predetermined condition;
calculating a first weight for the first reference picture and a second weight for the second reference picture based on a result of the judgment; and
generating a bi-prediction predictive image for the current block by adding a first block included in the first reference picture and a second block included in the second reference picture, the first block being weighted by the first weight, and the second block being weighted by the second weight,
wherein the first block and the second block are referred to by the current block,
wherein the predetermined condition includes (i) a first condition where the first temporal distance and the second temporal distance are equal and (ii) a second condition where a value of the first temporal distance is 0,
wherein in the judging, when the first reference picture belongs to the first view along with the current picture and the second reference picture belongs to the second view different from the first view, the first condition where the first temporal distance and the second temporal distance are equal is judged to be satisfied,
wherein in the calculating, when the first condition is judged to be satisfied, (i) an inter-view distance is added to the second temporal distance, the inter-view distance being a difference between a value of an index of the first view to which the current picture belongs and a value of an index of the second view to which the second reference picture belongs, and (ii) the first weight and the second weight are calculated based on the first temporal distance and the second temporal distance to which the inter-view distance has been added, the first weight and the second weight each being non-zero,
wherein in the judging, when the second reference picture belongs to the first view along with the current picture and the first reference picture belongs to the second view different from the first view, the second condition where the value of the first temporal distance is 0 is judged to be satisfied, and
wherein in the calculating, when the second condition is judged to be satisfied, (i) an inter-view distance is set to the first temporal distance, the inter-view distance being a difference between the value of the index of the first view to which the current picture belongs and the value of the index of the second view to which the first reference picture belongs, and (ii) the first weight and the second weight are calculated based on the first temporal distance to which the inter-view distance is set and the second temporal distance, the first weight and the second weight each being non-zero.

5. An image coding method for coding, for each block, a picture composing a multi-layer video having a first layer and a second layer, the image coding method comprising:
determining a temporal distance between a current picture to be coded and a first reference picture to which a current block to be coded included in the current picture refers as a first temporal distance, the first reference picture being a reference picture included in one of the first layer and the second layer of the multi-layer video having a configuration in which each picture belongs to any one of the layers for scalable video coding (SVC);
determining a temporal distance between the first reference picture and a second reference picture to which the current block refers as a second temporal distance, the second reference picture being a reference picture included in one of the first layer and the second layer of the multi-layer video having a configuration in which each picture belongs to any one of the layers for scalable video coding (SVC);
judging whether or not the first temporal distance and the second temporal distance satisfy a predetermined condition;
calculating a first weight for the first reference picture and a second weight for the second reference picture based on a result of the judgment; and
generating a bi-prediction predictive image for the current block by adding a first block included in the first reference picture and a second block included in the second reference picture, the first block being weighted by the first weight, and the second block being weighted by the second weight,
wherein the first block and the second block are referred to by the current block,
wherein the predetermined condition includes (i) a first condition where the first temporal distance and the second temporal distance are equal and (ii) a second condition where a value of the first temporal distance is 0,
wherein in the judging, when the first reference picture belongs to the first layer along with the current picture and the second reference picture belongs to the second layer different from the first layer, the first condition where the first temporal distance and the second temporal distance are equal is judged to be satisfied,
wherein in the calculating, when the first condition is judged to be satisfied, (i) an inter-layer distance is added to the second temporal distance, the inter-layer distance being a difference between a value of an index of the first layer to which the current picture belongs and a value of an index of the second layer to which the second reference picture belongs, and (ii) the first weight and the second weight are calculated based on the first temporal distance and the second temporal distance to which the inter-layer distance has been added, the first weight and the second weight each being non-zero, wherein in the judging, when the second reference picture belongs to the first layer along with the current picture and the first reference picture belongs to the second layer different from the first layer, the second condition where the value of the first temporal distance is 0 is judged to be satisfied, and wherein in the calculating, when the second condition is judged to be satisfied, (i) an inter-layer distance is set to the first temporal distance, the inter-layer distance being a difference between the value of the index of the first layer to which the current picture belongs and the value of the index of the second layer to which the first reference picture belongs, and (ii) the first weight and the second weight are calculated based on the first temporal distance to which the inter-layer distance is set and the second temporal distance, the first weight and the second weight each being non-zero.

6. An image decoding method for decoding, for each block, a picture composing a multi-layer video having a first layer and a second layer, the image decoding method comprising:

determining a temporal distance between a current picture to be decoded and a first reference picture to which a current block to be decoded included in the current picture refers as a first temporal distance, the first reference picture being a reference picture included in one of the first layer and the second layer of the multi-layer video having a configuration in which each picture belongs to any one of the layers for scalable video coding (SVC);

determining a temporal distance between the first reference picture and a second reference picture to which the current block refers as a second temporal distance, the second reference picture being a reference picture included in one of the first layer and the second layer of the multi-layer video having a configuration in which each picture belongs to any one of the layers for scalable video coding (SVC);

judging whether or not the first temporal distance and the second temporal distance satisfy a predetermined condition;

calculating a first weight for the first reference picture and a second weight for the second reference picture based on a result of the judgment; and generating a bi-prediction predictive image for the current block by adding a first block included in the first reference picture and a second block included in the second reference picture, the first block being weighted by the first weight, and the second block being weighted by the second weight, wherein the first block and the second block are referred to by the current block, wherein the predetermined condition includes (i) a first condition where the first temporal distance and the second temporal distance are equal and (ii) a second condition where a value of the first temporal distance is 0, wherein in the judging, when the first reference picture belongs to the first layer along with the current picture and the second reference picture belongs to the second layer different from the first layer, the first condition where the first temporal distance and the second temporal distance are equal is judged to be satisfied, wherein in the calculating, when the first condition is judged to be satisfied, (i) an inter-layer distance is added to the second temporal distance, the inter-layer distance being a difference between a value of an index of the first layer to which the current picture belongs and a value of an index of the second layer to which the second reference picture belongs, and (ii) the first weight and the second weight are calculated based on the first temporal distance and the second temporal distance to which the inter-layer distance has been added, the first weight and the second weight each being non-zero, wherein in the judging, when the second reference picture belongs to the first layer along with the current picture and the first reference picture belongs to the second layer different from the first layer, the second condition where the value of the first temporal distance is 0 is judged to be satisfied, and wherein in the calculating, when the second condition is judged to be satisfied, (i) an inter-layer distance is set to the first temporal distance, the inter-layer distance being a difference between the value of the index of the first layer to which the current picture belongs and the value of the index of the second layer to which the first reference picture belongs, and (ii) the first weight and the second weight are calculated based on the first temporal distance to which the inter-layer distance is set and the second temporal distance, the first weight and the second weight each being non-zero.

* * * * *